(12) United States Patent
Ibrahim et al.

(10) Patent No.: US 12,739,412 B2
(45) Date of Patent: Sep. 15, 2026

(54) MEDIA COMPRESSION AND DECOMPRESSION USING A GENERATIVE ARTIFICIAL INTELLIGENCE MODEL THAT ACCEPTS PARTIALLY DECOMPRESSED DATA AS INPUT

(71) Applicant: Microsoft Technology Licensing, LLC, Redmond, WA (US)

(72) Inventors: Ziyad A. Ibrahim, Redmond, WA (US); Sudhakar V. Prabhu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/421,809

(22) Filed: Jan. 24, 2024

(65) Prior Publication Data

US 2025/0240439 A1 Jul. 24, 2025

(51) Int. Cl.
*H04N 19/33* (2014.01)
*H04N 19/31* (2014.01)
(Continued)

(52) U.S. Cl.
CPC ............. *H04N 19/33* (2014.11); *H04N 19/31* (2014.11); *H04N 19/42* (2014.11);
(Continued)

(58) Field of Classification Search
CPC ...................................................... H04N 19/33
See application file for complete search history.

(56) References Cited

U.S. PATENT DOCUMENTS

2003/0112863 A1 6/2003 Demos
2009/0219991 A1* 9/2009 Po ........................ H04N 19/176 375/E7.126

(Continued)

FOREIGN PATENT DOCUMENTS

CN 116939226 10/2023
WO WO 2021/196087 10/2021

OTHER PUBLICATIONS

Blattmann et al., "Stable Video Diffusion: Scaling Latent Video Diffusion Models to Large Datasets," downloaded from https://static1.squarespace.com/static/6213c340453c3f502425776e/t/655ce779b9d47d342a93c890/1700587395994/stable_video_diffusion.pdf, 30 pp. (downloaded on Jan. 1, 2024).

(Continued)

*Primary Examiner* — Jerry T Jean Baptiste
(74) *Attorney, Agent, or Firm* — Klarquist Sparkman, LLP

(57) ABSTRACT

A computer system performs operations to compress or decompress media using a generative artificial intelligence ("AI") model. For compression, a compression tool receives a first version of input media, which has a first resolution, converts the first version to a second version, which has a second resolution lower than the first resolution, compresses the second version, and outputs compressed data for the second version. For decompression, a decompression tool receives input tokens that represent input syntax elements, respectively, of the compressed data for the second version. The decompression tool provides the input tokens to the generative AI model and receives predicted tokens from the generative AI model. The predicted tokens represent output syntax elements, respectively, of compressed data for output media. The decompression tool reconstructs the output media from the predicted tokens. The generative AI model (Continued)

is trained for media compression and decompression using a set of training data.

20 Claims, 14 Drawing Sheets

(51) Int. Cl.
*H04N 19/42* (2014.01)
*H04N 19/503* (2014.01)
*H04N 19/593* (2014.01)
*H04N 19/70* (2014.01)

(52) U.S. Cl.
CPC ......... *H04N 19/503* (2014.11); *H04N 19/593* (2014.11); *H04N 19/70* (2014.11)

(56) References Cited

U.S. PATENT DOCUMENTS

| | | | |
|---|---|---|---|
| 2023/0138763 | A1 | 5/2023 | Walters et al. |
| 2024/0395028 | A1 | 11/2024 | Chemerys et al. |
| 2025/0310512 | A1 | 10/2025 | Krishnamurthy et al. |

OTHER PUBLICATIONS

Chang et al., “Maskgit: Masked Generative Image Transformer,” arXiv:2202.04200, 23 pp. (Feb. 2022).
Huang et al., “VA + Embeddings STAR: A State-of-the-Art Report on the Use of Embeddings in Visual Analytics,” Computer Graphics, vol. 42, No. 3, pp. 539-571 (2023).
Meta, “Introducing Emu Video and Emu Edit, our latest generative AI research milestones,” downloaded from https://ai.meta.com/blog/emu-text-to-video-generation-image-editing-research/, 12 pp. (Nov. 2023).
Morrision, “Pika Labs new generative AI video tool unveiled—and it looks like a big deal,” downloaded from https://www.tomsguide.com/news/pika-labs-new-generative-ai-video-tool-unveiled-and-it-looks-like-a-big-deal, 14 pp. (Nov. 2023).
Morrison, “Stable Diffusion creator adds video to its generative AI model—here’s what it can do,” downloaded from https://www.tomsguide.com/news/stable-diffusion-creator-adds-video-to-its-generative-ai-model-heres-what-it-can-do, 13 pp. (Nov. 2023).
Vaswani et al., “Attention Is All You Need,” arXiv:1706.03762v7, 15 pp. (Aug. 2023).
Villegas et al., “Phenaki: Variable Length Video Generation from Open Domain Textual Descriptions,” arXiv:2210.02399v1, 17 pp. (Oct. 2022).
Fan et al., “Learned Lossless JPEG Transcoding via Joint Lossy and Residual Compression,” arXiv:2208.11673v1, 6 pp. (Aug. 2022).
Guo et al., “Efficient Learned Lossless JPEG Recompression,” arXiv:2308.13287v1, 17 pp. (Aug. 2023).
International Search Report and Written Opinion dated Feb. 24, 2025, from International Patent Application No. PCT/US2024/058172, 16 pp.
Lu et al., “Transformer-based Image Compression,” arXiv:2111.06707v1, 10 pp. (Nov. 2021).
Office Action dated Nov. 21, 2025, from U.S. Appl. No. 18/421,858, 6 pp.
Office Action dated Dec. 22, 2025, from U.S. Appl. No. 18/421,759, 20 pp.
Final Office Action dated Jun. 10, 2026, from U.S. Appl. No. 18/421,759, 21 pp.
Notice of Allowance dated Apr. 14, 2026, from U.S. Appl. No. 18/421,858, 8 pp.

* cited by examiner

FIG. 1a 100

| Syntax Element | Object Index | Element Index | Secondary Element Index | Min Value | Max Value |
|---|---|---|---|---|---|
| slice_header::first_mb_in_slice | 10 | 1 | 0 | 0 | 8192 |
| slice_header::slice_type | 10 | 2 | 0 | 0 | 9 |
| slice_header::pic_parameter_set_id | 10 | 3 | 0 | 0 | 255 |
| slice_header::colour_plane_id | 10 | 4 | 0 | 0 | 2 |
| slice_header::frame_num | 10 | 5 | 0 | 0 | 4096 |
| slice_header::field_pic_flag | 10 | 6 | 0 | 0 | 1 |
| slice_header::bottom_field_flag | 10 | 7 | 0 | 0 | 1 |
| slice_header::idr_pic_id | 10 | 8 | 0 | 0 | 1 |
| slice_header::pic_order_cnt_lsb | 10 | 9 | 0 | 0 | 4096 |
| slice_header::delta_pic_order_cnt_bottom | 10 | 10 | 0 | 0 | 1 |
| slice_header::delta_pic_order_cnt[ 0 ] | 10 | 11 | 1 | 0 | 1 |
| slice_header::delta_pic_order_cnt[ 1 ] | 10 | 11 | 2 | 0 | 1 |
| slice_header::redundant_pic_cnt | 10 | 12 | 0 | 0 | 127 |
| slice_header::direct_spatial_mv_pred_flag | 10 | 13 | 0 | 0 | 32 |
| slice_header::num_ref_idx_active_override_flag | 10 | 14 | 0 | 0 | 255 |
| slice_header::num_ref_idx_l0_active_minus1 | 10 | 15 | 0 | 0 | 255 |
| slice_header::num_ref_idx_l1_active_minus1 | 10 | 16 | 0 | 0 | 255 |
| slice_header::cabac_init_idc | 10 | 17 | 0 | 0 | 2 |
| slice_header::slice_qp_delta | 10 | 18 | 0 | 0 | 51 |
| slice_header::sp_for_switch_flag | 10 | 19 | 0 | 0 | 1 |
| slice_header::slice_qs_delta | 10 | 20 | 0 | 0 | 51 |
| slice_header::disable_deblocking_filter_idc | 10 | 21 | 0 | 0 | 2 |
| slice_header::slice_alpha_c0_offset_div2 | 10 | 22 | 0 | 0 | 12 |
| slice_header::slice_beta_offset_div2 | 10 | 23 | 0 | 0 | 12 |
| slice_header::slice_group_change_cycle | 10 | 24 | 0 | 0 | 1024 |

FIG. 1b 110

| Syntax Element | Object Index | Element Index | Element Secondary Index | Min Value | Max Value |
|---|---|---|---|---|---|
| macroblock_layer::mb_type | 20 | 1 | 0 | 0 | 24 |
| macroblock_layer::transform_size_8x8_flag | 20 | 2 | 0 | 0 | 1 |
| macroblock_layer::coded_block_pattern | 20 | 3 | 0 | 0 | 63 |
| macroblock_layer::transform_size_8x8_flag | 20 | 4 | 0 | 0 | 1 |
| macroblock_layer::mb_qp_delta | 20 | 5 | 0 | 0 | 51 |

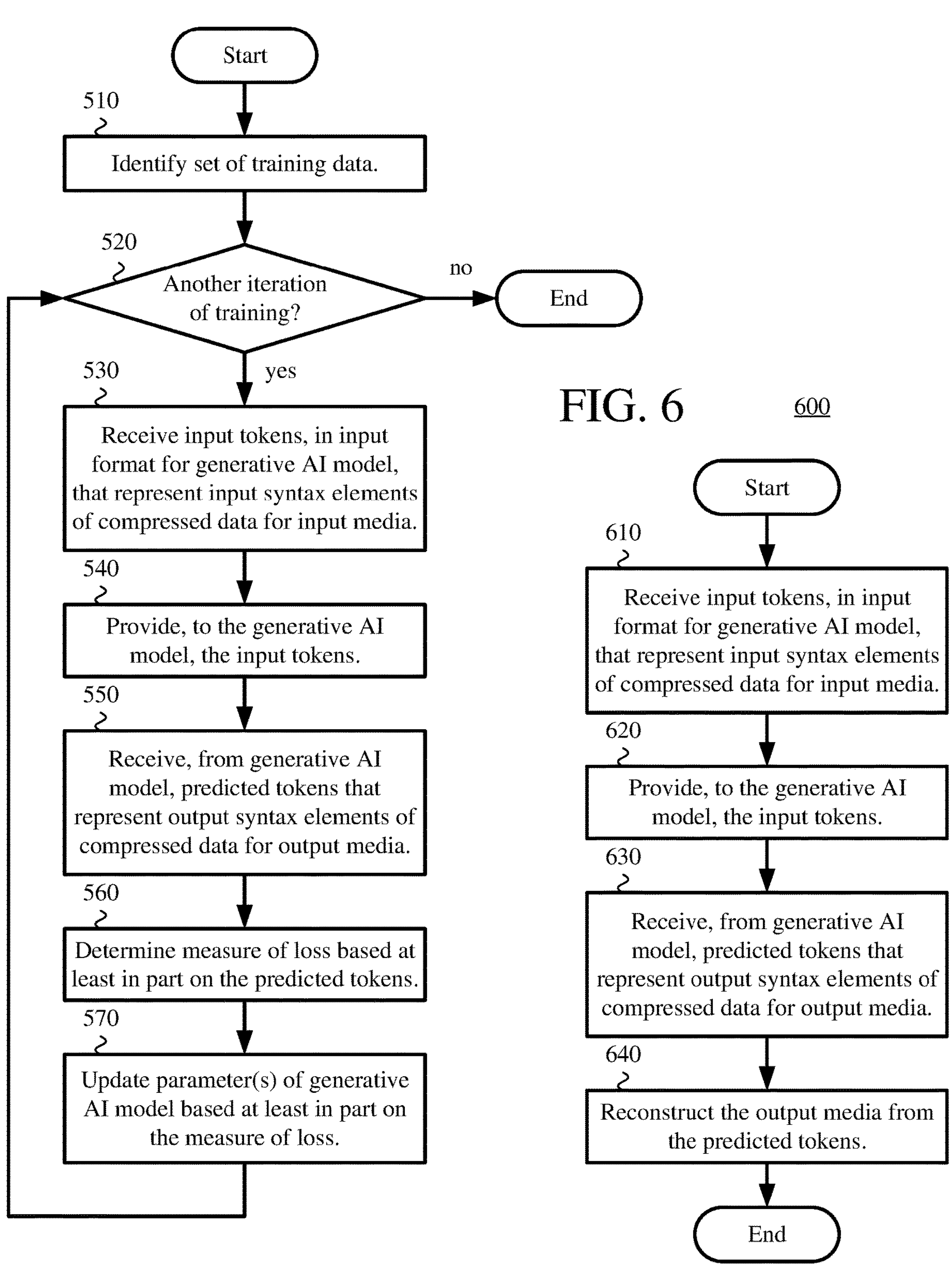
FIG. 5
500
Start
510
Identify set of training data.
520
Another iteration of training?
no
End
yes
530
Receive input tokens, in input format for generative AI model, that represent input syntax elements of compressed data for input media.
540
Provide, to the generative AI model, the input tokens.
550
Receive, from generative AI model, predicted tokens that represent output syntax elements of compressed data for output media.
560
Determine measure of loss based at least in part on the predicted tokens.
570
Update parameter(s) of generative AI model based at least in part on the measure of loss.
FIG. 6
600
Start
610
Receive input tokens, in input format for generative AI model, that represent input syntax elements of compressed data for input media.
620
Provide, to the generative AI model, the input tokens.
630
Receive, from generative AI model, predicted tokens that represent output syntax elements of compressed data for output media.
640
Reconstruct the output media from the predicted tokens.
End

Figure 7C:
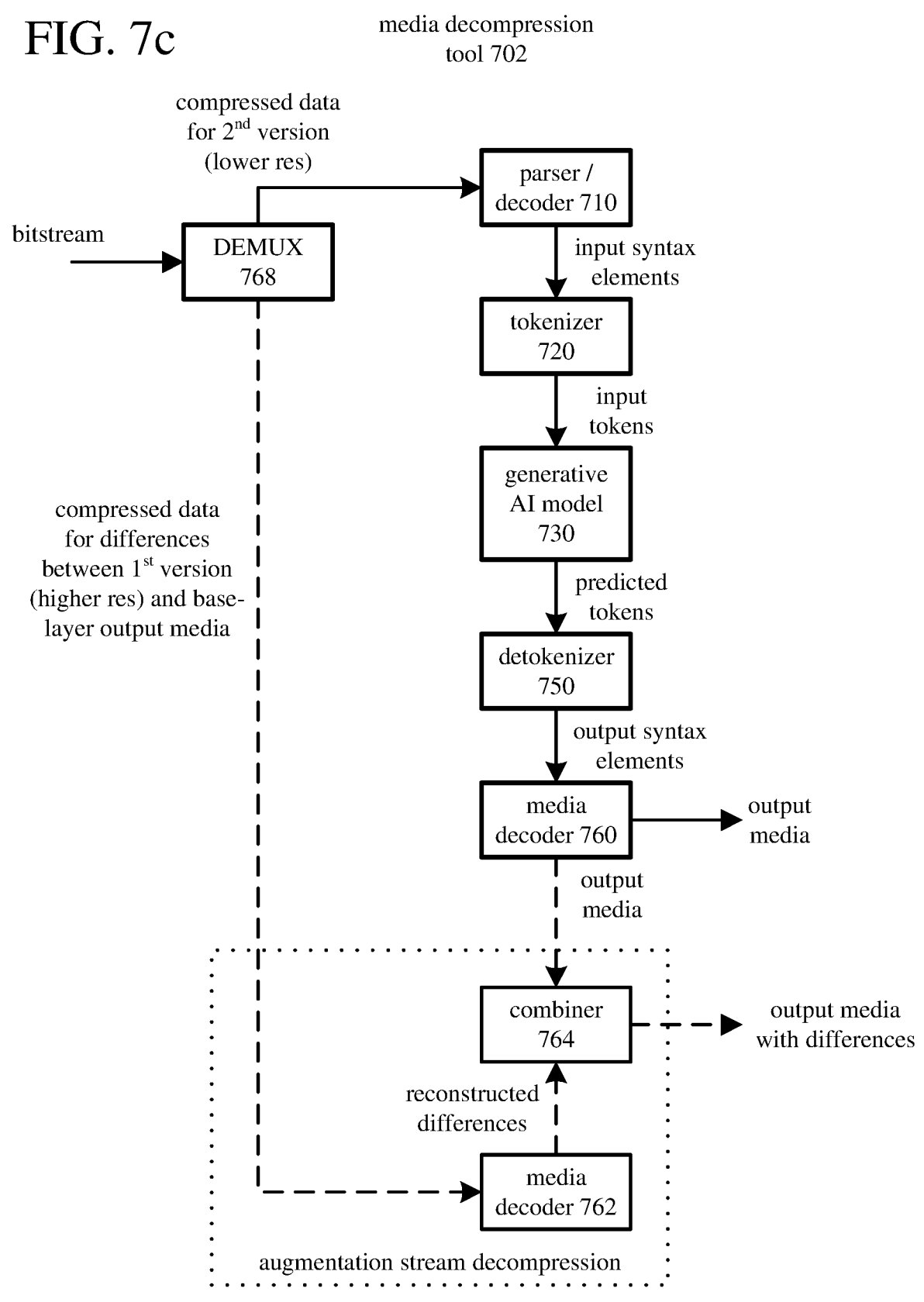

FIG. 7c media decompression tool 702
compressed data for 2nd version (lower res)
bitstream
DEMUX 768
parser / decoder 710
input syntax elements
tokenizer 720
input tokens
generative AI model 730
predicted tokens
detokenizer 750
output syntax elements
media decoder 760
output media
output media
compressed data for differences between 1st version (higher res) and base-layer output media
combiner 764
output media with differences
reconstructed differences
media decoder 762
augmentation stream decompression

FIG. 7d generative transformer 732 (example of 730)

Figure 7D:
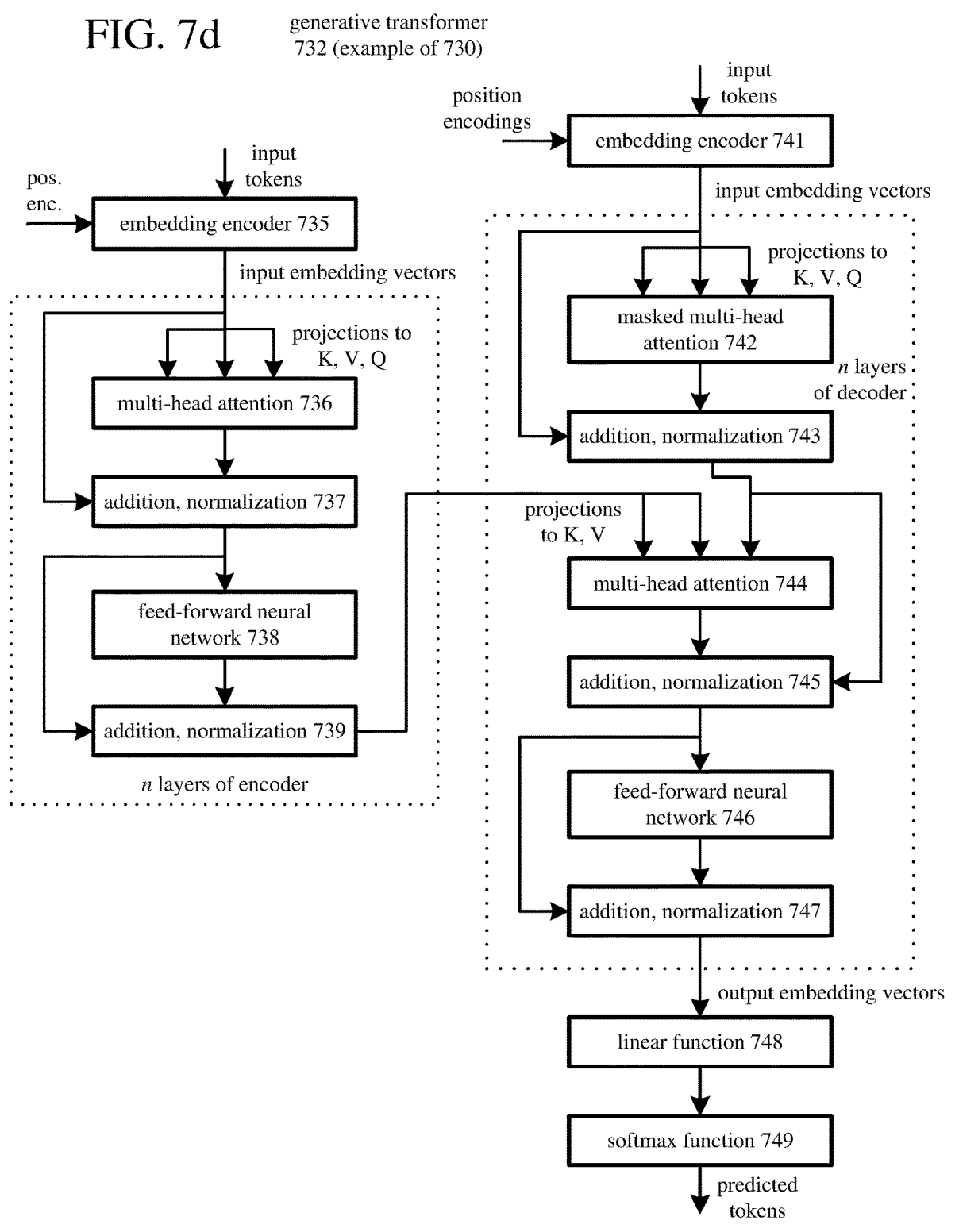

input tokens
pos. enc.
embedding encoder 735
input embedding vectors
projections to K, V, Q
multi-head attention 736
addition, normalization 737
feed-forward neural network 738
addition, normalization 739
*n* layers of encoder input tokens
position encodings
embedding encoder 741
input embedding vectors
projections to K, V, Q
masked multi-head attention 742
*n* layers of decoder
addition, normalization 743
projections to K, V
multi-head attention 744
addition, normalization 745
feed-forward neural network 746
addition, normalization 747
output embedding vectors
linear function 748
softmax function 749
predicted tokens

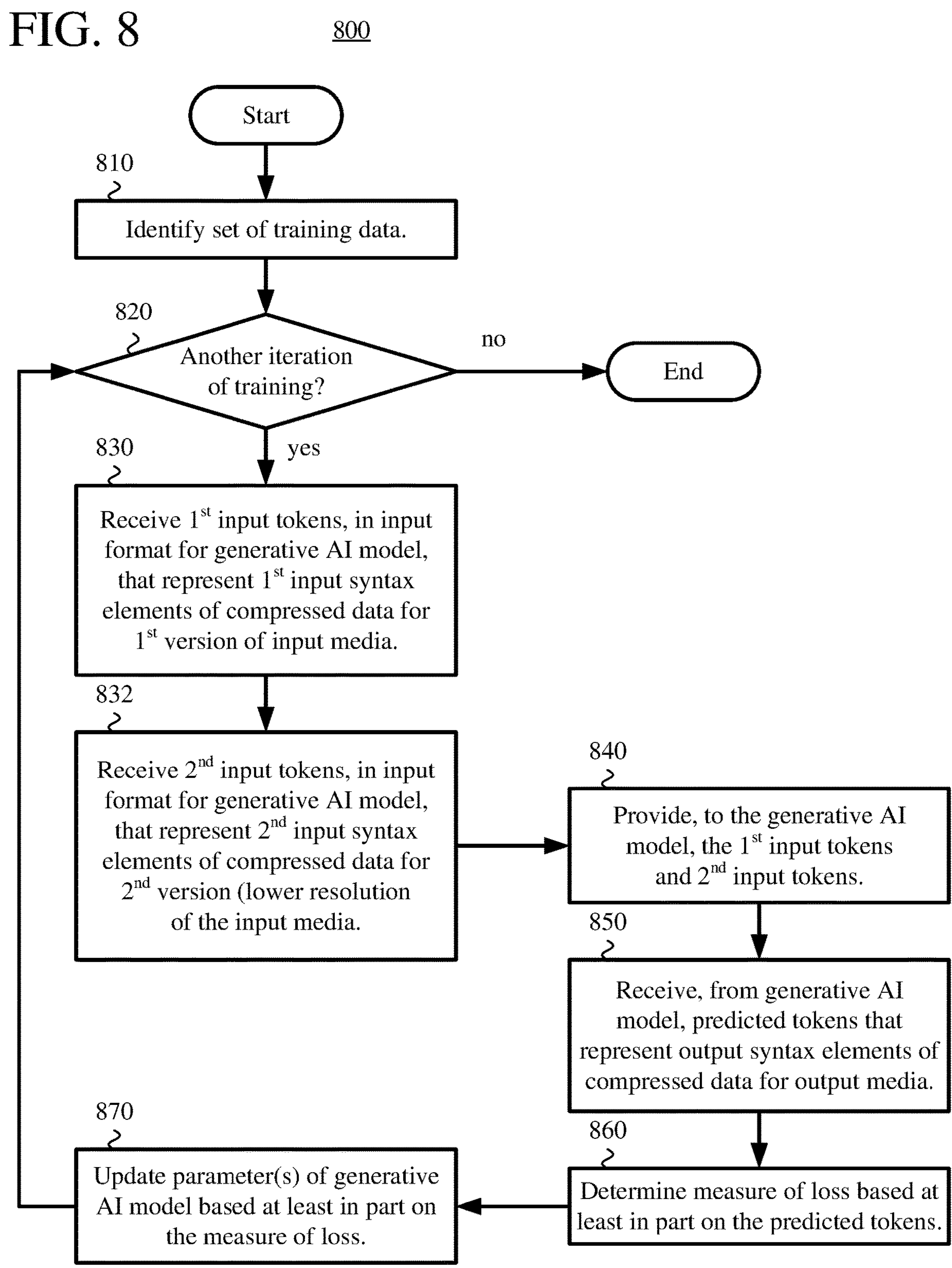
FIG. 8
800
Start
810
Identify set of training data.
820
Another iteration of training?
no
End
yes
830
Receive 1st input tokens, in input format for generative AI model, that represent 1st input syntax elements of compressed data for 1st version of input media.
832
Receive 2nd input tokens, in input format for generative AI model, that represent 2nd input syntax elements of compressed data for 2nd version (lower resolution of the input media.
840
Provide, to the generative AI model, the 1st input tokens and 2nd input tokens.
850
Receive, from generative AI model, predicted tokens that represent output syntax elements of compressed data for output media.
860
Determine measure of loss based at least in part on the predicted tokens.
870
Update parameter(s) of generative AI model based at least in part on the measure of loss.

MEDIA COMPRESSION AND DECOMPRESSION USING A GENERATIVE ARTIFICIAL INTELLIGENCE MODEL THAT ACCEPTS PARTIALLY DECOMPRESSED DATA AS INPUT

BACKGROUND

A generative artificial intelligence ("AI") model can generate content based on input provided to the generative AI model. A large language model ("LLM") is a type of generative AI model that can produce natural language text, often using a generative pre-trained transformer ("GPT") platform, based on a prompt or question provided to the LLM. In general, an LLM can perform a variety of natural language processing tasks. For example, an LLM can recognize, summarize, predict, and generate text or other content based on knowledge gained from training. Typically, an LLM is trained using a massive dataset for general-domain applications.

Aside from LLMs that generate text content, a generative AI model can generate image content based on input provided to the generative AI model. In this case, the generative AI model is trained using a dataset of images in the uncompressed domain. That is, sample values for pixels of images are provided to the generative AI model during the training process. A typical high-resolution image has millions of pixels. Training the generative AI model presents challenges due to the volume of information in the sample values for the images in the training dataset. Also, the sample values for images often include a significant amount of redundant information content, which complicates the training process. Video information, which in uncompressed form includes a series of images, presents even greater challenges in training a generative AI model.

SUMMARY

In summary, the detailed description presents innovations in the use of partially decompressed data as input to a generative AI model for media synthesis, media compression, media decompression, or another purpose. The media can be video content, image content, audio content, or another type of media content. The generative AI model is trained using partially decompressed data, and the generative AI model accepts partially decompressed data as input after training, which can provide several technical advantages. For example, the information content of media can be effectively represented in the partially decompressed data. The process of compressing media can remove redundancies, such that compressed data represents important information content of the media. Even after partial decompression, syntax elements determined from the compressed data still represent the important information content. From the perspective of the generative AI model, the syntax elements use a broad and diverse "vocabulary" to describe media, compared with the homogeneity of raw sample values. As a result, using syntax elements for training and input can enable more effective training of the generative AI model. As another example, by using partially decompressed data, the volume of data used in the training process can be significantly reduced. Compared to sample values in the uncompressed domain, syntax elements determined from the compressed data are much more compact. Similarly, by using partially decompressed data, the number of dimensions of input data is reduced, which simplifies organization of input data for training and later inference. In particular, compared to uncompressed video data (with sample values organized by color component, by horizontal and vertical location within a picture, and by frame), syntax elements are organized as a stream in a single dimension, which can make processing more efficient.

According to a first set of techniques and tools described herein, a computer system performs operations to prepare input to a generative AI model. The system receives compressed data for media, which has been compressed according to a media compression format to produce the compressed data. The system partially decompresses the compressed data (e.g., performing parsing and entropy decoding operations). This produces syntax elements of the compressed data according to the media compression format. The system then converts the syntax elements into tokens that represent the syntax elements, respectively. Unlike the syntax elements (in the media compression format), the tokens are encoded in an input format for the generative AI model. For example, for a given syntax element, a given token can indicate a syntax structure that includes the given syntax element, a type of the given syntax element, and a value of the given syntax element. The system stores the tokens in memory or storage, from which the system can provide the tokens to the generative AI model for use in a training process or inference process for media synthesis, media compression, media decompression, or another purpose.

According to a second set of techniques and tools described herein, a computer system performs operations to synthesize media using a generative AI model. The computer system receives input tokens that represent input syntax elements, respectively, of compressed data for input media, which has been compressed according to a media compression format. In contrast to the syntax elements (in the media compression format), the input tokens are encoded in an input format for the generative AI model. The system provides the input tokens to the generative AI model. The system then receives predicted tokens from the generative AI model. The predicted tokens represent output syntax elements, respectively, of compressed data for output media. Finally, the system reconstructs the output media from the predicted tokens (e.g., converting the predicted tokens to the output syntax elements in the media compression format, and then decompressing the output syntax elements using a media decoder for the media compression format).

According to a third set of techniques and tools described herein, a computer system performs operations to train a generative AI model for media synthesis. The system identifies a set of training data and trains the generative AI model in multiple training iterations using the set of training data. In a given training iteration, the system performs various operations. The system receives input tokens that represent input syntax elements, respectively, of compressed data for input media, which has been compressed according to a media compression format. The input tokens are encoded in an input format for the generative AI model. The system provides the input tokens to the generative AI model then receives predicted tokens from the generative AI model. The predicted tokens represent output syntax elements, respectively, of compressed data for output media. The system determines a measure of loss based at least in part on the predicted tokens. For example, the measure of loss is a measure of conformity of the predicted tokens to syntax of the media compression format. Or, as another example, the measure of loss is a rating of the output media after reconstruction of the output media, where the rating quantifies loss in terms of compression artifacts and/or consistency with the input media. Finally (for the given training iteration), the system updates parameter(s) of the generative AI model based at least in part on the measure of loss.

According to a fourth set of techniques and tools described herein, a computer system performs operations to compress media using a generative AI model. The system receives a first version of input media, which has a first resolution. The system converts the first version of the input media to a second version of the input media, which has a second resolution lower than the first resolution. The system compresses the second version according to a media compression format, thereby producing compressed data for the second version. The system outputs the compressed data for the second version for decompression using a generative AI model and a media decoder for the media compression format.

According to a fifth set of techniques and tools described herein, a computer system performs operations to train a generative AI model for media compression and decompression. The system identifies a set of training data and trains the generative AI model in multiple training iterations using the set of training data. In a given training iteration, the system performs various operations. The system receives first input tokens that represent first input syntax elements, respectively, of compressed data for a first version of input media. The first version has a first resolution. The system also receives second input tokens that represent second input syntax elements, respectively, of compressed data for a second version of the input media. The second version has a second resolution lower than the first resolution. The first version and second version have been compressed according to a media compression format. Unlike the first input syntax elements and second input syntax elements (in the media compression format), the first input tokens and second input tokens are encoded in an input format for the generative AI model. The system provides the first input tokens and the second input tokens to generative AI model. The system receives predicted tokens from the generative AI model. The predicted tokens represent output syntax elements, respectively, of compressed data for output media at the first resolution. The system determines a measure of loss based at least in part on the predicted tokens. For example, the measure of loss is a measure of conformity of the predicted tokens to syntax of the media compression format. Or, as another example, the measure of loss is a measure of quality degradation of the output media relative to the first version of the input media. Finally (for the given training iteration), the system updates parameter(s) of the generative AI model based at least in part on the measure of loss.

According to a sixth set of techniques and tools described herein, a computer system performs operations to reconstruct media using a generative AI model. The system receives input tokens that represent input syntax elements, respectively, of compressed data for a second version of input media, which approximates a first version of the input media. (The first version has a first resolution, and the second version has a second resolution lower than the first resolution.) The second version has been compressed according to a media compression format. Unlike the input syntax elements (in the media compression format), the input tokens are encoded in an input format for the generative AI model. The system provides the input tokens to the generative AI model and receives predicted tokens from the generative AI model. The predicted tokens represent output syntax elements, respectively, of compressed data for output media at the first resolution. The system reconstructs the output media from the predicted tokens (e.g., converting the predicted tokens to the output syntax elements in the media compression format, and then decompressing the output syntax elements using a media decoder for the media compression format).

The innovations described herein can be implemented as part of a method, as part of a computer system (physical or virtual) configured to perform the method, or as part of a tangible computer-readable media storing computer-executable instructions for causing one or more processors, when programmed thereby, to perform the method. The various innovations can be used in combination or separately. The innovations described herein include the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

FIGS. 1*a* and 1*b* are tables showing features of example tokens for syntax elements of compressed data for video.

FIG. 5 is a flowchart illustrating an example technique for training a generative AI model for media synthesis, where the generative AI model uses partially decompressed data as input.

FIG. 6 is a flowchart illustrating an example technique for synthesizing media with a generative AI model that uses partially decompressed data as input.

FIG. 7*c* is a diagram illustrating an example media decompression tool including a generative AI model that uses partially decompressed data as input.

FIG. 7*d* is a diagram illustrating an example generative AI model for a media compression tool or media decompression tool.

FIG. 8 is a flowchart illustrating an example technique for training a generative AI model for media compression, where the generative AI model uses partially decompressed data as input.

FIG. 10 is a flowchart illustrating an example technique for decompressing media with a generative AI model that uses partially decompressed data as input.

DETAILED DESCRIPTION

Figure 2:
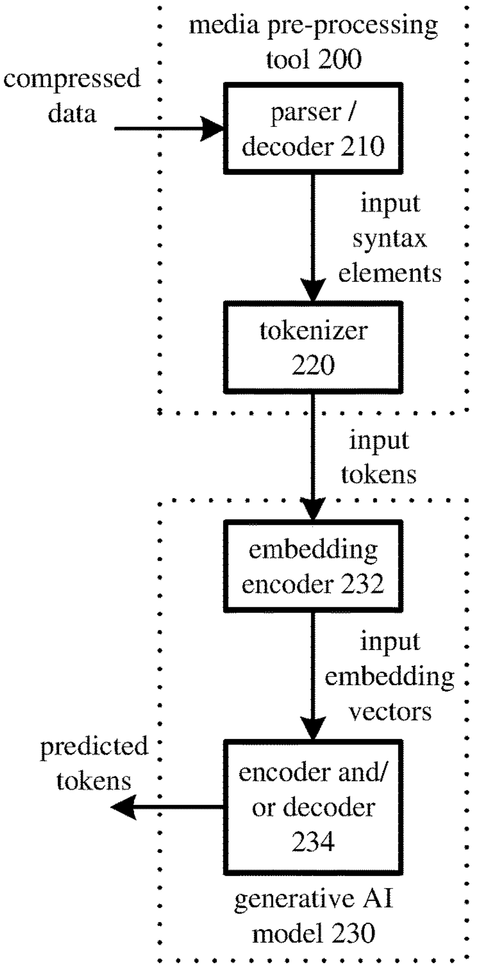
FIG. 2 is a diagram illustrating an example pre-processing tool for processing compressed data to use as input for a generative AI model in a media synthesis tool, media compression tool, or media decompression tool.

The detailed description presents innovations in the use of partially decompressed data as input to a generative AI model for media synthesis, media compression, media decompression, or another purpose. The media can be video content, image content, audio content, or another type of media content. In some example implementations, the generative AI model is a transformer-based machine learning model that is trained using partially decompressed data for video streams. After training, the generative AI model can synthesize new video frames from input consisting of a single frame or series of multiple frames. Or, after training, the generative AI model can be used for video compression and decompression, with the generative AI model predicting a higher-resolution version of video from input consisting of a lower-resolution version of the video.

Media in the uncompressed domain can contain an immense volume of information. For example, video in the uncompressed domain can include 30, 60, or more frames per second, with each frame including millions of pixels, and with each pixel having 3 or more sample values (e.g., red, green, and blue values). Training a generative AI model using media in the uncompressed domain presents challenges due to the volume of information and due to redundant information content in the media, which complicates the training process.

The process of compressing media can remove redundancies, such that compressed data represents important information content of the media in a compact way. However, compressed data in a bitstream typically exhibits very high entropy (an extreme lack of order or predictability) due to the removal of redundancy in the compression process. As a result, it can be impractical to train a generative AI model using such compressed data directly.

According to approaches described herein, a generative AI model is trained using partially decompressed data, and the generative AI model accepts partially decompressed data as input after training. This provides several technical advantages. For example, after partial decompression, syntax elements determined from compressed data still represent important information content of media. In a media compression format, a syntax element can represent a decision (made based on information content of media) about compression and decompression, or a syntax element can represent a characteristic of part of the media, such as a sample value, pixel, region, or frame. To a generative AI model, syntax elements can provide a description of media using a meaningful "vocabulary" with diverse terms and focused context. This can enable effective training of a generative AI model, which can learn from the syntax elements quickly and efficiently. In contrast, raw sample values in the uncompressed domain exhibit significant homogeneity or redundancy, which the generative AI model otherwise spends resources to analyze in order to isolate important information content.

As another example of technical advantage, by using partially decompressed data, the volume of data used in the training process for a generative AI model can be significantly reduced. Compared to sample values in the uncompressed domain, syntax elements determined from compressed data are much more compact. Similarly, by using partially decompressed data, the number of dimensions of input data is reduced, which simplifies organization of input data in data structures for training and later inference. In particular, compared to uncompressed video data (with sample values organized in four dimensions for color component, width, height, and frame), syntax elements are organized as a stream in a single dimension, which can make processing more efficient.

I. Example Generative AI Models.

In some examples described herein, the generative AI model is a transformer-based model. The generative AI model uses some features of the generative pre-trained transformer ("GPT") approach described in Vaswani et al., "Attention Is All You Need" (2017) but also includes significant modifications, as explained in more detail below.

In general, for data preparation, input data (here, syntax elements) are converted to sequences of input tokens, which are converted into embedding vectors using embedding matrices. Positional encodings can be added to provide the generative AI model with information about the positions of input tokens (and corresponding syntax elements) in the compressed data. Section III explains data preparation operations performed on compressed data for media to produce input for a generative AI model in some examples of approaches described herein.

In a forward pass, embedding vectors for a source sequence can be processed through layers of an encoder, where each layer of the encoder applies multi-head self-attention and a feed-forward neural network. Embedding vectors for a target sequence (with an end token removed, and shifted by one position) are passed through layers of a decoder, where each layer of the decoder applies masked multi-head self-attention, additional multi-head self-attention (over output from the masked multi-head self-attention and output from the encoder), and a feed-forward neural network. Sub-layers of the encoder and decoder can use normalization. Techniques like dropout can be applied for regularization after application of a feed-forward neural network but before normalization. At each stage in the decoder, the generative AI model makes a prediction for the next token in the target sequence. This is autoregressive, in that one token is predicted at a time, and the predicted token is fed back into the generative AI model as input for subsequent tokens. In the decoder, "masking" in the masked multi-head self-attention prevents the prediction for a particular token from depending on future tokens in the sequence. Sections IV (for media synthesis) and V (for media compression and decompression) explain forward pass operations for a generative AI model in some examples of approaches described herein.

For training a generative AI model, the primary loss measure in sequence-to-sequence tasks is typically a categorical cross-entropy loss. Given that the generative AI model predicts the probability of a predicted token in the vocabulary for each position in an output sequence, the cross-entropy loss measures the difference between the predicted probabilities and the true output. The loss can be calculated over each input token in a target sequence and then averaged over the entire sequence and batch. Examples of loss measures in some examples are described in Sections IV (for media synthesis) and V (for media compression and decompression). Using the calculated loss, gradients are computed using backward propagation, and then parameters are updated according to the gradients. Training can repeat in training iterations for different batches (subsets) of input data in a training set, for an epoch (a pass through the data in the training set). The overall training process can repeat for multiple epochs until a stopping criterion is satisfied (e.g., the calculated measure of loss is below a threshold, or the parameters have converged). Optimizations such as a "warm-up" phase (increased rate of learning for initial iterations) and a "cool-down" phase (decreased rate of learning for later iterations) can be used. After training, a generative AI model can be re-evaluated periodically or as needed on a validation set of data to gauge (and potentially adjust) the performance of the generative AI model. Sections IV (for media synthesis) and V (for media compression and decompression) explain training operations for a generative AI model in some examples of approaches described herein.

In some examples, the generative AI model is a variation of BLOOM, GPT-4, GPT-4.5, or LLaMA. Alternatively, the generative AI model is another type of generative pretrained transformer. Alternatively, approaches described herein can work with different types of generative AI models.

II. Example Media Compression Formats.

In examples described herein, compressed data is partially decompressed to provide input to a generative AI model for training or, after training, for inference. The compressed data is organized according to a media compression format, which represents media such as video, audio, or images using syntax elements organized in syntax structures. A syntax element can represent a decision, made based on information content of the media, about compression and decompression. Or a syntax element can represent a characteristic of part of the media, such as a sample value, pixel, region, or frame for video. Syntax elements are determined during compression and used during decompression to reconstruct media.

At a high level, compression of media includes operations for decorrelation, syntax element formation, and binarization. Decorrelation operations identify and remove redundancy in the media. For video, audio, or other media in a time series, frames of the media over time may exhibit strong similarity. Decorrelation can remove temporal redundancy using prediction operations, such as motion estimation (to identify motion between frames), motion compensation (to exploit motion between frames), and other inter-picture prediction operations in video compression. For video, images, and other spatial media, a frame of the media may exhibit strong similarity between different regions within the frame. Decorrelation can remove spatial redundancy between sample values using prediction operations, such as spatial extrapolation, block copy prediction, and other intra-picture prediction operations in video compression or image compression. For most types of media, transform operations (e.g., using a frequency transform) can further remove redundancy in a set of sample values or residual values (after prediction). For video, images, and other spatial media, there can be redundancy between sample values of a given pixel, which can be exploited using a color conversion operation. Similarly, decorrelation can remove inter-channel redundancy between sample values in different channels with inter-channel prediction operations in audio compression.

For syntax element formation, the results of decorrelation are parameterized using syntax elements. A given syntax element has a defined set of possible values. When the syntax element represents a continuous value or high-precision value in the media content, the syntax element is quantized during compression to have one of the defined set of possible values. The quantization operation reduces the precision of the value and can result in loss of information content, but also introduces redundancy between different values of the syntax element, which can be exploited during entropy coding.

Syntax elements for a given layer of organization are grouped in a syntax structure. Typically, syntax structures correspond to different hierarchical layers of organization of the media content. For example, for video, sample values or residual values (after prediction) are organized as sub-blocks of a block, with blocks in turn being organized as a larger unit such as a macroblock or coding tree unit, with those larger units in turn being organized into slices and/or tiles, with the slices and/or tiles in turn being organized as a picture, and with pictures in turn being organized as a sequence. For audio, different hierarchical layers can include sub-frames, frames, channels, and sequence. For purposes of a generative AI model, syntax elements provide information about patterns in media content.

For video, for example, common syntax structures include a sequence parameter set for a sequence, a picture parameter set for a picture, a slice header for a slice, slice data for a slice, macroblock data or coding tree unit data for a macroblock or coding tree unit, prediction data for a macroblock or coding tree unit, and residual data. A sequence parameter set contains syntax elements that describe decisions made for a sequence, and characteristics of the sequence, associated with the sequence parameter set. A picture parameter set contains syntax elements that describe decisions made for a picture, and characteristics of the picture, associated with the picture parameter set. A slice header contains syntax elements that describe decisions made for a slice, and characteristics of the slice, such as size and positions of the slice within a frame. A reference picture list modification information structure contains syntax elements that indicate which reference pictures are used for inter-picture prediction, which can indicate temporal relationships between content. A syntax structure for slice data contains syntax elements that indicate characteristics of a slice. A syntax structure for macroblock data contains syntax elements that indicate characteristics of a macroblock, such as the type of the macroblock, motion information and reference picture information for an inter-predicted macroblock, and spatial extrapolation direction information for an intra-predicted macroblock. This can provide information about the surroundings of the macroblock, spatially and temporally, and predicted sample values for the macroblock. A syntax structure for residual data contains syntax elements that indicate characteristics of residual coefficients (after prediction to determine predicted values, determination of residual (or difference values), and a frequency transform of the residual values).

For binarization, syntax elements are entropy coded (or represented with flags or other fixed-length codes) and written as a series of binary values in a bitstream. The compressed data in the bitstream can be stored or transmitted. The entropy coding that is used depends on the media compression format. Some media compression formats use different types of entropy coding for different syntax elements and use fixed-length coding for some syntax elements (e.g., syntax elements that are very rare in the bitstream or syntax elements for which possible values are equally probable). Variable-length coding approaches (such as Huffman coding) replace the value of a syntax element with a binary code, with binary codes of shorter length representing values that occur more frequently, and with binary codes of longer length representing values that occur less frequently. Exp-Golomb coding is a computationally simple but effective way to encode values of a syntax element with a geometrically decreasing probability. Arithmetic coding is more computationally complex but can achieve excellent compression rate by exploiting the probabilities for values of different syntax elements in a series, rather than individual syntax elements.

At a high level, decompression of media includes operations for inverse binarization, syntax element recovery, and inverse decorrelation. For inverse binarization, syntax elements are parsed from binary values in a bitstream and entropy decoded (or decoded from flags or other fixed-length codes). Generally, the entropy decoding or fixed-length decoding mirrors encoding performed during compression, with different media compression formats using different types of entropy decoding for different syntax elements or using fixed-length decoding for certain syntax elements. Different types of entropy decoding include variable-length decoding, Exp-Golomb decoding, and arithmetic decoding.

For syntax element retrieval, syntax elements are recovered from the results of inverse binarization. The syntax elements are organized in syntax structures, as described above. As part of decompression, values that have been quantized are inverse quantized to recover approximations of the original values.

Inverse quantization decorrelation operations restore the media by compensating for earlier removal of temporal redundancy, spatial redundancy, and color component redundancy. For most types of media, inverse transform operations (e.g., using an inverse frequency transform) can be performed to recover a set of sample values or residual values. In video decompression, prediction operations such as motion compensation (to exploit motion between frames) and other inter-picture prediction operations can be performed to determine predicted values. For video, images, and other spatial media, prediction operations, such as spatial extrapolation, block copy prediction, and other intra-picture prediction operations can be performed to determine predicted values. Residual values can then be added to predicted values. Inverse color conversion operations (for video or images) or inter-channel prediction (for audio) can also be performed.

In some example implementations, a generative AI model is trained using partially decompressed data for video that has been compressed using the H.264/AVC format. Alternatively, a different video compression format such as H.265/HEVC, H.266/VVC, VC-1, VP9, or AV1 can be used to compress the video. For a different type of media such as audio or images, a media compression format adapted for that type of media is used.

III. Preparing Compressed Data for Use as Input to a Generative AI Model.

This section describes operations performed to prepare compressed data to use as input for a generative AI model. The preparation operations can include operations to parse and decode compressed data, operations to tokenize the input syntax elements, and operations to determine embedding vectors for the input tokens. The generative AI model can be used in a media synthesis tool, media compression tool, media decompression tool, or other type of tool.

In some example implementations, the compressed data is for media that has been compressed according to the H.264/AVC format. For purposes of the generative AI model, syntax elements of the compressed data provide information about patterns in media content. Syntax elements of the compressed data are converted to input tokens for the generative AI model. For example, FIG. 1*a* is a table (100) that shows features of example tokens for syntax elements of a slice header syntax structure according to the H.264/AVC standard. For each of the syntax elements of the slice header syntax structure, an object index indicates the type of syntax structure. In FIG. 1*a*, the value of the object index is 10 for each of the syntax elements in the slice header syntax structure. An element index indicates the type of syntax element within that syntax structure. For some types of syntax elements, a secondary element index indicates a secondary index. For example, secondary element indices of 1 and 2 are used to differentiate the delta_pic_order_cnt[0] and [1] syntax elements. For other types of syntax element, the secondary element index has a value of 0, indicating there is no secondary index. A value index indicates a value of the syntax element between a minimum value and a maximum value. FIG. 1*b* is a table (110) that shows features of example tokens for syntax elements of a macroblock data syntax structure according to the H.264/AVC standard. An input token for a syntax element can be determined using the indices for the syntax element.

A. Example Media Pre-processing Tools.

FIG. 2 shows an example pre-processing tool (200) for processing compressed data to use as input for a generative AI model in a media synthesis tool, media compression tool, or media decompression tool. The pre-processing tool (200) includes a parser/decoder (210) and a tokenizer (220). For reference, FIG. 2 also shows an example generative AI model (230), which accepts the input tokens from the tokenizer (220) and produces predicted tokens.

The parser/decoder (210) is configured to receive compressed data as input and produce input syntax elements as output. The compressed data results from media that has been compressed according to a media compression format. The parser/decoder (210) can perform entropy decoding operations, fixed-length decoding operations, and inverse binarization operations to extract syntax elements from the series of binary values in the compressed data. The syntax elements result from partial decompression of the compressed data—inverse quantization operations typically have not been performed, and inverse decorrelation operations have not been performed using the syntax elements to reconstruct media.

The tokenizer (220) is configured to receive input syntax elements as input and produce input tokens as output. By assigning input tokens to the input syntax elements, the tokenizer (220) constructs a description of the media in an input format for the generative AI model, using a comprehensive vocabulary tailored to the media compression format. The process of converting input syntax elements to input tokens is lossless and exactly reversible. (This characteristic can be exploited when converting predicted tokens to output syntax elements, for reconstruction of output media.)

The generative AI model (230) is configured to receive input tokens as input and produce predicted tokens as output. The generative AI model includes an embedding encoder (232) as well as a multi-layer encoder and/or decoder (234).

Examples of the multi-layer encoder and/or decoder (234) are described in Sections IV and V. This section explains operations of the embedding encoder (232).

The embedding encoder (232) maps an input token from the tokenizer (220) to a vector in a high-dimensional space. The mapping is achieved using an embedding matrix, which is a trainable parameter of the generative AI model (230). The embedding encoder (232) converts the input token into a one-hot vector of dimension V. For example, for an input format in which a token has an object index, element index, and value index, the one hot-vector can include v1 bits for v1 possible values of an object index of the given token, v2 bits for v2 possible values of an element index of the given token, and v3 bits for v3 possible values of a value index of the given token. For an embedding dimension D, the embedding matrix is V×D matrix. The embedding encoder (232) multiplies the one-hot vector by the embedding matrix of dimensions V×D. This produces a given embedding vector of dimension D.

The embedding encoder (232) can also encode position information for the input tokens, respectively. The generative AI model (230) lacks an inherent notion of sequence order. As such, when converting the input tokens to embedding vectors, the embedding encoder (232) can provide the generative AI model (230) with positional context. The embedding encoder (232) can generate the positional encodings with sinusoidal functions. Like the embedding vectors, the positional encodings have dimension D. The embedding encoder (232) can add a positional encoding for a position in a sequence to the embedding vector of the input token at that position, producing an embedding vector that indicates both the meaning of the input token and its position in the sequence. (To help stabilize the magnitude of embedding vectors, the embedding encoder (232) can multiply an embedding vector by a factor of D before adding the positional encoding.)

In some example implementations, positional encodings are applied from the start of each new syntax structure. For example, positional encodings are applied from the start of each new sequence parameter set, picture parameter set, slice header syntax structure, reference picture list modification syntax structure, slice data syntax structure, macroblock data or coding tree unit data syntax structure, prediction data syntax structure, and residual data syntax structure.

B. Example Techniques for Processing Compressed Data to Use as Input for a Generative AI Model.

Figure 3:
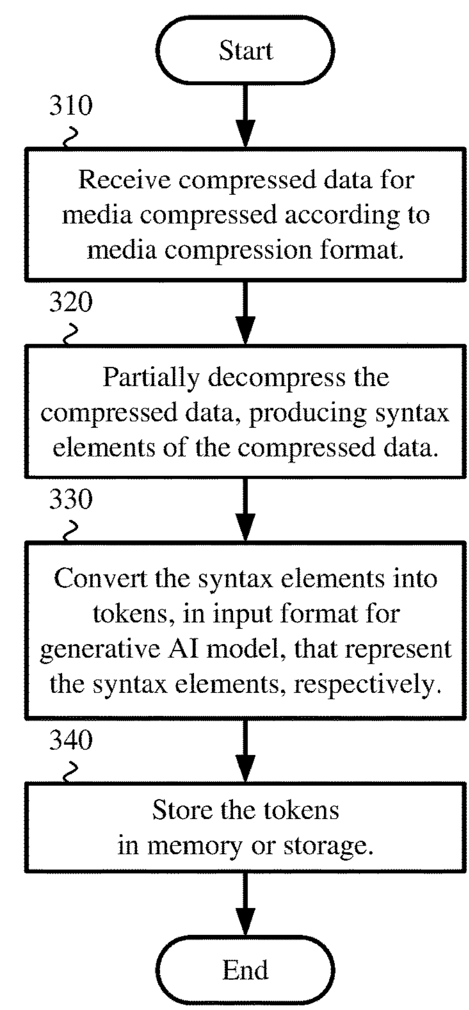
FIG. 3 is a flowchart illustrating an example technique for processing compressed data to use as input for a generative AI model in a media synthesis tool, media compression tool, or media decompression tool.

FIG. 3 shows an example technique (300) for processing compressed data to use as input for a generative AI model in a media synthesis tool, media compression tool, or media decompression tool. A pre-processing tool in a computer system that implements a generative AI model, as described with reference to FIG. 1 or otherwise, can perform the technique (300).

The pre-processing tool receives (310) compressed data for media. For example, the compressed data represents pictures of a video sequence, audio of an audio sequence, an image, or another type of media. The media has been compressed according to a media compression format to produce the compressed data. For example, for video, the media compression format is the H.264/AVC standard, H.265/HEVC standard, H.266/VVC standard, VC-1 standard, VP9 standard, AV1 standard, or another video compression format. For another type of media, the media compression format is a compression format adapted for that type of media.

The pre-processing tool partially decompresses (320) the compressed data. For example, for a given syntax element, the pre-processing tool entropy decodes the given syntax element. The entropy decoding can include context-adaptive binary arithmetic decoding, Exp-Golomb decoding, Golomb-Rice decoding, variable length decoding, or another variation of entropy decoding that inverts previous entropy coding. For a given syntax element that has been encoded as a literal value (e.g., fixed-length code), the pre-processing tool can simply decode the syntax element. If the entropy decoding produces a bit string, the pre-processing tool can inverse binarize the bit string to determine the value of the given syntax element. The partial decompression produces syntax elements of the compressed data according to the media compression format.

The pre-processing tool converts (330) the syntax elements into tokens that represent the syntax elements, respectively (e.g., converts the syntax elements into a sequence of tokens that represent the syntax elements, respectively, with one token representing one syntax element). Unlike the syntax elements (in the media compression format), the tokens are encoded in an input format for the generative AI model. In general, converting the syntax elements into the tokens is a reversible process—the syntax elements are exactly recoverable from the tokens. The generative AI model can be a variation of BLOOM, GPT-4, GPT-4.5, LLaMA, or another generative AI model.

The input format for the generative AI model depends on implementation. For example, for a given syntax element, a given token indicates a syntax structure that includes the given syntax element, a type of the given syntax element, and a value of the given syntax element. For the given token, the pre-processing tool can assign an object index based on the syntax structure that includes the given syntax element, assign an element index based on the type of the given syntax element, and assign a value index based on the value of the given syntax element. Alternatively, the pre-processing tool can assign a single value to the given token based on the syntax structure that includes the given syntax element, the type of the given syntax element, and the value of the given syntax element. Alternatively, a given token has other and/or additional fields.

When converting syntax elements into tokens, the pre-processing tool can process the syntax elements in bitstream order (that is, as the syntax elements appear in an elementary media bitstream. In this case, the tokens are organized as a token sequence in the bitstream order. Typically, the compressed data is organized as syntax structures at different levels of a hierarchy. In this case, as part of the converting, the pre-processing tool traverses the syntax structures, respectively, in bitstream order to produce the sequence of tokens that represent the syntax elements in the syntax structures.

The pre-processing tool stores (340) the tokens in memory or storage, such that the tokens may be provided as input to a generative AI model for subsequent processing in which the generative AI model generates predicted tokens, which can represent output syntax elements of compressed data for media such as video, audio, or an image in various usage scenarios, as described below. The storage can be temporary. Eventually, the tokens are provided as input to a generative AI model. The generative AI model can process the tokens in various ways, depending on usage scenario. For example, as described in Section IV, in a training iteration of a training process, a media synthesis tool can provide input tokens (representing input syntax elements for input media) to a generative AI model, receive predicted tokens (representing output syntax elements, respectively, of compressed data for output media) from the generative AI model, determine a measure of loss based at least in part on the predicted tokens, and update one or more parameters of the generative AI model based at least in part on the measure of loss. Or, as another example, as described in Section IV, as part of a media synthesis process, a media synthesis tool can provide input tokens (representing input syntax elements for input media) to a generative AI model, receive predicted tokens (representing output syntax elements of compressed data for output media) from the generative AI model, and reconstruct the output media from the predicted tokens. Or, as another example, as described in Section V, in a training iteration of a training process, a media compression tool can provide first input tokens (representing first input syntax elements for a first, higher-resolution version of input media) and second input tokens (representing second input syntax elements for a second, lower-resolution version of the input media) to a generative AI model, receive predicted tokens (representing output syntax elements of compressed data for output media) from the generative AI model, determine a measure of loss based at least in part on the predicted tokens, and update one or more parameters of the generative AI model based at least in part on the measure of loss. Or, as another example, as described in Section V, as part of a media compression process, a media compression tool can provide input tokens (representing input syntax elements for a second, lower-resolution version of input media, which approximates a first, higher-resolution version of the input media) to a generative AI model, receive predicted tokens (representing output syntax elements of compressed data for output media) from the generative AI model, reconstruct the output media from the predicted tokens, determine differences between the first version and the output media, compress the differences, and output compressed data for the differences for decompression as an augmentation stream. Or, as another example, as described in Section V, as part of a media decompression process, a media decompression tool can provide input tokens (representing input syntax elements for a second, lower-resolution version of input media, which approximates a first, higher-resolution version of the input media) to a generative AI model, receive predicted tokens (representing output syntax elements of compressed data for output media) from the generative AI model, and reconstruct the output media from the predicted tokens. Alternatively, the generative AI model can process the tokens in some other way.

The generative AI model can convert the tokens into embedding vectors. For example, for a given token, the generative AI model converts the given token into a one-hot vector of dimension V. The generative AI model multiplies the one-hot vector by an embedding matrix of dimensions V×D. This produces a given embedding vector of dimension D.

The generative AI model can also encode positions of the tokens. For a given token, the generative AI model can determine a position encoding of the given token (e.g., using one or more sinusoidal functions) and update the embedding vector for the given token to incorporate the position encoding of the given token. In doing so, the generative AI model can scale the embedding vector by a scaling factor that depends on the dimension D (of the embedding vector) and add the position encoding to the scaled embedding vector.

FIG. 3 shows operations in a series. In practice, a preprocessing tool can repeat the operations shown in FIG. 3 on a fine-grained basis (e.g., per syntax structure in compressed data) and/or on a pipelined basis.

C. Innovative Features.

The following table shows some of the innovative features described herein for processing compressed data for input to a generative AI model.

| | Features |
|---|---|
| A1 | In a computer system that implements a generative artificial intelligence ("AI") model, a method comprising: receiving compressed data for media, the media having been compressed according to a media compression format to produce the compressed data; partially decompressing the compressed data, thereby producing syntax elements of the compressed data according to the media compression format; converting the syntax elements into tokens that represent the syntax elements, respectively, wherein the tokens are encoded in an input format for the generative AI model, and wherein, for a given syntax element among the syntax elements, a given token among the tokens indicates a syntax structure that includes the given syntax element, a type of the given syntax element, and a value of the given syntax element; and storing the tokens in memory or storage. |
| A2 | The method of A1, wherein the partially decompressing the compressed data includes, for the given syntax element: entropy decoding the given syntax element, wherein the entropy decoding includes context-adaptive binary arithmetic decoding, Exp-Golomb decoding, Golomb-Rice decoding, or variable length decoding; and if the entropy decoding produces a bit string, inverse binarizing the bit string to determine the value of the given syntax element. |
| A3 | The method of A1, wherein the converting the syntax elements into the tokens processes the syntax elements in bitstream order, and wherein the tokens are organized as a token sequence in the bitstream order. |
| A4 | The method of A1, wherein the given token has an object index, an element index, and a value index, and wherein the converting includes, for the given token: assigning the object index based on the syntax structure that includes the given syntax element; assigning the element index based on the type of the given syntax element; and assigning the value index based on the value of the given syntax element. |
| A5 | The method of A1, wherein the converting includes, for the given token, assigning a value to the given token based on the syntax structure that includes the given syntax element, the type of the given syntax element, and the value of the given syntax element. |
| A6 | The method of A1, wherein the converting the syntax elements into the tokens is a reversible process, such that the syntax elements are exactly recoverable from the tokens. |

-continued

| | Features |
|---|---|
| A7 | The method of A1, wherein the compressed data is organized as syntax structures at different levels of a hierarchy, and wherein the converting includes traversing the syntax structures, respectively, in bitstream order. |
| A8 | The method of A1, further comprising converting the tokens into embedding vectors, including, for the given token: converting the given token into a one-hot vector of dimension V; and multiplying the one-hot vector by an embedding matrix of dimensions V × D, thereby producing a given embedding vector, among the embedding vectors, of dimension D. |
| A9 | The method of A8, wherein the one-hot vector includes v1 bits for v1 possible values of an object index of the given token, v2 bits for v2 possible values of an element index of the given token, and v3 bits for v3 possible values of a value index of the given token. |
| A10 | The method of A8, further comprising encoding positions of the tokens, including, for the given token: determining a position encoding of the given token; and updating the given embedding vector to incorporate the position encoding of the given token. |
| A11 | The method of A10, wherein the determining the position encoding of the given token uses one or more sinusoidal functions, and wherein the updating the given embedding vector to incorporate the position encoding of the given token includes: scaling the given embedding vector by a scaling factor that depends on dimension D of the embedding vectors; and adding the position encoding to the scaled given embedding vector. |
| A12 | The method of A1, wherein the tokens are input tokens that represent input syntax elements, and wherein the media is input media, the method further comprising: providing, to the generative AI model, the input tokens; receiving, from the generative AI model, predicted tokens that represent output syntax elements, respectively, of compressed data for output media; and reconstructing the output media from the predicted tokens. |
| A13 | The method of A1, wherein the tokens are input tokens that represent input syntax elements, and wherein the media is input media, the method further comprising, as part of training the generative AI model: providing, to the generative AI model, the input tokens; receiving, from the generative AI model, predicted tokens that represent output syntax elements, respectively, of compressed data for output media; determining a measure of loss based at least in part on the predicted tokens; and updating one or more parameters of the generative AI model based at least in part on the measure of loss. |
| A14 | The method of A1, wherein the tokens are input tokens that represent input syntax elements, for a second version of input media, wherein the second version approximates a first version of the input media, the first version having a first resolution, the second version having a second resolution lower than the first resolution, and wherein the media is the second version of the input media, the method further comprising: providing, to the generative AI model, the input tokens; receiving, from the generative AI model, predicted tokens that represent output syntax elements, respectively, of compressed data for output media at the first resolution; reconstructing the output media from the predicted tokens; determining differences between the first version and the output media; compressing the differences, thereby producing compressed data for the differences; and outputting the compressed data for the differences for decompression as an augmentation stream. |
| A15 | The method of A1, wherein the tokens are first input tokens that represent first input syntax elements, for a first version of input media, and second input tokens that represent second input syntax elements, for a second version of the input media, and the media is the first version or the second version of the input media, the method further comprising, as part of training the generative AI model: providing, to the generative AI model, the first input tokens and the second input tokens; receiving, from the generative AI model, predicted tokens that represent output syntax elements, respectively, of compressed data for output media at the first resolution; determining a measure of loss based at least in part on the predicted tokens; and updating one or more parameters of the generative AI model based at least in part on the measure of loss. |
| A16 | The method of A1, wherein the tokens are input tokens that represent input syntax elements, for a second version of input media, wherein the second version approximates a first version of the input media, the first version having a first resolution, the second version having a second resolution lower than the first resolution, and wherein the media is the second version of the input media, the method further comprising: providing, to the generative AI model, the input tokens; receiving, from the generative AI model, predicted tokens that represent output syntax elements, respectively, of compressed data for output media at the first resolution; and reconstructing the output media from the predicted tokens. |
| A17 | The method of any one of A1-A16, wherein the compressed data represents pictures of a video sequence, audio of an audio sequence, or an image. |
| A18 | The method of any one of A1-A16, wherein the media compression format is the H.264/AVC standard, H.265/HEVC standard, H.266/VVC standard, VC-1 standard, VP9 standard, or AV1 standard. |
| A19 | The method of any one of A1-A16, wherein the generative AI model is a variation of BLOOM, GPT-4, GPT-4.5, or LLaMA. |

-continued

| | Features |
|---|---|
| A20 | One or more computer-readable media having stored thereon computer-executable instructions for causing a processor system, when programmed thereby, to perform operations for the method of any one of A1-A16. |
| A21 | A computer system comprising a processor system and memory, wherein the computer system is configured to perform operations for the method of any one of A1-A16. |

IV. Using Partially Decompressed Data as Input to a Generative AI Model for Media Synthesis.

This section describes operations performed to synthesize media using a generative AI model that accepts, as input, partially decompressed data. For example, a generative AI model accepts, as input, input tokens that represent syntax elements for one or more frames of input video. Based on the input, the generative AI model can generate predicted tokens that represent syntax elements for multiple frames of output video. In some examples, this enables the generation of seamless, coherent output video that maintains context similar to the input video.

A. Example Media Synthesis Tools.

Figure 4A:
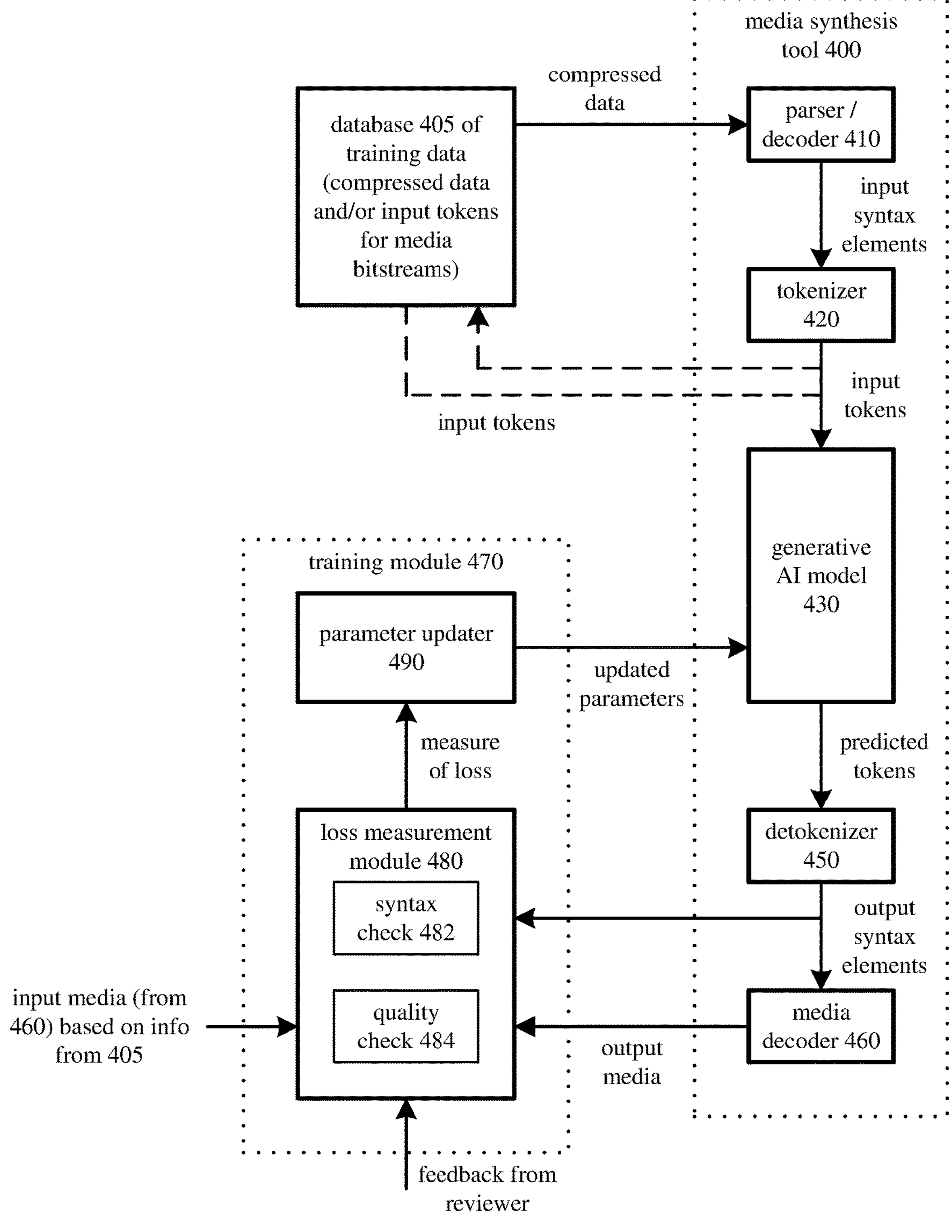
FIG. 4*a* is a diagram illustrating an example training environment for a generative AI model that uses partially decompressed data as input and synthesizes media.

FIG. 4*a* shows an example training environment for a generative AI model that uses partially decompressed data as input for media synthesis. In general, the training environment implements principles used to train generative AI models such as large language models, but there some differences in processing of data for input, determination of loss measures during training, and fine-tuning operations during training.

The example training environment includes a media synthesis tool (400), database (405), and training module (470). The training process can consume significant computational resources. As such, the training environment is typically implemented in a system with extensive available resources, such as a server or cloud computing center.

The database (405) is configured to store information about input media to use as training data. The database (405) can store examples (e.g., clips) of input media in raw form, compressed data in media bitstreams for the examples of input media, and/or input tokens, which represent syntax elements of the compressed data in media bitstreams for the examples of input media. The input media can be frames of video, audio of an audio sequence, images, or another type of media. In some example implementations, the database (405) stores a diverse range of video clips.

Typically, each of the examples of input media has been compressed according to a media compression format. The media compression format is a compression format adapted for the type of media. In some example implementations, to simplify the training process, the examples of input media are compressed with the same media compression format and, within that media compression format, the same compression profile. As such, the same set of tools is used for compression for each of the examples of input media. Moreover, to simplify the training process, the examples of input media have the same temporal resolution (frame rate for video) and spatial resolution. To further simplify the training process, the same compression settings can be used to compress the examples of input media (e.g., for video, the same number of slices per frame; the same overall quality or bitrate setting; the same hierarchy of inter-picture prediction relationships for I frames, P frames, and B frames; the same distance between instantaneous decoder refresh frames; the same count of available reference pictures). Compressed data for an example of input media in a different media compression format (or compression profile, or resolution, or compression settings) can be transcoded to the same media compression format (or compression profile, or resolution, or compression settings) as other examples. Compressed data (or input tokens) for an example of input media can be stored in a file with metadata indicating the file name, resolution of the input media, and genre. (Training a generative AI model using input media of the same genre can improve training of the generative AI model for that genre.)

The media synthesis tool (400) includes a parser/decoder (410), a tokenizer (420), a generative AI model (430), a detokenizer (450), and a media decoder (460). The parser/decoder (410) and tokenizer (420) are configured to perform operations to prepare input for the generative AI model (430) (unless the database (405) provides input tokens directly to the generative AI model (430)). The generative AI model (430), detokenizer (450), and media decoder (460) are configured to work with the loss measurement module (480) and parameter updater (490) of the training module (470) during the training process.

The parser/decoder (410) is configured to receive compressed data from the database (405) and partially decompress the compressed data. In some example implementations, the parser/decoder (410) is configured to perform operations for entropy decoding, fixed-length decoding, and inverse binarization. More generally, the parser/decoder (410) can be configured to perform partial decompression operations as described in section III. This produces syntax elements according to a media compression format.

The tokenizer (420) is configured to receive the syntax elements from the parser/decoder (410) and convert the syntax elements into input tokens. In general, the tokenizer (420) can be configured to perform tokenization operations as described in section III. The input tokens (or predicted tokens in later stages) can be converted to corresponding syntax elements in a "lossless" way—the tokenization process is exactly reversible. The tokenizer (420) can be configured to provide input tokens back to the database (405) for storage.

The generative AI model (430) is configured to receive input tokens (from the database (405) or the tokenizer (420)) and determine predicted tokens based on the input tokens. The predicted tokens represent syntax elements of output media. FIG. 4*c* shows an example generative AI model in some example implementations. Alternatively, the generative AI model is implemented in some other way. The generative AI model (430) can be configured to accept input tokens on a frame-by-frame basis. That is, the block size is equal to the amount of data in one frame. Frame boundaries can be detected from input tokens that represent particular syntax elements (e.g., an indicator of a first slice of a frame).

For purposes of providing feedback during training, the detokenizer (450) is configured to convert the predicted tokens into syntax elements for output media, and the media decoder (460) is configured to decode the syntax elements for output media, producing a reconstructed version of the output media. The media decoder (460) can be a modified version of a conventional media decoder for the media compression format, with modifications to bypass or omit entropy decoding, fixed-length decoding, and inverse binarization operations.

The loss measurement module (480) of the training module (470) is configured to received feedback from the detokenizer (450) and media decoder (460). The loss measurement module (480) can be configured to determine one or more measures of loss.

For example, as part of a syntax check (482), the loss measurement module (480) is configured to determine a measure of conformity of the predicted tokens (from the generative AI model (430)) to syntax of the media compression format. To determine the measure of conformity, the loss measurement module (480) can be configured to measure syntax errors in output syntax elements for the predicted tokens. For example, the loss measurement module (480) can be configured to provide the output syntax elements to the media decoder (460) and assess feedback from the media decoder (460) (e.g., counting syntax errors, evaluating severity of syntax errors).

In some example implementations, the loss measurement module (480) is configured to determine the measure of conformity during an initial stage of training, which typically includes multiple training iterations. The initial stage of training produces a base version of the generative AI model that can generate predicted tokens for compressed data that conforms to the syntax of the media compression format.

As another example, as part of a quality check (484), the loss measurement module (480) is configured to determine a measure based on quality of output media reconstructed from the predicted tokens. The loss measurement module (480) can be configured to receive (from the media decoder (460)) a reconstructed version of the output media, receive (from the media decoder (460)) a reconstructed version of the input media (or reconstruct a version of the input media), and render the reconstructed versions of the output media and input media. The loss measurement module (480) can be further configured to receive feedback from a reviewer that ranks or rates the reconstructed version of the output media (e.g., in terms of artifacts or other indicators of quality; in relation to the input media). The feedback can provide a "reward" signal for reinforcement learning.

In some example implementations, the loss measurement module (480) is configured to determine the measure of based on quality during a subsequent stage of training, typically includes multiple training iterations. The subsequent stage of training produces a refined version of the generative AI model that can generate predicted tokens for compressed data that conforms to the syntax of the media compression format and also yields output media similar and related to the input media.

The parameter updater (490) of the training module (470) is configured to provide parameter updates for the generative AI model (430). Depending on implementation, the parameters that are updated can include embedding matrices, linear projections, weights and offsets of neural networks, and other parameters, as described below. To handle large volumes of input effectively, the training process can use large batch sizes and/or gradient accumulation.

In some example implementations, the training module (470) uses a policy optimization method (such as proximal policy optimization) or other form of reinforcement learning to train the generative AI model (430) in the subsequent stage of training. As in standard reinforcement learning, an agent takes actions in the training environment and receives rewards. The goal of the reinforcement learning is to adjust a policy, which determines the actions, to maximize cumulative rewards. In the training environment of FIG. 4*a*., the "action" is the predicted tokens for output media, and the "reward" is a rating given by a reviewer. The parameter updater (490) adjusts the parameters of the generative AI model (430) to maximize expected rewards (here, synthesized media that reviewers rate highly).

More generally, the training module (470) can use reinforcement learning from human feedback ("RLHF") to fine-tune the generative AI model (430). RLHF can enable the training module (470) to align responses of the generative AI model (430) more closely with complex, subjective human preferences. Basically, human reviewers evaluate the output media reconstructed from predicted tokens generated by the generative AI model (430) for various inputs. The reviewers provide rankings or ratings that reflect the quality and appropriateness of the output media, given the inputs. This feedback from the reviewers is used in a reward model, essentially training the generative AI model (430) to generate predicted tokens that human reviewers will rate positively.

Figure 4B:
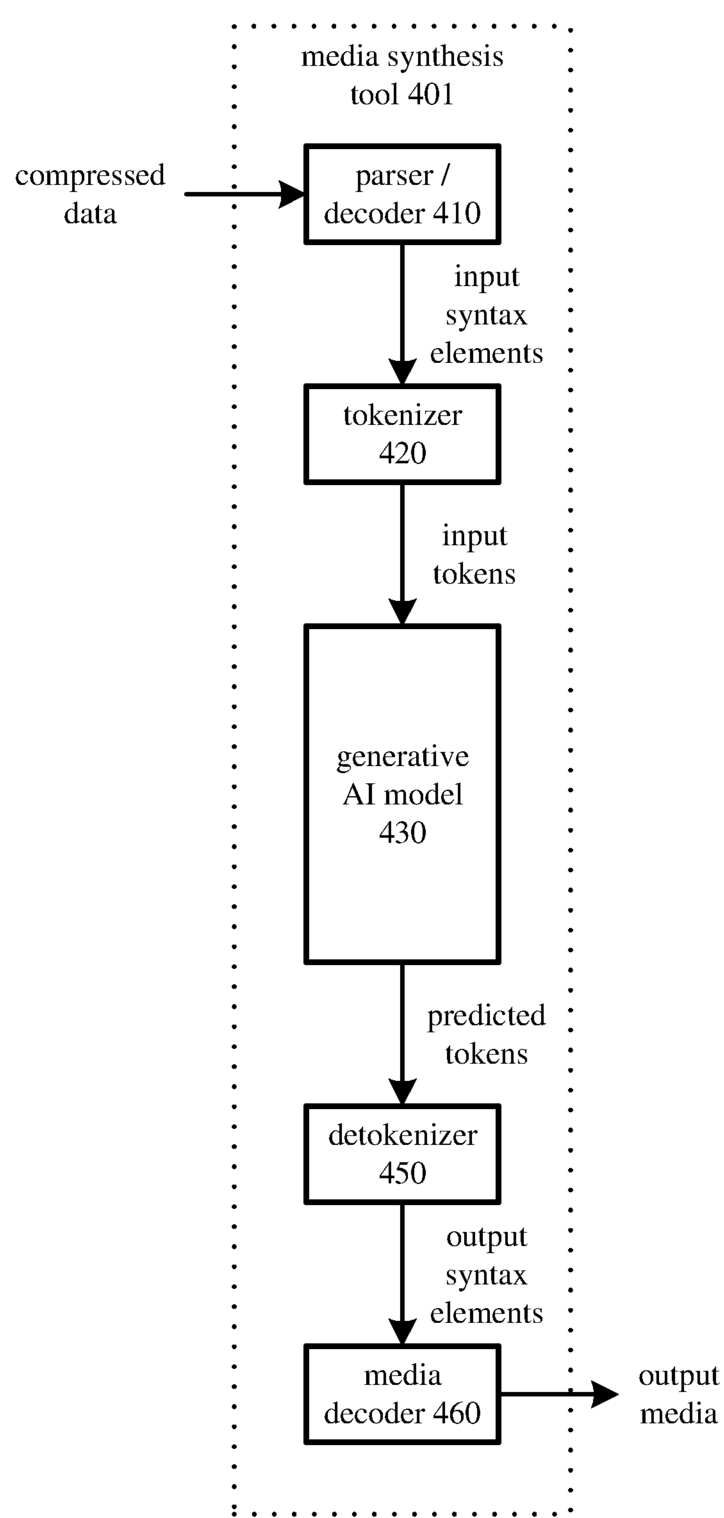
FIG. 4*b* is a diagram illustrating an example media synthesis tool including a generative AI model that uses partially decompressed data as input.
Figure 4C:
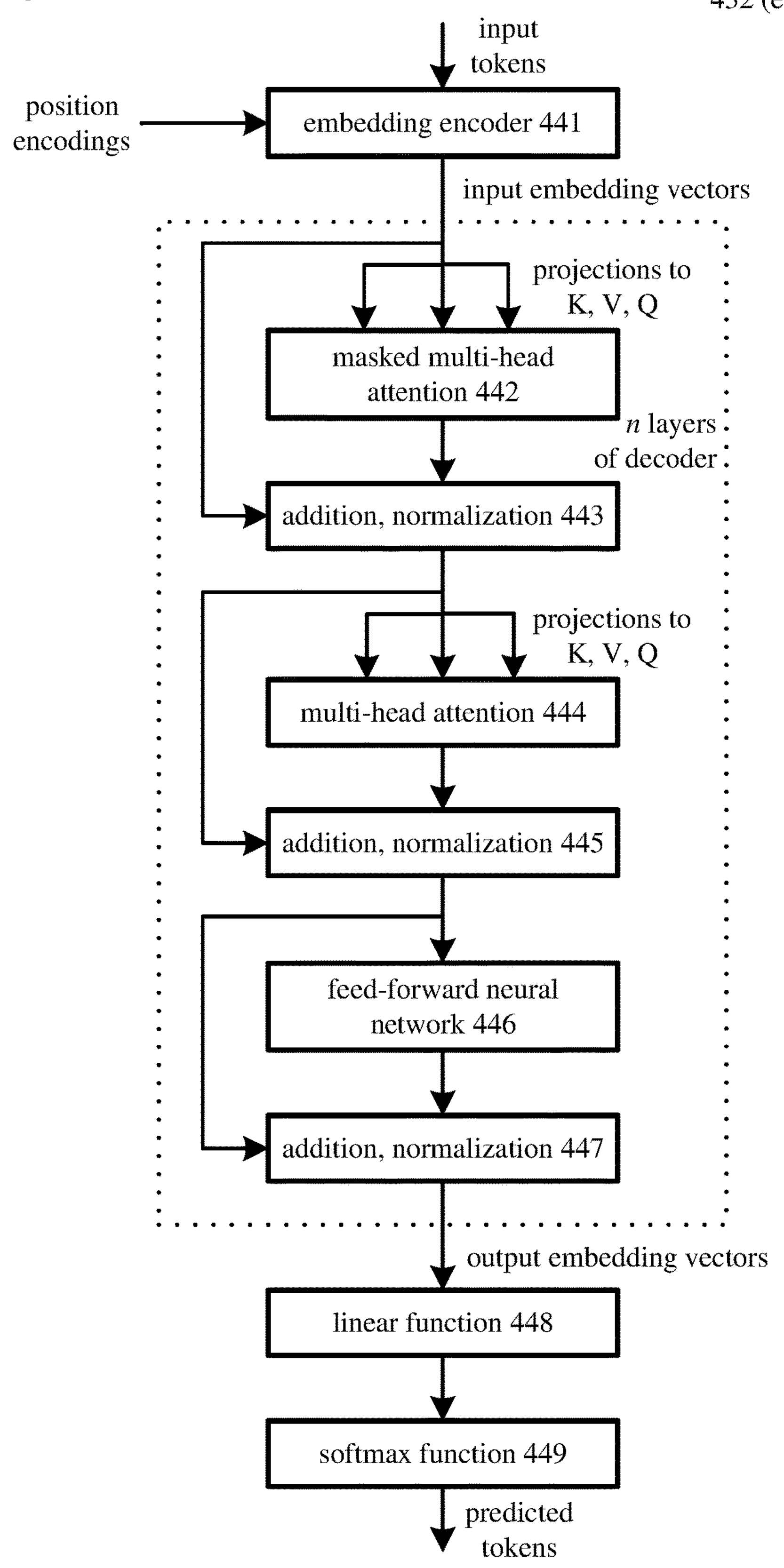
FIG. 4*c* is a diagram illustrating an example generative AI model for a media synthesis tool.

FIG. 4*b* shows an example media synthesis tool (401) including a generative AI model that uses partially decompressed data as input. Compared to the training process explained with reference to FIG. 4*a*, the process of synthesizing media using a trained generative AI model consumes fewer computational resources. As such, the media synthesis tool can be implemented in a computing device such as a desktop computer, laptop computer, or mobile device.

The media synthesis tool (401) includes a parser/decoder (410), tokenizer (420), generative AI model (430), detokenizer (450), and media decoder (460) that are configured to perform operations as described with reference to FIG. 4*a*. The parser/decoder (410) is configured to receive compressed data for input media and partially decompress the compressed data. The tokenizer (420) is configured to receive the syntax elements from the parser/decoder (410) and convert the syntax elements into input tokens. The generative AI model (430) is configured to receive input tokens (from the tokenizer (420)) and determine predicted tokens based on the input tokens. The predicted tokens represent syntax elements of output media. Whereas the generative AI model (430) in FIG. 4*a* is being trained (with parameters updated in training iterations), the generative AI model (430) shown in FIG. 4*b* has been trained (parameters have been set). The detokenizer (450) is configured to convert the predicted tokens into syntax elements for output media, and the media decoder (460) is configured to decode the syntax elements for output media, producing a reconstructed version of the output media.

FIG. 4*c* shows an example generative transformer (432), which is configured to process input tokens to determine predicted tokens. The example generative transformer (432) can be used in the training environment shown in FIG. 4*a* or in the media synthesis tool shown in FIG. 4*b*. The generative transformer (432) includes multiple layers of a decoder but does not include a corresponding encoder. As such, compared to a conventional generative transformer that provides feedback from an encoder to a multi-head attention sub-layer of a decoder, the multi-head attention sub-layer of the decoder accepts only output from a masked multi-head attention sub-layer of the decoder.

The generative transformer (432) includes an embedding encoder (441), multiple layers of a decoder, a linear function (448), and a softmax function (449). The number n of layers of the decoder depends on implementation. For example, n is 6 or another count of layers.

The embedding encoder (441) is configured to convert the input tokens into input embedding vectors. For example, for a given input token, the embedding encoder (441) can convert the given input token into a one-hot vector of dimension V, then multiply the one-hot vector by an embedding matrix of dimensions V×D. This produces a given input embedding vector of dimension D. The embedding encoder (441) can also be configured to encode positions of the input tokens. In this case, updated versions of the input embedding vectors incorporate position encodings. For example, for a given input token, the embedding encoder can determine a position encoding of the given input token and update the given input embedding vector (for the given input token) to incorporate the position encoding of the given input token. Alternatively, the embedding encoder (441) is configured to convert the input tokens into input embedding vectors in some other way.

Using the n layers of the decoder, the generative transformer (432) is configured to determine output embedding vectors based on the input embedding vectors. In FIG. 4*c*, each of the n layers of the decoder includes a masked multi-head attention sub-layer, a multi-head attention sub-layer, and a feed-forward neural network sub-layer.

The masked multi-head attention sub-layer is configured to accept, as input to a masked multi-head attention function, keys, queries, and values based on linear projections of the input embedding vectors. The masked multi-head attention sub-layer is configured to produce, as output, normalized results from the masked multi-head attention function. In particular, the masked multi-head attention sub-layer includes a masked multi-head attention function (442) as well as an addition and normalization function (443). Linear projections of the input embedding vector for the layer produce keys, queries, and values. The masked multi-head attention function (442) accepts, as input, the keys, queries, and values. In the addition and normalization function (443), the output of the masked multi-head attention function (442) is added to the input embedding vector (before the linear projections), and the result of the addition is normalized.

The multi-head attention sub-layer is configured to accept, as input to a multi-head attention function, keys, queries, and values based on linear projections of the output of the masked multi-head attention sub-layer. The multi-head attention sub-layer is configured to produce, as output, normalized results from the multi-head attention function. In particular, the multi-head attention sub-layer includes a multi-head attention function (444) as well as an addition and normalization function (445). Linear projections of the output of the masked multi-head attention sub-layer produce keys, queries, and values. The multi-head attention function (444) accepts, as input, the keys, queries, and values. In the addition and normalization function (445), the output of the multi-head attention function (444) is added to the output of the masked multi-head attention sub-layer (before the linear projections), and the result of the addition is normalized.

The feed-forward neural network sub-layer is configured to accept, as input, the output of the multi-head attention sub-layer. The feed-forward neural network sub-layer is configured to produce, as output, the output embedding vectors. In particular, the feed-forward neural network sub-layer includes a feed-forward neural network (446) as well as an addition and normalization function (447). The feed-forward neural network (446) accepts, as input, the output of the multi-head attention sub-layer. In the addition and normalization function (447), the output of the feed-forward neural network (446) is added to the output of the multi-head attention sub-layer, and the result of the addition is normalized.

With the linear function (448) and softmax function (449), the generative transformer (432) is configured to convert the output embedding vectors into the predicted tokens. In particular, for a given predicted token, using the linear function (448), the generative transformer (432) can determine a one-hot vector of dimension V from a given output embedding vector of dimension D. For example, the generative transformer (432) can multiply the given output embedding vector by an embedding matrix of dimensions D×V. Then, for the given predicted token, using the softmax function (449), the generative transformer (432) can determine the given predicted token from the one-hot vector.

Alternatively, the generative AI model (430) in the training environment shown in FIG. 4*a* or in the media synthesis tool shown in FIG. 4*b* can be implemented in some other way. For example, the generative AI model (430) is based on a masked transformer as described in Chang et al., "Maskgit: Masked Generative Image Transformer," arXiv:2202.04200 (2022) or Villegas et al., "Phenaki: Variable Length Video Generation from Open Domain Textual Descriptions," arXiv:2210.02399v1 [cs.CV](2022).

B. Example Techniques for Training a Generative AI Model for Media Synthesis.

FIG. 5 shows an example technique (500) for training a generative AI model for media synthesis, where the generative AI model uses partially decompressed data as input. A media synthesis tool in a computer system that implements a generative AI model, as described with reference to FIG. 4*a* or otherwise, can perform the technique (500).

To start, the computer system identifies (510) a set of training data. The set of training data can include, for each of multiple examples (e.g., clips) of input media, input tokens that represent input syntax elements, respectively, of compressed data for that example of input media. For example, the compressed data represents pictures of a video sequence, audio of an audio sequence, an image, or another type of media. Each of the multiple examples of input media has been compressed according to the media compression format. For example, for video, the media compression format is the H.264/AVC standard, H.265/HEVC standard, H.266/VVC standard, VC-1 standard, VP9 standard, AV1 standard, or another video compression format. For another type of media, the media compression format is a compression format adapted for that type of media.

In some example implementations, each of the multiple examples of input media has been compressed using a common set of compression settings and a common profile of the media compression format. Moreover, each of the multiple examples of input media has a common resolution. Controlling the compression settings, compression profile, and resolution for different examples of input media can help train the generative AI model more effectively, since the generative AI model can focus on identifying other differences between the examples of input media.

The computer system trains the generative AI model in multiple training iterations using the set of training data. The generative AI model can be a variation of BLOOM, GPT-4, GPT-4.5, LLaMA, or another generative AI model. The computer system checks (520) whether to continue in another iteration of training. If so, the computer system performs various operations for the next training iteration.

For a given training iteration, if input tokens have not yet been generated for compressed data for input media, the computer system receives the compressed data for the input media. The computer system partially decompresses the compressed data for the input media. For example, the computer system performs partial decompression operations as described in section III. This produces input syntax elements according to a media compression format. The computer system then converts the input syntax elements into input tokens. For example, the computer system performs tokenization operations as described in section III.

As shown in FIG. 5, the computer system receives (530) input tokens that represent input syntax elements, respectively, of compressed data for input media. The input media has been compressed according to a media compression format to produce the compressed data for the input media. The input tokens are encoded in an input format for the generative AI model. In some example implementations, for a given input syntax element, a given input token indicates a syntax structure that includes the given input syntax element, a type of the given input syntax element, and a value of the given input syntax element. Alternatively, the input tokens are encoded in another format.

The computer system provides (540) the input tokens to the generative AI model. In some example implementations, the computer system partitions the input tokens into blocks that correspond to frames of the input media. For example, the computer system can detect frame boundaries by scanning for an input token associated with a particular type of syntax element (e.g., a syntax element that indicates the first slice of a frame). The computer system provides the input tokens to the generative AI model on a block-by-block basis for the frames, respectively, of the input media.

The generative AI model processes the input tokens to determine predicted tokens. For example, the generative AI model converts the input tokens into input embedding vectors. Based on the input embedding vectors, the generative AI model determines output embedding vectors using multiple layers of a decoder of the generative AI model. The generative AI model converts the output embedding vectors into the predicted tokens. Such operations of the generative AI model are explained with reference to FIG. 4*c*. Alternatively, the generative AI model processes the input tokens in some other way to determine the predicted tokens.

With reference to FIG. 5, for the given training iteration, the computer system receives (550) predicted tokens from the generative AI model. The predicted tokens represent output syntax elements, respectively, of compressed data for output media. In some example implementations, for a given output syntax element, a given predicted token indicates a syntax structure that includes the given output syntax element, a type of the given output syntax element, and a value of the given output syntax element. Alternatively, the predicted tokens are encoded in another format.

The computer system determines (560) a measure of loss based at least in part on the predicted tokens. The computer system can determine the measure of loss in any of several ways.

For example, the computer system determines a measure of conformity of the predicted tokens to syntax of the media compression format. To determine the measure of conformity, the computer system can convert the predicted tokens to the output syntax elements, respectively, in the media compression format, and then measure syntax errors in the output syntax elements. Alternatively, the computer system can determine the measure of conformity in some other way. In any case, the measure of conformity of the predicted tokens to syntax of the media compression format quantifies loss in terms of deviations from the syntax of the media compression format.

Or, as another example, the computer system determines a measure based on quality of output media reconstructed from the predicted tokens. The computer system reconstructs the output media from the predicted tokens. To do so, the computer system can convert the predicted tokens to the output syntax elements, respectively, in the media compression format, and then decompress the output syntax elements using a media decoder for the media compression format. The computer system determines, based on feedback from a reviewer, a rating of the output media. The rating of the output media quantifies loss in terms of compression artifacts and/or consistency with the input media.

Or, as another example, the computer system determines different measures of loss in different stages of training. In training iterations of an initial stage, the computer system determines a measure of conformity of the predicted tokens to syntax of the media compression format, which quantifies loss in terms of deviations from the syntax of the media compression format. The training in the initial stage can produce a base version of the generative AI model that generates predicted tokens that are conformant to the media compression format. Then, in training iterations of a fine-tuning stage that follows the initial stage, the computer system determines a rating of output media reconstructed from the predicted tokens, where the rating quantifies loss in terms of compression artifacts and/or consistency with the input media. The training in the fine-tuning stages can produce a refined version of the generative AI model that generates predicted tokens that are conformant to the media compression format and yields output media with lower loss in terms of compression artifacts and/or consistency with input media.

With reference to FIG. 5, for the given training iteration, the computer system (570) updates one or more parameters of the generative AI model based at least in part on the measure of loss. For example, the parameters of the generative AI model include an embedding matrix (for determining input embedding vectors from input tokens and/or for determining predicted tokens from output embedding vectors), linear projections (for determining inputs to multi-head attention sub-layers of a generative AI model), weights and offsets (for feed-forward neural networks of the generative AI model), and/or parameters of a softmax function (of the generative AI model). Alternatively, the parameters of the generative AI model include other and/or additional parameters. When the measure of a loss for the given training iteration is a rating of output media, the rating can be used as a reward signal for reinforcement learning, in which case the updating the parameter(s) of the generative AI model adjusts a policy of the reinforcement learning.

The computer system checks (520) whether to continue in another iteration of training. In this way, the computer system can train the generative AI model using multiple training iterations for different batches (subsets) of input data in the identified training set, for an epoch (a pass through the data in the training set). The overall training process can repeat for multiple epochs until a stopping criterion is satisfied (e.g., the calculated measure of loss is below a threshold, or the parameters of the generative AI model have converged).

C. Example Techniques for Synthesizing Media Using a Generative AI Model.

FIG. 6 shows an example technique (600) for synthesizing media with a generative AI model that uses partially decompressed data as input. A media synthesis tool in a computer system that implements a generative AI model, as described with reference to FIG. 4*b* or otherwise, can perform the technique (600).

If input tokens have not yet been generated for compressed data for input media, the computer system receives the compressed data for the input media. For example, the compressed data represents pictures of a video sequence, audio of an audio sequence, an image, or another type of media. The computer system partially decompresses the compressed data for the input media. For example, the computer system performs partial decompression operations as described in section III. This produces input syntax elements according to a media compression format. The computer system then converts the input syntax elements into input tokens. For example, the computer system performs tokenization operations as described in section III.

As shown in FIG. 6, the computer system receives (610) input tokens that represent input syntax elements, respectively, of compressed data for input media. The input media has been compressed according to a media compression format to produce the compressed data for the input media. For example, for video, the media compression format is the H.264/AVC standard, H.265/HEVC standard, H.266/VVC standard, VC-1 standard, VP9 standard, AV1 standard, or another video compression format. For another type of media, the media compression format is a compression format adapted for that type of media.

The input tokens are encoded in an input format for the generative AI model. The generative AI model can be a variation of BLOOM, GPT-4, GPT-4.5, LLaMA, or another generative AI model. In some example implementations, for a given input syntax element, a given input token indicates a syntax structure that includes the given input syntax element, a type of the given input syntax element, and a value of the given input syntax element. Alternatively, the input tokens are encoded in another format.

The computer system provides (620) the input tokens to the generative AI model. In some example implementations, the computer system partitions the input tokens into blocks that correspond to frames of the input media. For example, the computer system can detect frame boundaries by scanning for an input token associated with a particular type of syntax element (e.g., a syntax element that indicates the first slice of a frame). The computer system provides the input tokens to the generative AI model on a block-by-block basis for the frames, respectively, of the input media.

The generative AI model processes the input tokens to determine predicted tokens. For example, the generative AI model converts the input tokens into input embedding vectors. Based on the input embedding vectors, the generative AI model determines output embedding vectors using multiple layers of a decoder of the generative AI model. The generative AI model converts the output embedding vectors into the predicted tokens. Such operations of the generative AI model are explained with reference to FIG. 4*c*. Alternatively, the generative AI model processes the input tokens in some other way to determine the predicted tokens.

With reference to FIG. 6, the computer system receives (630) predicted tokens from the generative AI model. The predicted tokens represent output syntax elements, respectively, of compressed data for output media. In some example implementations, for a given output syntax element, a given predicted token indicates a syntax structure that includes the given output syntax element, a type of the given output syntax element, and a value of the given output syntax element. Alternatively, the predicted tokens are encoded in another format.

The computer system reconstructs (640) the output media from the predicted tokens. For example, the computer system converts the predicted tokens to the output syntax elements, respectively, in the media compression format, and then decompresses the output syntax elements using a media decoder for the media compression format.

D. Innovative Features.

The following table shows some of the innovative features described herein for media synthesis using a generative AI model that accepts, as input, partially decompressed data.

| | Features |
|---|---|
| B1 | In a computer system that implements a generative artificial intelligence ("AI") model, a method of synthesizing media, the method comprising: receiving input tokens that represent input syntax elements, respectively, of compressed data for input media, the input media having been compressed according to a media compression format to produce the compressed data for the input media, wherein the input tokens are encoded in an input format for the generative AI model; providing, to the generative AI model, the input tokens; receiving, from the generative AI model, predicted tokens that represent output syntax elements, respectively, of compressed data for output media; and reconstructing the output media from the predicted tokens. |
| B2 | The method of B1, further comprising: receiving the compressed data for the input media; partially decompressing the compressed data for the input media, thereby producing the input syntax elements according to the media compression format; and converting the input syntax elements into the input tokens. |
| B3 | The method of B1, wherein: for a given input syntax element among the input syntax elements, a given input token among the input tokens indicates a syntax structure that includes the given input syntax element, a type of the given input syntax element, and a value of the given input syntax element; and for a given output syntax element among the output syntax elements, a given predicted token among the predicted tokens indicates a syntax structure that includes the given output syntax element, a type of the given output syntax element, and a value of the given output syntax element. |
| B4 | The method of B1, further comprising: partitioning the input tokens into blocks that correspond to frames of the input media, wherein the input tokens are provided to the generative AI model on a block-by-block basis for the frames, respectively, of the input media. |

-continued

| | Features |
|---|---|
| B5 | The method of B4, wherein the partitioning includes: detecting frame boundaries by scanning for an input token associated with a particular type of syntax element. |
| B6 | The method of B1, further comprising, with the generative AI model, processing the input tokens to determine the predicted tokens, including: converting the input tokens into input embedding vectors; determining, based on the input embedding vectors, output embedding vectors using multiple layers of a decoder of the generative AI model; and converting the output embedding vectors into the predicted tokens. |
| B7 | The method of B6, wherein the converting the input tokens into input embedding vectors includes, for a given input token among the input tokens: converting the given input token into a one-hot vector of dimension V; and multiplying the one-hot vector by an embedding matrix of dimensions V × D, thereby producing a given input embedding vector, among the input embedding vectors, of dimension D. |
| B8 | The method of B7, further comprising encoding positions of the input tokens, wherein updated versions of the input embedding vectors that incorporate position encodings are provided to the generative AI model, and wherein the encoding positions includes, for the given input token: determining a position encoding of the given input token; and updating the given input embedding vector to incorporate the position encoding of the given input token. |
| B9 | The method of B6, wherein each of the multiple layers of the decoder of the generative AI model includes: a masked multi-head attention sub-layer that is configured to accept, as input to a masked multi-head attention function, keys, queries, and values based on linear projections of the input embedding vectors, and that is configured to produce, as output, normalized results from the masked multi-head attention function; a multi-head attention sub-layer that is configured to accept, as input to a multi-head attention function, keys, queries, and values based on linear projections of the output of the masked multi-head attention sub-layer, and that is configured to produce, as output, normalized results from the multi-head attention function; and a feed-forward neural network sub-layer that is configured to accept, as input, the output of the multi-head attention sub-layer, and that is configured to produce, as output, the output embedding vectors. |
| B10 | The method of B6, wherein the converting the output embedding vectors into the predicted tokens includes, for a given predicted token among the predicted tokens: using a linear function to determine a one-hot vector of dimension V from a given output embedding vector, among the output embedding vectors, of dimension D, including multiplying the given output embedding vector by an embedding matrix of dimensions D × V; and using a softmax function to determine the given predicted token from the one-hot vector. |
| B11 | The method of B1, wherein the reconstructing the output media from the predicted tokens includes: converting the predicted tokens to the output syntax elements, respectively, in the media compression format; and decompressing the output syntax elements using a media decoder for the media compression format. |
| C1 | In a computer system that implements a generative artificial intelligence ("AI") model, a method of training the generative AI model to synthesize media, the method comprising: identifying a set of training data; and training the generative AI model in multiple training iterations using the set of training data, including, in a given training iteration of the multiple training iterations: receiving input tokens that represent input syntax elements, respectively, of compressed data for input media, the input media having been compressed according to a media compression format to produce the compressed data for the input media, wherein the input tokens are encoded in an input format for the generative AI model; providing, to the generative AI model, the input tokens; receiving, from the generative AI model, predicted tokens that represent output syntax elements, respectively, of compressed data for output media; determining a measure of loss based at least in part on the predicted tokens; and updating one or more parameters of the generative AI model based at least in part on the measure of loss. |
| C2 | The method of C1, wherein the set of training data includes, for each of multiple examples of input media, input tokens that represent input syntax elements, respectively, of compressed data for that example of input media, and wherein, for each of the multiple examples of input media, that example of input media has been compressed according to the media compression format. |
| C3 | The method of C2, wherein, for each of the multiple examples of input media, that example of input media has been compressed using a common set of compression settings and a common profile of the media compression format, and wherein, for each of the multiple examples of input media, that example of input media has a common resolution. |
| C4 | The method of C1, further comprising: receiving the compressed data for the input media; partially decompressing the compressed data for the input media, thereby producing the input syntax elements |

-continued

| | Features |
|---|---|
| | according to the media compression format; and converting the input syntax elements into the input tokens. |
| C5 | The method of C1, wherein: for a given input syntax element among the input syntax elements, a given input token among the input tokens indicates a syntax structure that includes the given input syntax element, a type of the given input syntax element, and a value of the given input syntax element; and for a given output syntax element among the output syntax elements, a given predicted token among the predicted tokens indicates a syntax structure that includes the given output syntax element, a type of the given output syntax element, and a value of the given output syntax element. |
| C6 | The method of C1, further comprising: partitioning the input tokens into blocks that correspond to frames of the input media, wherein the input tokens are provided to the generative AI model on a block-by-block basis for the frames, respectively, of the input media. |
| C7 | The method of C6, wherein the partitioning includes: detecting frame boundaries by scanning for an input token associated with a particular type of syntax element. |
| C8 | The method of C1, further comprising, with the generative AI model, processing the input tokens to determine the predicted tokens, including: converting the input tokens into input embedding vectors; determining, based on the input embedding vectors, output embedding vectors using multiple layers of a decoder of the generative AI model; and converting the output embedding vectors into the predicted tokens. |
| C9 | The method of C8, wherein the converting the input tokens into input embedding vectors includes, for a given input token among the input tokens: converting the given input token into a one-hot vector of dimension V; and multiplying the one-hot vector by an embedding matrix of dimensions V × D, thereby producing a given input embedding vector, among the input embedding vectors, of dimension D. |
| C10 | The method of C9, further comprising encoding positions of the input tokens, wherein updated versions of the input embedding vectors that incorporate position encodings are provided to the generative AI model, and wherein the encoding positions includes, for the given input token: determining a position encoding of the given input token; and updating the given input embedding vector to incorporate the position encoding of the given input token. |
| C11 | The method of C8, wherein each of the multiple layers of the decoder of the generative AI model includes: a masked multi-head attention sub-layer that is configured to accept, as input to a masked multi-head attention function, keys, queries, and values based on linear projections of the input embedding vectors, and that is configured to produce, as output, normalized results from the masked multi-head attention function; a multi-head attention sub-layer that is configured to accept, as input to a multi-head attention function, keys, queries, and values based on linear projections of the output of the masked multi-head attention sub-layer, and that is configured to produce, as output, normalized results from the multi-head attention function; and a feed-forward neural network sub-layer that is configured to accept, as input, the output of the multi-head attention sub-layer, and that is configured to produce, as output, the output embedding vectors. |
| C12 | The method of C8, wherein the converting the output embedding vectors into the predicted tokens includes, for a given predicted token among the predicted tokens: using a linear function to determine a one-hot vector of dimension V from a given output embedding vector, among the output embedding vectors, of dimension D, including multiplying the given output embedding vector by an embedding matrix of dimensions D × V; and using a softmax function to determine the given predicted token from the one-hot vector. |
| C13 | The method of C1, wherein the determining the measure of loss includes: determining a measure of conformity of the predicted tokens to syntax of the media compression format, wherein the measure of conformity of the predicted tokens to syntax of the media compression format quantifies loss in terms of deviations from the syntax of the media compression format. |
| C14 | The method of C13, wherein the determining the measure of conformity of the predicted tokens to syntax of the media compression format includes: converting the predicted tokens to the output syntax elements, respectively, in the media compression format; and measuring syntax errors in the output syntax elements. |
| C15 | The method of C1, wherein the training further includes, in the given training iteration: reconstructing the output media from the predicted tokens. |
| C16 | The method of C15, wherein the reconstructing the output media from the predicted tokens includes: converting the predicted tokens to the output syntax elements, respectively, in the media compression format; and decompressing the output syntax elements using a media decoder for the media compression format. |
| C17 | The method of C15, wherein the determining the measure of loss includes: determining, based on feedback from a reviewer, a rating of the output media, wherein the rating of the output media quantifies loss in terms of compression artifacts and/or consistency with the input media. |

-continued

| | Features |
|---|---|
| C18 | The method of C17, wherein the rating of the output media is a reward signal for reinforcement learning, and wherein the updating the one or more parameters of the generative AI model adjusts a policy of the reinforcement learning. |
| C19 | The method of C1, wherein the training includes multiple stages, the multiple stages including: an initial stage in which the measure of loss is a measure of conformity of the predicted tokens to syntax of the media compression format, wherein the measure of conformity of the predicted tokens to syntax of the media compression format quantifies loss in terms of deviations from the syntax of the media compression format; and a fine-tuning stage, following the initial stage, in which the measure of loss is a rating of output media reconstructed from the predicted tokens, wherein the rating of the output media quantifies loss in terms of compression artifacts and/or consistency with the input media. |
| C20 | The method of C19, wherein the training in the initial stage produces a base version of the generative AI model that generates predicted tokens that are conformant to the media compression format, and wherein the training in the fine-tuning stages produces a refined version of the generative AI model that generates predicted tokens that are conformant to the media compression format and yields output media with lower loss in terms of compression artifacts and/or consistency with input media. |
| C21 | The method of C1, wherein the parameters of the generative AI model include one or more of: an embedding matrix for determining input embedding vectors from the input tokens and/or for determining the predicted tokens from output embedding vectors; linear projections for determining inputs to multi-head attention sub-layers of the generative AI model; weights and offsets for feed-forward neural networks of the generative AI model; and parameters of a softmax function of the generative AI model. |
| BC1 | The method of any one of B1-B11 and C1-C21, wherein the compressed data represents pictures of a video sequence, audio of an audio sequence, or an image. |
| BC2 | The method of any one of B1-B11 and C1-C21, wherein the media compression format is the H.264/AVC standard, H.265/HEVC standard, H.266/VVC standard, VC-1 standard, VP9 standard, or AV1 standard. |
| BC3 | The method of any one of B1-B11 and C1-C21, wherein the generative AI model is a variation of BLOOM, GPT-4, GPT-4.5, or LLaMA. |
| BC4 | One or more computer-readable media having stored thereon computer-executable instructions for causing a processor system, when programmed thereby, to perform operations for the method of any one of B1-B11 and C1-C21. |
| BC5 | A computer system comprising a processor system and memory, wherein the computer system is configured to perform operations for the method of any one of B1-B11 and C1-C21. |

V. Using Partially Decompressed Data as Input to a Generative AI Model for Media Compression and Decompression.

This section describes operations performed to compress media and decompress media using a generative AI model that accepts, as input, partially decompressed data. For example, a generative AI model accepts, as input, input tokens that represent syntax elements for one or more frames of a lower-resolution version of media. Based on the input, the generative AI model can generate predicted tokens that represent syntax elements for one or more frames of a higher-resolution version of the media. This enables the generative AI model to exploit redundancy and correlation between the lower-resolution version and higher-resolution version of the media.

In some example implementations, a generative AI model can create predicted tokens for a higher-resolution version of video based on input tokens for a lower-resolution version of the video (e.g., with lower spatial resolution and lower frame rate). The input tokens represent input syntax elements of compressed data for the lower-resolution version of the video. A video compression tool can compress the lower-resolution version of the video and output the compressed data for the lower-resolution version. The compressed data for the lower-resolution version may have significantly lower bitrate than compressed data for the higher-resolution version of the video. A video decompression tool can determine input tokens from the compressed data for the lower-resolution version of the video, provide the input tokens to a generative AI model, receive predicted tokens from the generative AI model, convert the predicted tokens to syntax elements, and decode the syntax elements to reconstruct the higher-resolution version of the video. If the quality of the reconstructed video is not close enough to the original higher-resolution version of the video, a secondary stream of differences (between the original and reconstructed higher-resolution versions of the video) can be compressed, output, and decompressed.

A. Example Media Compression Tools and Media Decompression Tools.

Figure 7A:
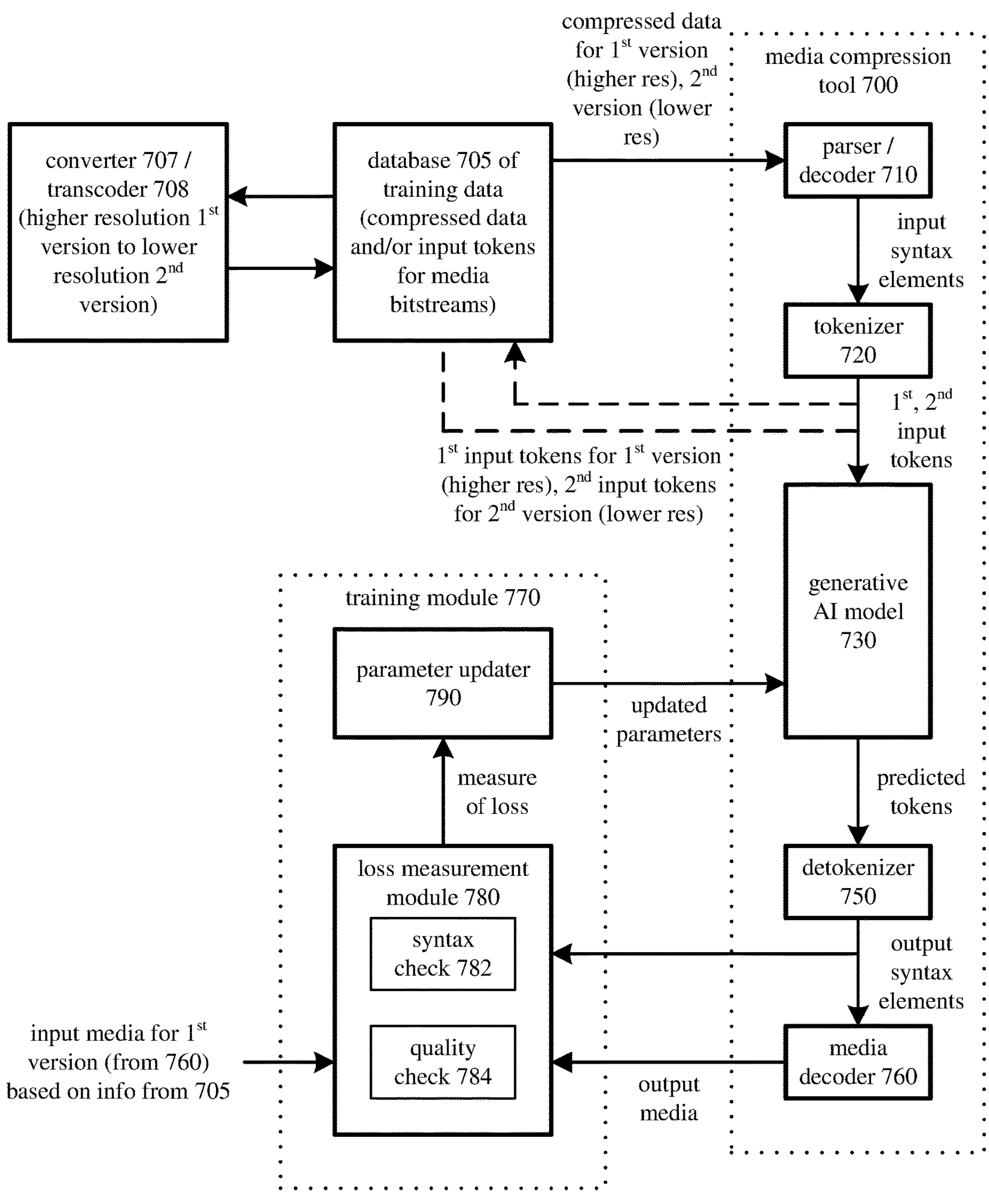
FIG. 7*a* is a diagram illustrating an example training environment for a generative AI model that uses partially decompressed data as input and compresses or decompresses media.

FIG. 7*a* shows an example training environment for a generative AI model that uses partially decompressed data as input for media compression and decompression. In general, the training environment implements principles used to train generative AI models such as large language models, but there some differences in processing of data for input, determination of loss measures during training, and fine-tuning operations during training. Through training, the generative AI model can discover patterns, correlations, and redundancies between different examples of media as well as between different segments of a given example of media.

The example training environment includes a media compression tool (700), database (705), converter (707), transcoder (708), and training module (770). The training process can consume significant computational resources. As such, the training environment is typically implemented in a system with extensive available resources, such as a server or cloud computing center.

The converter (707) is configured to convert media from a higher-resolution version to a lower-resolution version. The higher-resolution version and lower-resolution version differ, in terms of spatial resolution and/or temporal resolution, by a common scaling factor for the attribute. For example, the temporal resolution is different by a defined scaling factor between any of the higher-resolution versions and the corresponding lower-resolution version. The defined scaling factor for temporal resolution can be 2× or another value. As another example, the spatial resolution is different by a defined scaling factor between any of the higher-resolution versions and the corresponding lower-resolution version. The defined scaling factor for spatial resolution can be 2× or another value. The transcoder (708) is configured to transcode compressed data for a higher-resolution version of media into compressed data for a lower-resolution version of the media. The transcoder (708) can include the converter (707).

The database (705) is configured to stored information about higher-resolution versions and corresponding lower-resolution versions of input media to use as training data. The database (705) can store higher-resolution and lower-resolution versions of examples (e.g., clips) of input media in raw form, compressed data in media bitstreams for the higher-resolution and lower-resolution versions of the examples of input media, and/or input tokens, which represent syntax elements of the compressed data in media bitstreams for the higher-resolution and lower-resolution versions of the examples of input media. The input media can be frames of video, audio of an audio sequence, images, or another type of media. In some example implementations, the database (705) stores a diverse range of video clips.

Typically, each of the examples of input media has been compressed according to a media compression format. The media compression format is a compression format adapted for the type of media. In some example implementations, to simplify the training process, the higher-resolution and lower-resolution versions of the examples of input media are compressed with the same media compression format and, within that media compression format, the same compression profile. As such, the same set of tools is used for compression for each of the examples of input media. Moreover, to simplify the training process, the higher-resolution versions of the examples of input media have the same temporal resolution and spatial resolution (for higher resolution), and the lower-resolution versions of the examples of input media have the same temporal resolution and spatial resolution (for lower resolution; different than the temporal resolution and spatial resolution for the higher resolution). To further simplify the training process, certain identical compression settings can be used to compress the examples of input media for the lower-resolution versions and higher-resolution versions (e.g., for video, the same number of slices per frame; the same count of available reference pictures). Other compression settings can be scaled between the higher-resolution versions and the lower-resolution versions, but are the same between the higher-resolution versions and are the same between the lower-resolution versions (e.g., overall quality or bitrate setting; hierarchy of inter-picture prediction relationships for I frames, P frames, and B frames; distance between instantaneous decoder refresh frames). For example, the overall quality or bitrate is different by a defined scaling factor between any of the higher-resolution versions and the corresponding lower-resolution version. The defined scaling factor can by 1.5×, 2×, 4×, 8×, or another value. Compressed data for an example of input media in a different media compression format (or compression profile, or compression settings) can be transcoded to the same media compression format (or compression profile, or resolution, or compression settings) as other examples.

Compressed data (or input tokens) for a lower-resolution version or higher-resolution version of an example of input media can be stored in a file with metadata indicating the file name, resolution of the input media, genre, and compression settings. (Training a generative AI model using input media of the same genre can improve training of the generative AI model for that genre.)

The media compression tool (700) includes a parser/decoder (710), a tokenizer (720), a generative AI model (730), a detokenizer (750), and a media decoder (760). The parser/decoder (710) and tokenizer (720) are configured to perform operations to prepare input for the generative AI model (730), unless the database (705) provides input tokens directly to the generative AI model (730). The generative AI model (730), detokenizer (750), and media decoder (760) are configured to work with the loss measurement module (780) and parameter updater (790) of the training module (770) during the training process.

The parser/decoder (710) is configured to receive compressed data from the database (705) (for a higher-resolution version and lower-resolution version of input media) and partially decompress the compressed data. In some example implementations, the parser/decoder (710) is configured to perform operations for entropy decoding, fixed-length decoding, and inverse binarization. More generally, the parser/decoder (710) can be configured to perform partial decompression operations as described in section III. This produces syntax elements according to a media compression format for the compressed data for the higher-resolution version and for the compressed data for the lower-resolution version.

The tokenizer (720) is configured to receive the syntax elements from the parser/decoder (710) (for the compressed data for the higher-resolution version and lower-resolution version of input media) and convert the syntax elements into input tokens. In general, the tokenizer (720) can be configured to perform tokenization operations as described in section III. The input tokens (or predicted tokens in later stages) can be converted to corresponding syntax elements in a "lossless" way—the tokenization process is exactly reversible. The tokenizer (720) can be configured to provide input tokens back to the database (705) for storage.

The generative AI model (730) is configured to receive input tokens (from the database (705) or the tokenizer (720)) for the lower-resolution and higher-resolution versions and to determine predicted tokens based on the input tokens. The predicted tokens represent syntax elements of output media. FIG. 7*d* shows an example generative AI model in some example implementations. Alternatively, the generative AI model is implemented in some other way. The generative AI model (730) has access to the higher-resolution version of the input data during training, but uses masking to ensure predictions do not depend on future input tokens. The generative AI model (730) can be configured to accept input tokens on a frame-by-frame basis. That is, the block size is equal to the amount of data in one frame. Frame boundaries can be detected from input tokens that represent particular syntax elements (e.g., an indicator of a first slice of a frame).

For purposes of providing feedback during training, the detokenizer (750) is configured to convert the predicted tokens into syntax elements for output media, and the media decoder (760) is configured to decode the syntax elements for output media, producing a reconstructed version of the output media. The media decoder (760) can be a modified version of a conventional media decoder for the media compression format, with modifications to bypass or omit entropy decoding, fixed-length decoding, and inverse binarization operations.

The loss measurement module (780) of the training module (770) is configured to received feedback from the detokenizer (750) and media decoder (760). The loss measurement module (780) can be configured to determine one or more measures of loss.

For example, as part of a syntax check (782), the loss measurement module (780) is configured to determine a measure of conformity of the predicted tokens (from the generative AI model (730)) to syntax of the media compression format. To determine the measure of conformity, the loss measurement module (780) can be configured to measure syntax errors in output syntax elements for the predicted tokens. For example, the loss measurement module (780) can be configured to provide the output syntax elements to the media decoder (760) and assess feedback from the media decoder (760) (e.g., counting syntax errors, evaluating severity of syntax errors).

As another example, as part of a quality check (784), the loss measurement module (780) is configured to determine a measure based on quality of output media reconstructed from the predicted tokens. The loss measurement module (780) can be configured to receive (from the media decoder (760)) a reconstructed version of the output media, receive (from the media decoder (760) or the database (705)) a reconstructed version of the higher-resolution version of the input media or reconstruct the higher-resolution version of the input media, and measure quality degradation in the reconstructed version of the output media compared to the higher-resolution version of the input media. The quality degradation can be measured in terms of peak signal-to-noise ratio ("PSNR"), structural similarity index ("SSIM"), multi-scale structural similarity index ("MS-SSIM"), video multi-method assessment fusion ("VMAF"), or another objective measure of quality degradation. (In contrast to the process of training the generative AI model for media synthesis in some example implementations, the process of the training the generative AI model for media compression and decompression does not use RLHF or any other technique that collects subjective evaluation from human reviewers. Instead, the loss measurement module (780) uses an objective measure of quality (such as PSNR, SSIM, MS-SSIM, or VMAF) to guide the training of the generative AI model (730).)

In some example implementations, the loss measurement module (780) is configured to determine the measure of conformity and the measure of quality in the same stage of training, which typically includes multiple training iterations. The training produces a version of the generative AI model that can generate predicted tokens for compressed data that conforms to the syntax of the media compression format and also yields output media that closely approximates the higher-resolution version of the input media. Since the measure of quality can be computed objectively during the training process from the output media and higher-resolution version of the input media, feedback from a reviewer need not be considered to fine-tune the generative AI model.

The parameter updater (790) of the training module (770) is configured to provide parameter updates for the generative AI model (730). Depending on implementation, the parameters that are updated can include embedding matrices, linear projections, weights and offsets of neural networks, and other parameters, as described below. To handle large volumes of input effectively, the training process can use large batch sizes and/or gradient accumulation.

Figure 7B:
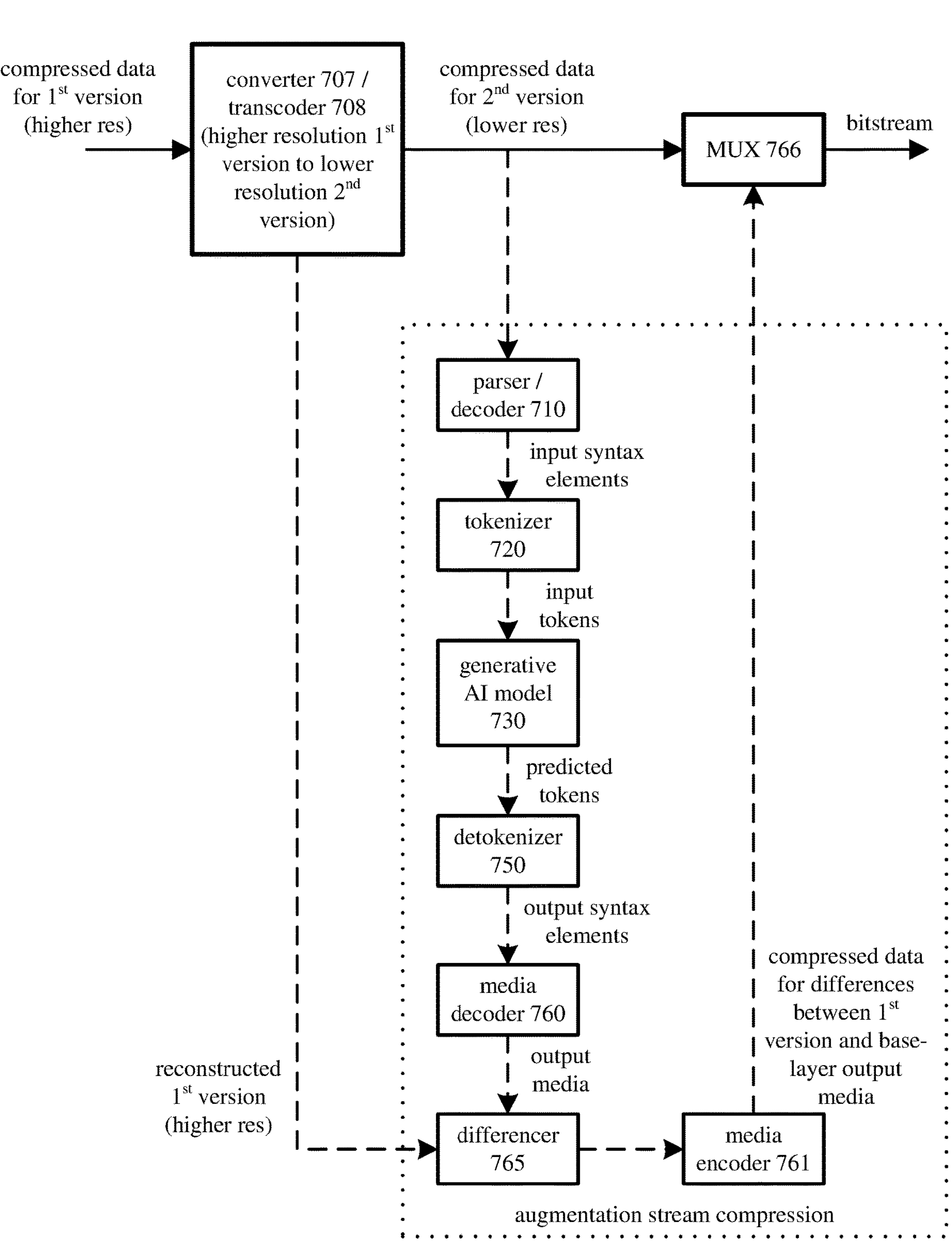
FIG. 7*b* is a diagram illustrating an example media compression tool including a generative AI model that uses partially decompressed data as input.

FIG. 7*b* shows an example media compression tool (701), which includes a generative AI model that uses partially decompressed data as input. Compared to the training process explained with reference to FIG. 7*a*, the process of compressing media using a trained generative AI model consumes fewer computational resources. As such, the media compression tool can be implemented in a computing device such as a desktop computer, laptop computer, or mobile device.

The media compression tool (701) can operate in a single-stream mode (with a single stream for a base layer) or augmentation-stream mode (with a stream for the base layer and a stream for an augmentation layer). In both modes, a converter (707) and transcoder (708) are used. The converter (707) is configured to convert media from a higher-resolution version to a lower-resolution version, as described with reference to FIG. 7*a*. For the conversion, the converter (707) uses the same scaling factors (e.g., for spatial resolution, for temporal resolution) used during training. The transcoder (708), which can include the converter (707), is configured to transcode compressed data for a higher-resolution version of media into compressed data for a lower-resolution version of the media, as described with reference to FIG. 7*a*. For the transcoding, the transcoder (708) uses the same media compression format, compression profile, compression settings, etc. used during training.

The compressed data for the lower-resolution version of the media is provided to the multiplexer ("MUX") (766). The MUX (766) is configured to organize the compressed data for the lower-resolution version according to a container format. For example, the container format is ISO/IEC 14496-12 (base media file format), ISO/IEC 14496-14 ("MP4"), ASF, WebM or another container format. The compressed data in the container format can be output to a media decompression tool or saved for later output.

For the augmentation-stream mode, the media compression tool (701) includes a parser/decoder (710), tokenizer (720), generative AI model (730), detokenizer (750), and media decoder (760) that are configured to perform operations as described with reference to FIG. 7*a*. The parser/decoder (710) is configured to receive compressed data for the lower-resolution version of input media and partially decompress the compressed data. The tokenizer (720) is configured to receive the syntax elements from the parser/decoder (710) and convert the syntax elements into input tokens. The generative AI model (730) is configured to receive input tokens (from the tokenizer (720)) and determine predicted tokens based on the input tokens. The predicted tokens represent syntax elements of output media. Whereas the generative AI model (730) in FIG. 7*a* is being trained (with parameters updated in training iterations), the generative AI model (730) shown in FIG. 7*b* has been trained (parameters have been set). (Also, the generative AI model (730) in the media compression tool (701) does not have access to the higher-resolution version of the input data. As such, the sequence of predicted tokens is generated token-by-token in an autoregressive manner and is used as input, shifted by one position, for the decoder portion of the generative AI model (730).) The detokenizer (750) is configured to convert the predicted tokens into syntax elements for output media, and the media decoder (760) is configured to decode the syntax elements for output media, producing a reconstructed version of the output media for the base layer.

For the augmentation-stream mode, the media compression tool (701) also includes a differencer (765) and media encoder (761). The differencer (765) is configured to determine differences between the higher-resolution version of the input media and the reconstructed version of the base-layer output media. (The higher-resolution version of the input media can be provided by the transcoder (708), which can decompress the higher-resolution version as needed.) The differences can simply be pixel value differences between pixel values of the higher-resolution version and corresponding pixel values of the reconstructed version of the base-layer output media.

The media encoder (761) is configured to compress the differences, producing compressed data for the differences. The media compression tool (701) can use the same media compression format for the lower-resolution version and the differences, or the media compression tool (701) can use different media compression formats. In general, the media encoder (761) can use intra-frame compression and/or inter-frame compression of the differences.

The compressed data for the differences is provided to the MUX (766). The MUX (766) is configured to multiplex the compressed data for the differences, along with the compressed data for the lower-resolution version, according to the container format. The compressed data in the container format (for the lower-resolution version and for the differences) can be output to a media decompression tool or saved for later output.

FIG. 7*c* shows an example media decompression tool (702), which includes a generative AI model that uses partially decompressed data as input. Compared to the training process explained with reference to FIG. 7*a*, the process of decompressing media using a trained generative AI model consumes fewer computational resources. As such, the media decompression tool can be implemented in a computing device such as a desktop computer, laptop computer, or mobile device.

The media decompression tool (702) can operate in a single-stream mode (with a single stream for a base layer) or augmentation-stream mode (with a stream for the base layer and a stream for an augmentation layer). In both modes, a demultiplexer ("DEMUX") (768) is configured to receive compressed data for a lower-resolution version of the media. The compressed data for the lower-resolution version is organized according to a container format. For example, the container format is ISO/IEC 14496-12 (base media file format), ISO/IEC 14496-14 ("MP4"), ASF, WebM or another container format. The DEMUX (768) is configured to extract the compressed data for the lower-resolution version from the container format.

For both the single-stream mode and the augmentation-stream mode, the media decompression tool (702) includes a parser/decoder (710), tokenizer (720), generative AI model (730), detokenizer (750), and media decoder (760) that are configured to perform operations as described with reference to FIG. 7*a*. The parser/decoder (710) is configured to receive compressed data for the lower-resolution version of input media and partially decompress the compressed data. The tokenizer (720) is configured to receive the syntax elements from the parser/decoder (710) and convert the syntax elements into input tokens. The generative AI model (730) is configured to receive input tokens (from the tokenizer (720)) and determine predicted tokens based on the input tokens. The predicted tokens represent syntax elements of output media. Whereas the generative AI model (730) in FIG. 7*a* is being trained (with parameters updated in training iterations), the generative AI model (730) shown in FIG. 7*c* has been trained (parameters have been set). (Also, the generative AI model (730) in the media decompression tool (702) does not have access to the higher-resolution version of the input data. As such, the sequence of predicted tokens is generated token-by-token in an autoregressive manner and is used as input, shifted by one position, for the decoder portion of the generative AI model (730).) The detokenizer (750) is configured to convert the predicted tokens into syntax elements for output media, and the media decoder (760) is configured to decode the syntax elements for output media, producing a reconstructed version of the output media for the base layer.

For the augmentation-stream mode, the media decompression tool (702) also includes a media decoder (762) and combiner (764). The DEMUX (768) is configured to receive compressed data for differences between the higher-resolution version of the input media and the reconstructed version of the base-layer output media. The differences can simply be pixel value differences between pixel values of the higher-resolution version and corresponding pixel values of the reconstructed version of the base-layer output media. The compressed data for the differences is multiplexed with the compressed data for the lower-resolution version of the media. The DEMUX (768) is configured to extract the compressed data for the differences from the container format.

The media decoder (762) is configured to decompress the compressed data for the differences, producing a reconstructed version of the differences. The media decompression tool (702) can use the same media compression format for the lower-resolution version and the differences, or the media decompression tool (702) can use different media compression formats. In general, the media encoder (762) can use intra-frame decompression and/or inter-frame decompression of the differences.

The combiner (765) is configured to combine the differences and the reconstructed version of the base-layer output media. The differences can simply be added on a pixel-by-pixel basis to corresponding pixel values of the reconstructed version of the base-layer output media.

FIG. 7*d* shows an example generative transformer (732), which is configured to process input tokens to determine predicted tokens. The example generative transformer (732) can be used as the generative AI model (730) in the training environment shown in FIG. 7*a*, the media compression tool shown in FIG. 7*b*, or the media decompression tool shown in FIG. 7*c*. (The sources of input tokens for the decoder of the generative transformer (732) are different, however, for use in the training environment compared to use in the media compression tool or decompression tool.) The generative transformer (732) includes multiple layers of an encoder as well as multiple layers of a decoder. During training, to the encoder of the generative transformer (732), input tokens are provided for the lower-resolution version of the media during training; to the decoder of the generative transformer (732), input tokens are shifted by one position and provided for the higher-resolution version of the media. The generative transformer (732) provides output from the encoder to a multi-head attention sub-layer of a corresponding layer of the decoder. During compression or decompression, to the encoder of the generative transformer (732), input tokens are provided for the lower-resolution version of the media; to the decoder of the generative transformer (732), output (predicted) tokens of the generative transformer (732) are shifted by one position and provided as input tokens.

The generative transformer (732) includes an embedding encoder (735), multiple layers of an encoder, another embedding encoder (741), multiple layers of a decoder, a linear function (748), and a softmax function (749). The number n of layers of the encoder and the decoder depends on implementation. For example, n is 6 or another count of layers.

The embedding encoder (735) is configured to convert input tokens into encoder input embedding vectors. The input tokens represent input syntax elements for the lower-resolution version of input media. For example, for a given input token, the embedding encoder (735) can convert the given input token into a one-hot vector of dimension V, then multiply the one-hot vector by an embedding matrix of dimensions V×D. This produces a given encoder input embedding vector of dimension D. The embedding encoder (735) can also be configured to encode positions of the input tokens. In this case, updated versions of the encoder input embedding vectors incorporate position encodings. For example, for a given input token, the embedding encoder can determine a position encoding of the given input token and update the given encoder input embedding vector (for the given input token) to incorporate the position encoding of the given input token. Alternatively, the embedding encoder (735) is configured to convert the input tokens into encoder input embedding vectors in some other way.

Using the n layers of the encoder, the generative transformer (732) is configured to determine encoder output embedding vectors based on the encoder input embedding vectors. In FIG. 7*d*, each of the n layers of the encoder includes a multi-head attention sub-layer and a feed-forward neural network sub-layer.

The multi-head attention sub-layer of the encoder is configured to accept, as input to a multi-head attention function, keys, queries, and values based on linear projections of the encoder input embedding vectors. The multi-head attention sub-layer is configured to produce, as output, normalized results from the multi-head attention function. In particular, the multi-head attention sub-layer includes a multi-head attention function (736) as well as an addition and normalization function (737). Linear projections of the encoder input embedding vectors produce keys, queries, and values. The multi-head attention function (736) accepts, as input, the keys, queries, and values. In the addition and normalization function (737), the output of the multi-head attention function (736) is added to the encoder input embedding vector (before the linear projections), and the result of the addition is normalized.

The feed-forward neural network sub-layer of the encoder is configured to accept, as input, the output of the multi-head attention sub-layer. The feed-forward neural network sub-layer is configured to produce, as output, the encoder output embedding vectors. In particular, the feed-forward neural network sub-layer includes a feed-forward neural network (738) as well as an addition and normalization function (739). The feed-forward neural network (738) accepts, as input, the output of the multi-head attention sub-layer. In the addition and normalization function (739), the output of the feed-forward neural network (738) is added to the output of the multi-head attention sub-layer, and the result of the addition is normalized.

The embedding encoder (741) is configured to convert input tokens into decoder input embedding vectors. During training, the input tokens represent input syntax elements for the higher-resolution version of input media, shifted by one position. During compression or decompression, the input tokens are prior predicted tokens in the output sequence, shifted by one position. For example, for a given input token, the embedding encoder (741) can convert the given input token into a one-hot vector of dimension V, then multiply the one-hot vector by an embedding matrix of dimensions V×D. This produces a given decoder input embedding vector of dimension D. The embedding encoder (741) can also be configured to encode positions of the input tokens. In this case, updated versions of the decoder input embedding vectors incorporate position encodings. For example, for a given input token, the embedding encoder can determine a position encoding of the given input token and update the given input embedding vector (for the given input token) to incorporate the position encoding of the given input token. Alternatively, the embedding encoder (741) is configured to convert the input tokens into decoder input embedding vectors in some other way.

Using the n layers of the decoder, the generative transformer (732) is configured to determine output embedding vectors based on the decoder input embedding vectors and the encoder output embedding vectors. In FIG. 7*d*, each of the n layers of the decoder includes a masked multi-head attention sub-layer, a multi-head attention sub-layer, and a feed-forward neural network sub-layer.

The masked multi-head attention sub-layer is configured to accept, as input to a masked multi-head attention function, keys, queries, and values based on linear projections of the decoder input embedding vectors. The masked multi-head attention sub-layer is configured to produce, as output, normalized results from the masked multi-head attention function. In particular, the masked multi-head attention sub-layer includes a masked multi-head attention function (742) as well as an addition and normalization function (743). Linear projections of the decoder input embedding vector for the layer produce keys, queries, and values. The masked multi-head attention function (742) accepts, as input, the keys, queries, and values. In the addition and normalization function (743), the output of the masked multi-head attention function (742) is added to the decoder input embedding vector (before the linear projections), and the result of the addition is normalized.

The multi-head attention sub-layer is configured to accept, as input to a multi-head attention function, keys and values based on linear projections of the encoder output embedding vectors from the encoder as well as queries based on the output of the masked multi-head attention sub-layer of the decoder. The multi-head attention sub-layer is configured to produce, as output, normalized results from the multi-head attention function. In particular, the multi-head attention sub-layer includes a multi-head attention function (744) as well as an addition and normalization function (745). The multi-head attention function (744) accepts, as input, the keys, queries, and values. Linear projections of the encoder output embedding vectors produce the keys and values. The output of the masked multi-head attention sub-layer provides the queries. In the addition and normalization function (745), the output of the multi-head attention function (744) is added to the output of the masked multi-head attention sub-layer, and the result of the addition is normalized.

The feed-forward neural network sub-layer is configured to accept, as input, the output of the multi-head attention sub-layer. The feed-forward neural network sub-layer is configured to produce, as output, the decoder output embedding vectors. In particular, the feed-forward neural network sub-layer includes a feed-forward neural network (746) as well as an addition and normalization function (747). The feed-forward neural network (746) accepts, as input, the output of the multi-head attention sub-layer. In the addition and normalization function (747), the output of the feed-forward neural network (746) is added to the output of the multi-head attention sub-layer, and the result of the addition is normalized.

With the linear function (748) and softmax function (749), the generative transformer (732) is configured to convert the decoder output embedding vectors into the predicted tokens. In particular, for a given predicted token, using the linear function (748), the generative transformer (732) can determine a one-hot vector of dimension V from a given decoder output embedding vector of dimension D. For example, the generative transformer (732) can multiply the given decoder output embedding vector by an embedding matrix of dimensions D×V. Then, for the given predicted token, using the softmax function (749), the generative transformer (732) can determine the given predicted token from the one-hot vector.

Alternatively, the generative AI model (730) in the training environment shown in FIG. 7*a*, the media compression tool shown in FIG. 7*b*, or the media decompression tool shown in FIG. 7*c* can be implemented in some other way. For example, the generative AI model (730) is based on a masked transformer as described in Chang et al., "Maskgit: Masked Generative Image Transformer," arXiv:2202.04200 (2022) or Villegas et al., "Phenaki: Variable Length Video Generation from Open Domain Textual Descriptions," arXiv:2210.02399v1 [cs.CV](2022).

B. Example Techniques for Training a Generative AI Model for Media Compression.

FIG. 8 shows an example technique (800) for training a generative AI model for media compression, where the generative AI model uses partially decompressed data as input. A media compression tool in a computer system that implements a generative AI model, as described with reference to FIG. 7*a* or otherwise, can perform the technique (800).

To start, the computer system identifies (810) a set of training data. The set of training data can include, for each of multiple examples (e.g., clips) of input media, first input tokens and second input tokens. The first input tokens represent first input syntax elements, respectively, of compressed data for a first version of the example of input media. The first version has a first resolution. The second input tokens represent second input syntax elements, respectively, of compressed data for a second version of the example of input media. The second version has a second resolution lower than the first resolution. For example, the compressed data represents pictures of a video sequence, audio of an audio sequence, an image, or another type of media. For each of the multiple examples of input media, the first version and second version have been compressed according to the media compression format. For example, for video, the media compression format is the H.264/AVC standard, H.265/HEVC standard, H.266/VVC standard, VC-1 standard, VP9 standard, AV1 standard, or another video compression format. For another type of media, the media compression format is a compression format adapted for that type of media.

For each of the multiple examples of input media, the first version and the second version differ, in terms of quality, bitrate, spatial resolution, and/or temporal resolution, by a common scaling factor for the attribute (e.g., all first versions have a first frame rate, and all second versions have a second frame rate that is ½ the first frame rate). Aside from these defined differences in resolution, in some example implementations, for each of the multiple examples of input media, the first version and second version have been compressed using a common set of compression settings and a common profile of the media compression format. Moreover, each of the multiple examples of input media is part of a given genre of media. Controlling the compression settings, compression profile, and genre for different examples of input media can help train the generative AI model more effectively, since the generative AI model can focus on identifying other differences between the examples of input media.

The computer system trains the generative AI model in multiple training iterations using the set of training data. The generative AI model can be a variation of BLOOM, GPT-4, GPT-4.5, LLaMA, or another generative AI model. The computer system checks (820) whether to continue in another iteration of training. If so, the computer system performs various operations for the next training iteration.

For a given training iteration, if first input tokens have not yet been generated for compressed data for the first version of input media, the computer system receives the compressed data for the first version. The computer system partially decompresses the compressed data for the first version. For example, the computer system performs partial decompression operations as described in section III. This produces first input syntax elements according to the media compression format. The computer system then converts the first input syntax elements into first input tokens for the first version. For example, the computer system performs tokenization operations as described in section III. Similarly, if second input tokens have not yet been generated for compressed data for the second version of input media, the computer system performs these partial decompression and tokenization operations to generate the second input tokens from the compressed data for the second version.

As shown in FIG. 8, the computer system receives (830) first input tokens that represent first input syntax elements, respectively, of compressed data for a first version of input media. The first version has a first resolution. The first version has been compressed according to a media compression format to produce the compressed data for the first version. The first input tokens are encoded in an input format for the generative AI model.

The computer system also receives (832) second input tokens that represent second input syntax elements, respectively, of compressed data for a second version of input media. The second version has a second resolution lower than the first resolution. The second version has been compressed according to a media compression format to produce the compressed data for the second version. The second input tokens are encoded in the input format for the generative AI model.

In some example implementations, for a given input syntax element among the first input syntax elements or second input syntax elements, a given input token indicates a syntax structure that includes the given input syntax element, a type of the given input syntax element, and a value of the given input syntax element. Alternatively, the first input tokens and second input tokens are encoded in another format.

The computer system provides (840) the first input tokens and the second input tokens to the generative AI model. In some example implementations, the computer system partitions the first input tokens into blocks that correspond to frames of the first version of input media, and the computer system partitions the second input tokens into blocks that correspond to frames of the second version of input media. For example, the computer system can detect frame boundaries by scanning for an input token associated with a particular type of syntax element (e.g., a syntax element that indicates the first slice of a frame). The computer system provides the first input tokens to the generative AI model on a block-by-block basis for the frames, respectively, of the first version, and the computer system provides the second input tokens to the generative AI model on a block-by-block basis for the frames, respectively, of the second version that correspond to the frames, respectively, of the first version.

The generative AI model processes the first input tokens and the second input tokens to determine predicted tokens. For example, the generative AI model converts the second input tokens into encoder input embedding vectors. Based on the encoder input embedding vectors, the generative AI model determines encoder output embedding vectors using multiple layers of an encoder of the generative AI model. The generative AI model also converts the first input tokens into decoder input embedding vectors. Based on the decoder input embedding vectors and the encoder output embedding vectors, the generative AI model determines decoder output embedding vectors using multiple layers of a decoder of the generative AI model. The generative AI model converts the decoder output embedding vectors into the predicted tokens. Such operations of the generative AI model can be performed as explained with reference to FIG. 7*d*. Alternatively, the generative AI model processes the first input tokens and second input tokens in some other way to determine the predicted tokens.

With reference to FIG. 8, for the given training iteration, the computer system receives (850) predicted tokens from the generative AI model. The predicted tokens represent output syntax elements, respectively, of compressed data for output media at the first resolution. In some example implementations, for a given output syntax element, a given predicted token indicates a syntax structure that includes the given output syntax element, a type of the given output syntax element, and a value of the given output syntax element. Alternatively, the predicted tokens are encoded in another format.

The computer system determines (860) a measure of loss based at least in part on the predicted tokens. The computer system can determine the measure of loss in any of several ways.

For example, the computer system determines a measure of conformity of the predicted tokens to syntax of the media compression format. To determine the measure of conformity, the computer system can convert the predicted tokens to the output syntax elements, respectively, in the media compression format, and then measure syntax errors in the output syntax elements. Alternatively, the computer system can determine the measure of conformity in some other way. In any case, the measure of conformity of the predicted tokens to syntax of the media compression format quantifies loss in terms of deviations from the syntax of the media compression format.

Or, as another example, the computer system determines a measure based on quality of output media reconstructed from the predicted tokens. The computer system reconstructs the output media from the predicted tokens. To do so, the computer system can convert the predicted tokens to the output syntax elements, respectively, in the media compression format, and then decompress the output syntax elements using a media decoder for the media compression format. The computer system then determines a measure of quality degradation of the output media relative to the first version of the input media. For example, the measure of quality degradation can be a PSNR, SSIM, MS-SSIM, VMAF, or other objective measure of quality degradation.

Or, as another example, the computer system determines multiple measures of loss in the given training iteration. The computer system determines a measure of conformity of the predicted tokens to syntax of the media compression format, which quantifies loss in terms of deviations from the syntax of the media compression format. The computer system also determines a measure of quality degradation of the output media relative to the first version of the input media. In this way, the training can produce a version of the generative AI model that generates predicted tokens that are conformant to the media compression format and yields output media with lower quality degradation.

With reference to FIG. 8, for the given training iteration, the computer system (870) updates one or more parameters of the generative AI model based at least in part on the measure of loss. For example, the parameters of the generative AI model include an embedding matrix (for determining decoder input embedding vectors from first input tokens, for determining encoder input embedding vectors from second input tokens, and/or for determining predicted tokens from output embedding vectors), linear projections (for determining inputs to multi-head attention sub-layers of a generative AI model), weights and offsets (for feed-forward neural networks of the generative AI model), and/or parameters of a softmax function (of the generative AI model). Alternatively, the parameters of the generative AI model include other and/or additional parameters.

The computer system checks (820) whether to continue in another iteration of training. In this way, the computer system can train the generative AI model using multiple training iterations for different batches (subsets) of input data in the identified training set, for an epoch (a pass through the data in the training set). The overall training process can repeat for multiple epochs until a stopping criterion is satisfied (e.g., the calculated measure of loss is below a threshold, or the parameters of the generative AI model have converged).

C. Example Techniques for Compressing Media for Decompression with a Generative AI Model.

Figure 9:
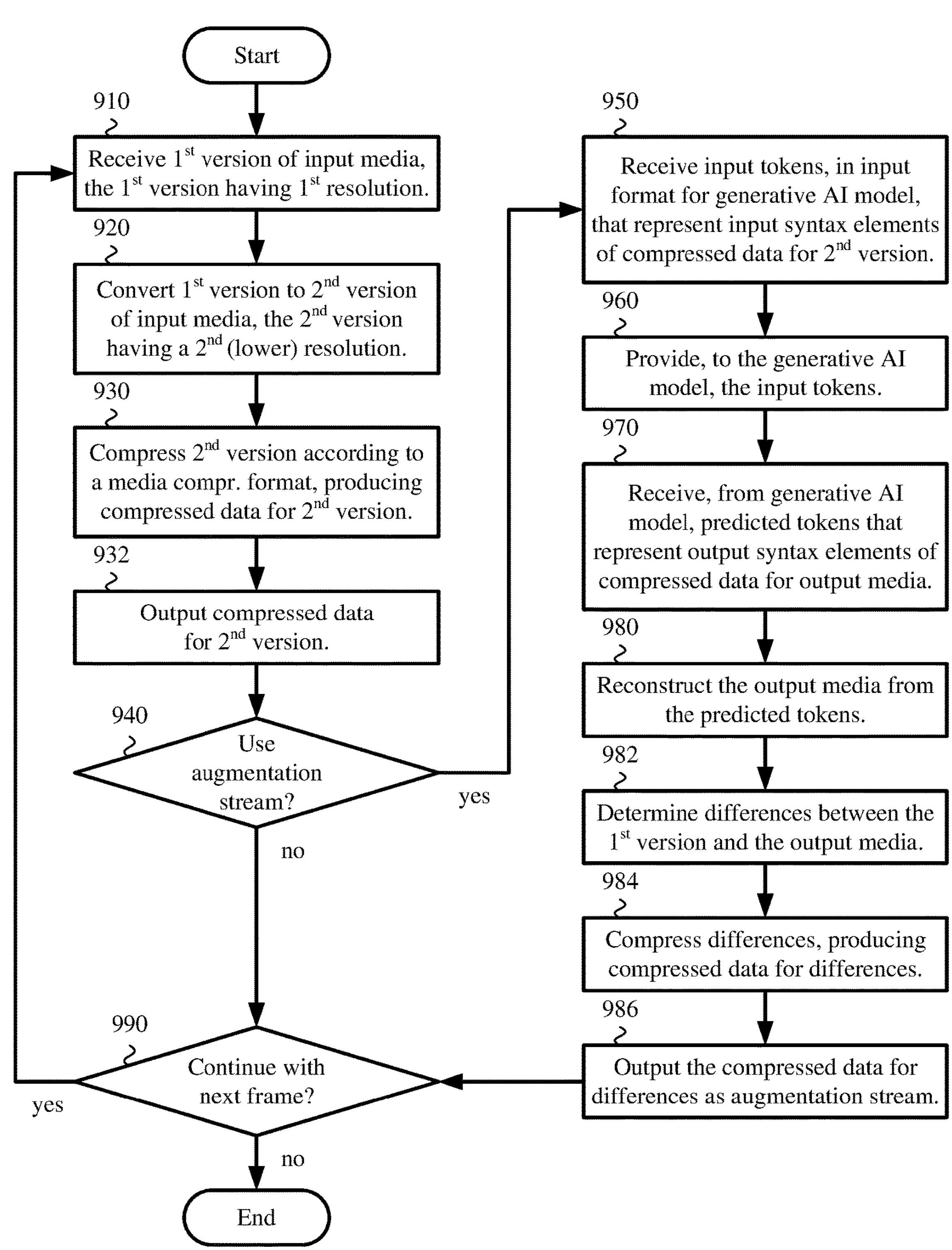
FIG. 9 is a flowchart illustrating an example technique for compressing media for decompression with a generative AI model that uses partially decompressed data as input.

FIG. 9 shows an example technique (900) for compressing media for decompression with a generative AI model, where the generative AI model uses partially decompressed data as input. A media compression tool in a computer system that implements a generative AI model, as described with reference to FIG. 7*b* or otherwise, can perform the technique (900).

The computer system receives (910) a first version of input media. The input media can be a frame of a video sequence, audio of an audio sequence, an image, or another type of media. The first version has a first resolution. The computer system converts (920) the first version to a second version of the input media. The second version has a second resolution lower than the first resolution. The second resolution can be lower than the first resolution in terms of quality, bitrate, spatial resolution, and/or temporal resolution.

The computer system compresses (930) the second version according to a media compression format, which produces compressed data for the second version. For example, for video, the media compression format is the H.264/AVC standard, H.265/HEVC standard, H.266/VVC standard, VC-1 standard, VP9 standard, AV1 standard, or another video compression format. For another type of media, the media compression format is a compression format adapted for that type of media.

The computer system can receive compressed data for the first version. In this case, the computer system can transcode the compressed data for the first version to produce the compressed data for the second version. The transcoding includes decompressing the compressed data for the first version, the receiving (910) the first version of input media, the converting (920), and the compressing (930) the second version.

The computer system outputs (932) the compressed data for the second version, for subsequent decompression using a generative AI model and a media decoder for the media compression format.

In this way, the computer system can produce a base stream of compressed data for the second version of the input media. In some examples, the computer system can also produce an augmentation stream to approximate the first version of the input media more closely. The computer system checks (940) whether to use an augmentation stream. If so, the computer system performs another series of operations (950, 960, 970, 980, 982, 984, 986) to produce the augmentation stream.

If input tokens have not yet been generated for compressed data for the second version of input media, the computer system receives the compressed data for the second version. The computer system partially decompresses the compressed data for the second version. For example, the computer system performs partial decompression operations as described in section III. This produces input syntax elements according to the media compression format. The computer system then converts the input syntax elements into input tokens for the second version. For example, the computer system performs tokenization operations as described in section III.

As shown in FIG. 9, the computer system receives (950) input tokens that represent input syntax elements, respectively, of compressed data for the second version of input media. The second version has been compressed according to a media compression format to produce the compressed data for the second version. The input tokens are encoded in an input format for the generative AI model. In some example implementations, for a given input syntax element, a given input token indicates a syntax structure that includes the given input syntax element, a type of the given input syntax element, and a value of the given input syntax element. Alternatively, the input tokens are encoded in another format.

The computer system provides (960) the input tokens to the generative AI model. The generative AI model can be a variation of BLOOM, GPT-4, GPT-4.5, LLaMA, or another generative AI model. In some example implementations, the computer system partitions the input tokens into blocks that correspond to frames of the second version of input media. For example, the computer system can detect frame boundaries by scanning for an input token associated with a particular type of syntax element (e.g., a syntax element that indicates the first slice of a frame). The computer system provides the second input tokens to the generative AI model on a block-by-block basis for the frames, respectively, of the second version.

The generative AI model processes input tokens to determine predicted tokens. For example, the generative AI model converts the input tokens into encoder input embedding vectors. Based on the encoder input embedding vectors, the generative AI model determines encoder output embedding vectors using multiple layers of an encoder of the generative AI model. Based on decoder input embedding vectors and the encoder output embedding vectors, the generative AI model determines decoder output embedding vectors using multiple layers of a decoder of the generative AI model. (The decoder input embedding vectors are based on prior predicted tokens in the output sequence from the decoder, shifted by one position.) The generative AI model converts the decoder output embedding vectors into the predicted tokens. Such operations of the generative AI model can be performed as explained with reference to FIG. 7*d*. Alternatively, the generative AI model processes the input tokens in some other way to determine the predicted tokens.

With reference to FIG. 9, the computer system receives (970) predicted tokens from the generative AI model. The predicted tokens represent output syntax elements, respectively, of compressed data for output media at the first resolution. In some example implementations, for a given output syntax element, a given predicted token indicates a syntax structure that includes the given output syntax element, a type of the given output syntax element, and a value of the given output syntax element. Alternatively, the predicted tokens are encoded in another format.

The computer system reconstructs (980) the output media from the predicted tokens. To do so, the computer system can convert the predicted tokens to the output syntax elements, respectively, in the media compression format, and then decompress the output syntax elements using a media decoder for the media compression format.

The computer system determines (982) differences between the first version of the input media and the output media. If first version is not accessible to the computer system, the computer system can receive compressed data for the first version and decompress the compressed data for the first version, producing the first version of the input media. To determine the differences between the first version of the input media and the output media, the computer system can simply determine pixel value differences between pixel values of the first version and corresponding pixel values of the output media, which has the first resolution. (The corresponding pixel values are spatial collocated pixel values in temporally corresponding frames.)

The computer system compresses (984) the differences between the first version of the input media and the output media. This produces compressed data for the differences. For example, the computer system compresses the differences using a media encoder for the media compression format (the same media compression format used to compress the second version of the input media). Alternatively, different compression formats can be used for the second version of the input media and the differences between the first version of the input media and the output media. In general, the compression of the differences can use intra-frame compression and/or inter-frame compression of the differences.

The computer system outputs (986) the compressed data for the differences for subsequent decompression as an augmentation stream. The computer system can multiplex the compressed data for the second version and the compressed data for the differences according to a container format. In this case, the compressed data for the second version and the compressed data for the differences are output as part of containers in the container format.

FIG. 9 shows operations to compress a single frame of the input media. The computer system can repeat the operations on a frame-by-frame basis. The computer system checks (990) whether to continue with another frame. If so, the computer system receives (910) another frame of the first version of input media. Alternatively, the computer system can repeat operations on some other basis (e.g., slice-by-slice basis).

D. Example Techniques for Using a Generative AI Model to Decompress Media.

Figure 10:
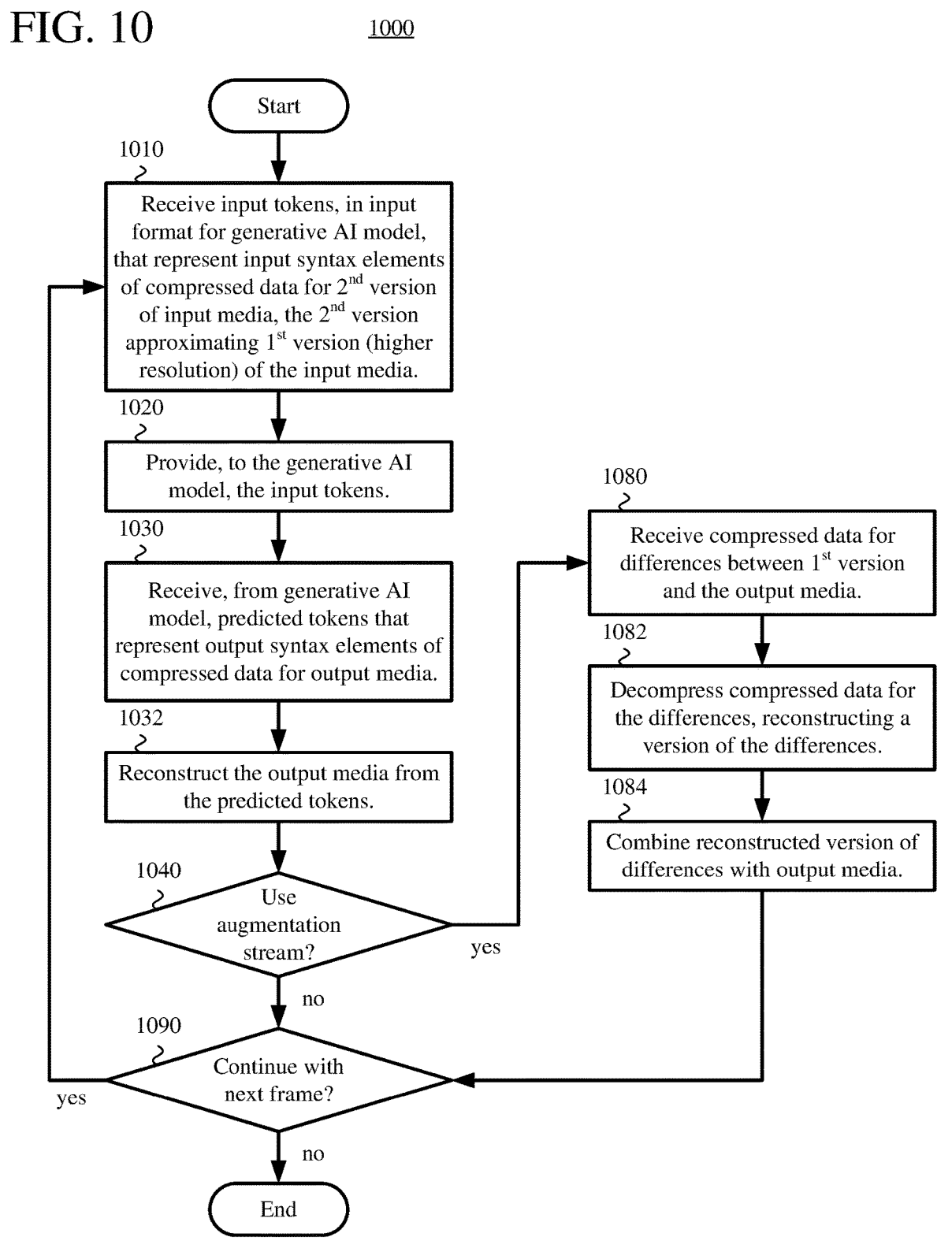

FIG. 10 shows an example technique (1000) for decompressing media with a generative AI model, where the generative AI model uses partially decompressed data as input. A media decompression tool in a computer system that implements a generative AI model, as described with reference to FIG. 7*c* or otherwise, can perform the technique (1000).

Using the technique (1000), a computer system can reconstruct a version of input media. The input media can be a frame of a video sequence, audio of an audio sequence, an image, or another type of media. In some examples, the version of input media that is reconstructed is a first version that has a first resolution. In other examples, the version of input media that is reconstructed is a second version that has a second resolution, lower than the first resolution. Thus, the second version approximates the first version of the input media. The second resolution can be lower than the first resolution in terms of quality, bitrate, spatial resolution, and/or temporal resolution.

If input tokens have not yet been generated for compressed data for the second version of input media, the computer system receives the compressed data for the second version. The computer system partially decompresses the compressed data for the second version. For example, the computer system performs partial decompression operations as described in section III. This produces input syntax elements according to the media compression format. For example, for video, the media compression format is the H.264/AVC standard, H.265/HEVC standard, H.266/VVC standard, VC-1 standard, VP9 standard, AV1 standard, or another video compression format. For another type of media, the media compression format is a compression format adapted for that type of media. The computer system then converts the input syntax elements into input tokens for the second version. For example, the computer system performs tokenization operations as described in section III.

As shown in FIG. 10, the computer system receives (1010) input tokens that represent input syntax elements, respectively, of compressed data for the second version of input media. As noted above, the second version has been compressed according to the media compression format to produce the compressed data for the second version. The input tokens are encoded in an input format for the generative AI model. In some example implementations, for a given input syntax element, a given input token indicates a syntax structure that includes the given input syntax element, a type of the given input syntax element, and a value of the given input syntax element. Alternatively, the input tokens are encoded in another format.

The computer system provides (1020) the input tokens to the generative AI model. The generative AI model can be a variation of BLOOM, GPT-4, GPT-4.5, LLaMA, or another generative AI model. In some example implementations, the computer system partitions the input tokens into blocks that correspond to frames of the second version of input media. For example, the computer system can detect frame boundaries by scanning for an input token associated with a particular type of syntax element (e.g., a syntax element that indicates the first slice of a frame). The computer system provides the second input tokens to the generative AI model on a block-by-block basis for the frames, respectively, of the second version.

The generative AI model processes input tokens to determine predicted tokens. For example, the generative AI model converts the input tokens into encoder input embedding vectors. Based on the encoder input embedding vectors, the generative AI model determines encoder output embedding vectors using multiple layers of an encoder of the generative AI model. Based on decoder input embedding vectors and the encoder output embedding vectors, the generative AI model determines decoder output embedding vectors using multiple layers of a decoder of the generative AI model. (The decoder input embedding vectors are based on prior predicted tokens in the output sequence from the decoder, shifted by one position) The generative AI model converts the decoder output embedding vectors into the predicted tokens. Such operations of the generative AI model can be performed as explained with reference to FIG. 7*d*. Alternatively, the generative AI model processes the input tokens in some other way to determine the predicted tokens.

With reference to FIG. 10, the computer system receives (1030) predicted tokens from the generative AI model. The predicted tokens represent output syntax elements, respectively, of compressed data for output media at the first resolution. In some example implementations, for a given output syntax element, a given predicted token indicates a syntax structure that includes the given output syntax element, a type of the given output syntax element, and a value of the given output syntax element. Alternatively, the predicted tokens are encoded in another format.

The computer system reconstructs (1032) the output media from the predicted tokens. To do so, the computer system can convert the predicted tokens to the output syntax elements, respectively, in the media compression format, and then decompress the output syntax elements using a media decoder for the media compression format.

In this way, the computer system can reconstruct the second version of the input media. In some examples, the computer system can also decompress compressed data in an augmentation stream and use the results to augment the second version of the input media. The computer system checks (1040) whether to use an augmentation stream. If so, the computer system performs another series of operations (1080, 1082, 1084) to decompress the augmentation stream and augment the second version of the input media.

The computer system receives (1080) compressed data for differences between the first version of the input media and the output media. The differences can simply indicate pixel value differences between pixel values of the first version and corresponding pixel values of the output media, which has the first resolution. (The corresponding pixel values are spatial collocated pixel values in temporally corresponding frames.) The computer system can demultiplex the compressed data for the second version and the compressed data for the differences according to a container format. In this case, the compressed data for the second version and the compressed data for the differences are received as part of containers in the container format.

The computer system decompresses (1082) the compressed data for the differences. In this way, the computer system reconstructs a version of the differences. For example, the computer system decompresses the differences using a media decoder for the media compression format (the same media compression format used to decompress the second version of the input media). Alternatively, different compression formats can be used for the second version of the input media and the differences between the first version of the input media and the output media. In general, the decompression of the differences can use intra-frame decompression and/or inter-frame decompression of the differences.

The computer system combines (1084) the reconstructed version of the differences with the output media. For example, the computer system adds pixel value differences to corresponding pixel values of the output media, which has the first resolution.

FIG. 10 shows operations to reconstruct a single frame of the output media. The computer system can repeat the operations on a frame-by-frame basis. The computer system checks (1090) whether to continue with another frame. If so, the computer system receives (1010) input tokens for another frame of the second version of input media. Alternatively, the computer system can repeat operations on some other basis (e.g., slice-by-slice basis).

E. Innovative Features.

The following table shows some of the innovative features described herein for media compression or decompression using a generative AI model that accepts, as input, partially decompressed data.

| | Features |
|---|---|
| D1 | In a computer system that implements a generative artificial intelligence ("AI") model, a method of compressing media, the method comprising: receiving a first version of input media, the first version having a first resolution; converting the first version to a second version of the input media, the second version having a second resolution lower than the first resolution; compressing the second version according to a media compression format, thereby producing compressed data for the second version; and outputting the compressed data for the second version for decompression using a generative AI model and a media decoder for the media compression format. |
| D2 | The method of D1, further comprising: receiving compressed data for the first version; and transcoding the compressed data for the first version, thereby producing the compressed data for the second version of the input media, wherein the transcoding includes decompressing the compressed data for the first version, the receiving the first version of input media, the converting, and the compressing the second version. |
| D3 | The method of D1, wherein the second resolution is lower than the first resolution in terms of quality, bitrate, spatial resolution, and/or temporal resolution. |
| D4 | The method of D1, further comprising: receiving input tokens that represent input syntax elements, respectively, of the compressed data for the second version, the second version having been compressed according to the media compression format to produce the compressed data for the second version, wherein the input tokens are encoded in an input format for the generative AI model; providing, to the generative AI model, the input tokens; receiving, from the generative AI model, predicted tokens that represent output syntax elements, respectively, of compressed data for output media at the first resolution; reconstructing the output media from the predicted tokens; determining differences between the first version and the output media; compressing the differences, thereby producing compressed data for the differences; and outputting the compressed data for the differences for decompression as an augmentation stream. |
| D5 | The method of D4, further comprising: receiving the compressed data for the second version; partially decompressing the compressed data for the second version, thereby producing the input syntax elements according to the media compression format; and converting the input syntax elements into the input tokens. |
| D6 | The method of D4, wherein: for a given input syntax element among the input syntax elements, a given input token among the input tokens indicates a syntax structure that includes the given input syntax element, a type of the given input syntax element, and a value of the given input syntax element; and for a given output syntax element among the output syntax elements, a given predicted token among the predicted tokens indicates a syntax structure that includes the given output syntax element, a type of the given output syntax element, and a value of the given output syntax element. |
| D7 | The method of D4, further comprising: partitioning the input tokens into blocks that correspond to frames of the second version, wherein the input tokens are provided to the generative AI model on a block-by-block basis for the frames, respectively, of the second version. |
| D8 | The method of D7, wherein the partitioning includes: detecting frame boundaries by scanning for an input token associated with a particular type of syntax element. |
| D9 | The method of D4, further comprising, with the generative AI model, processing the input tokens to determine the predicted tokens, including: converting the input tokens into encoder input embedding vectors; determining, based on the encoder input embedding vectors, encoder output embedding vectors using multiple layers of an encoder of the generative AI model; determining, based on decoder input embedding vectors and the encoder output embedding vectors, decoder output embedding vectors using multiple layers of a decoder of the generative AI model, wherein the decoder input embedding vectors |

-continued

| | Features |
|---|---|
| | are based on prior predicted tokens; and converting the decoder output embedding vectors into the predicted tokens. |
| D10 | The method of D9, wherein the converting the input tokens into the encoder input embedding vectors includes, for a given input token among the input tokens: converting the given input token into a one-hot vector of dimension V; and multiplying the one-hot vector by an embedding matrix of dimensions V × D, thereby producing a given input embedding vector, among the encoder input embedding vectors, of dimension D. |
| D11 | The method of D10, further comprising encoding positions of the input tokens, wherein updated versions of the encoder input embedding vectors that incorporate position encodings are used by the generative AI model, and wherein the encoding positions includes, for the given input token: determining a position encoding of the given input token; and updating the given input embedding vector to incorporate the position encoding of the given input token. |
| D12 | The method of D9, wherein each of the multiple layers of the encoder of the generative AI model includes: a multi-head attention sub-layer that is configured to accept, as input to a multi-head attention function, keys, queries, and values based on linear projections of the encoder input embedding vectors, and that is configured to produce, as output, normalized results from the multi-head attention function; and a feed-forward neural network sub-layer that is configured to accept, as input, the output of the multi-head attention sub-layer, and that is configured to produce, as output, the encoder output embedding vectors. |
| D13 | The method of D9, wherein each of the multiple layers of the decoder of the generative AI model includes: a masked multi-head attention sub-layer that is configured to accept, as input to a masked multi-head attention function, keys, queries, and values based on linear projections of the decoder input embedding vectors, and that is configured to produce, as output, normalized results from the masked multi-head attention function; a multi-head attention sub-layer that is configured to accept, as input to a multi-head attention function, keys and values based on linear projections of the encoder output embedding vectors from the encoder as well as queries based on the output of the masked multi-head attention sub-layer of the decoder, and that is configured to produce, as output, normalized results from the multi-head attention function; and a feed-forward neural network sub-layer that is configured to accept, as input, the output of the multi-head attention sub-layer, and that is configured to produce, as output, the decoder output embedding vectors. |
| D14 | The method of D9, wherein the converting the decoder output embedding vectors into the predicted tokens includes, for a given predicted token among the predicted tokens: using a linear function to determine a one-hot vector of dimension V from a given output embedding vector, among the decoder output embedding vectors, of dimension D, including multiplying the given output embedding vector by an embedding matrix of dimensions D × V; and using a softmax function to determine the given predicted token from the one-hot vector. |
| D15 | The method of D4, wherein the reconstructing the output media from the predicted tokens includes: converting the predicted tokens to the output syntax elements, respectively, in the media compression format; and decompressing the output syntax elements using a media decoder for the media compression format. |
| D16 | The method of D4, further comprising: receiving compressed data for the first version; and decompressing the compressed data for the first version, thereby producing the first version. |
| D17 | The method of D4, wherein the determining the differences includes: determining pixel value differences between pixel values of the first version and corresponding pixel values of the output media, wherein the corresponding pixel values are spatial collocated pixel values in temporally corresponding frames. |
| D18 | The method of D4, wherein the compressing the differences uses a media encoder for the media compression format. |
| D19 | The method of D4, wherein the compressing the differences uses intra-frame compression and/or inter-frame compression of the differences. |
| D20 | The method of D4, further comprising: multiplexing, according to a container format, the compressed data for the second version and the compressed data for the differences, wherein the compressed data for the second version and the compressed data for the differences are output as part of containers in the container format. |
| E1 | In a computer system that implements a generative artificial intelligence ("AI") model, a method of training the generative AI model to compress media, the method comprising: identifying a set of training data; and training the generative AI model in multiple training iterations using the set of training data, including, in a given training iteration of the multiple training iterations: receiving first input tokens that represent first input syntax elements, respectively, of compressed data for a first version |

-continued

| | Features |
|---|---|
| | of input media, the first version having a first resolution, the first version having been compressed according to a media compression format to produce the compressed data for the first version, wherein the first input tokens are encoded in an input format for the generative AI model; receiving second input tokens that represent second input syntax elements, respectively, of compressed data for a second version of the input media, the second version having a second resolution lower than the first resolution, the second version having been compressed according to the media compression format to produce the compressed data for the second version of the input media, wherein the second input tokens are encoded in the input format for the generative AI model; providing, to the generative AI model, the first input tokens and the second input tokens; receiving, from the generative AI model, predicted tokens that represent output syntax elements, respectively, of compressed data for output media at the first resolution; determining a measure of loss based at least in part on the predicted tokens; and updating one or more parameters of the generative AI model based at least in part on the measure of loss. |
| E2 | The method of E1, wherein the set of training data includes, for each of multiple examples of input media, first input tokens that represent first input syntax elements, respectively, of compressed data for a first version, having the first resolution, of that example of input media and second input tokens that represent second input syntax elements, respectively, of compressed data for a second version, having the second resolution, of that example of input media, and wherein, for each of the multiple examples of input media, the first version and the second version of that example of input media have been compressed according to the media compression format. |
| E3 | The method of E2, wherein, for each of the multiple examples of input media: the first version and the second version of that example have been compressed using a common set of compression settings and a common profile of the media compression format; the first version and the second version of that example differ, in terms of quality, bitrate, spatial resolution, and/or temporal resolution, by a common scaling factor for that attribute; and is part of a given genre of media. |
| E4 | The method of El, further comprising: receiving the compressed data for the first version; partially decompressing the compressed data for the first version, thereby producing the first input syntax elements according to the media compression format; converting the first input syntax elements into the first input tokens; receiving the compressed data for the second version; partially decompressing the compressed data for the second version, thereby producing the second input syntax elements according to the media compression format; and converting the second input syntax elements into the second input tokens. |
| E5 | The method of E1, wherein: for a given input syntax element among the first input syntax elements or the second input syntax elements, a given input token among the first input tokens or second input tokens indicates a syntax structure that includes the given input syntax element, a type of the given input syntax element, and a value of the given input syntax element; and for a given output syntax element among the output syntax elements, a given predicted token among the predicted tokens indicates a syntax structure that includes the given output syntax element, a type of the given output syntax element, and a value of the given output syntax element. |
| E6 | The method of E1, further comprising: partitioning the first input tokens into blocks that correspond to frames of the first version, wherein the first input tokens are provided to the generative AI model on a block-by-block basis for the frames, respectively, of the first version; and partitioning the second input tokens into blocks that correspond to frames of the second version, wherein the second input tokens are provided to the generative AI model on a block-by-block basis for the frames, respectively, of the second version that correspond to the frames, respectively, of the first version. |
| E7 | The method of E6, wherein the partitioning includes: detecting frame boundaries by scanning for an input token associated with a particular type of syntax element. |
| E8 | The method of E1, further comprising, with the generative AI model, processing the first input tokens and the second input tokens to determine the predicted tokens, including: converting the second input tokens into encoder input embedding vectors; determining, based on the encoder input embedding vectors, encoder output embedding vectors using multiple layers of an encoder of the generative AI model; converting the first input tokens into decoder input embedding vectors; determining, based on the decoder input embedding vectors and the encoder output embedding vectors, decoder output embedding vectors using multiple layers of a decoder of the generative AI model; and converting the decoder output embedding vectors into the predicted tokens. |
| E9 | The method of E8, wherein the converting the second input tokens into the encoder input embedding vectors includes, for a given input token among the second input tokens: converting the given input token into a one-hot vector of dimension V; and multiplying the one-hot vector by an embedding |

-continued

| | Features |
|---|---|
| | matrix of dimensions V × D, thereby producing a given input embedding vector, among the encoder input embedding vectors, of dimension D. |
| E10 | The method of E9, further comprising encoding positions of the second input tokens, wherein updated versions of the encoder input embedding vectors that incorporate position encodings are used by the generative AI model, and wherein the encoding positions includes, for the given input token: determining a position encoding of the given input token; and updating the given input embedding vector to incorporate the position encoding of the given input token. |
| E11 | The method of E8, wherein the converting the first input tokens into the decoder input embedding vectors includes, for a given input token among the first input tokens: converting the given input token into a one-hot vector of dimension V; and multiplying the one-hot vector by an embedding matrix of dimensions V × D, thereby producing a given input embedding vector, among the decoder input embedding vectors, of dimension D. |
| E12 | The method of E11, further comprising encoding positions of the first input tokens, wherein updated versions of the decoder input embedding vectors that incorporate position encodings are used by the generative AI model, and wherein the encoding positions includes, for the given input token: determining a position encoding of the given input token; and updating the given input embedding vector to incorporate the position encoding of the given input token. |
| E13 | The method of E8, wherein each of the multiple layers of the encoder of the generative AI model includes: a multi-head attention sub-layer that is configured to accept, as input to a multi-head attention function, keys, queries, and values based on linear projections of the encoder input embedding vectors, and that is configured to produce, as output, normalized results from the multi-head attention function; and a feed-forward neural network sub-layer that is configured to accept, as input, the output of the multi-head attention sub-layer, and that is configured to produce, as output, the encoder output embedding vectors. |
| E14 | The method of E8, wherein each of the multiple layers of the decoder of the generative AI model includes: a masked multi-head attention sub-layer that is configured to accept, as input to a masked multi-head attention function, keys, queries, and values based on linear projections of the decoder input embedding vectors, and that is configured to produce, as output, normalized results from the masked multi-head attention function; a multi-head attention sub-layer that is configured to accept, as input to a multi-head attention function, keys and values based on linear projections of the encoder output embedding vectors from the encoder as well as queries based on the output of the masked multi-head attention sub-layer of the decoder, and that is configured to produce, as output, normalized results from the multi-head attention function; and a feed-forward neural network sub-layer that is configured to accept, as input, the output of the multi-head attention sub-layer, and that is configured to produce, as output, the decoder output embedding vectors. |
| E15 | The method of E8, wherein the converting the decoder output embedding vectors into the predicted tokens includes, for a given predicted token among the predicted tokens: using a linear function to determine a one-hot vector of dimension V from a given output embedding vector, among the decoder output embedding vectors, of dimension D, including multiplying the given output embedding vector by an embedding matrix of dimensions D × V; and using a softmax function to determine the given predicted token from the one-hot vector. |
| E16 | The method of E1, wherein the determining the measure of loss includes: determining a measure of conformity of the predicted tokens to syntax of the media compression format, wherein the measure of conformity of the predicted tokens to syntax of the media compression format quantifies loss in terms of deviations from the syntax of the media compression format. |
| E17 | The method of E16, wherein the determining the measure of conformity of the predicted tokens to syntax of the media compression format includes: converting the predicted tokens to the output syntax elements, respectively, in the media compression format; and measuring syntax errors in the output syntax elements. |
| E18 | The method of E1, wherein the training further includes, in the given training iteration: reconstructing the output media from the predicted tokens. |
| E19 | The method of E18, wherein the reconstructing the output media from the predicted tokens includes: converting the predicted tokens to the output syntax elements, respectively, in the media compression format; and decompressing the output syntax elements using a media decoder for the media compression format. |
| E20 | The method of E18, wherein the determining the measure of loss includes: determining a measure of quality degradation of the output media relative to the first version of the input media. |
| E21 | The method of E20, wherein the measure of quality degradation is peak signal-to-noise ratio, structural similarity index, multi-scale structural similarity index, or video multi-method assessment fusion. |

-continued

| | Features |
|---|---|
| E22 | The method of E1, wherein the determining the measure of loss includes: determining a measure of conformity of the predicted tokens to syntax of the media compression format, wherein the measure of conformity of the predicted tokens to syntax of the media compression format quantifies loss in terms of deviations from the syntax of the media compression format; and determining a measure of quality degradation of the output media relative to the first version of the input media. |
| E23 | The method of E22, wherein the training produces a version of the generative AI model that generates predicted tokens that are conformant to the media compression format and yields output media with lower quality degradation. |
| E24 | The method of E1, wherein the parameters of the generative AI model include one or more of: an embedding matrix for determining decoder input embedding vectors from the first input tokens, determining encoder input embedding vectors from the second input tokens, and/or for determining the predicted tokens from output embedding vectors; linear projections for determining inputs to multi-head attention sub-layers of the generative AI model; weights and offsets for feed-forward neural networks of the generative AI model; and parameters of a softmax function of the generative AI model. |
| F1 | In a computer system that implements a generative artificial intelligence ("AI") model, a method of reconstructing media, the method comprising: receiving input tokens that represent input syntax elements, respectively, of compressed data for a second version of input media, the second version having been compressed according to a media compression format to produce the compressed data for the second version, wherein the second version approximates a first version of the input media, the first version having a first resolution, the second version having a second resolution lower than the first resolution, and wherein the input tokens are encoded in an input format for the generative AI model; providing, to the generative AI model, the input tokens; receiving, from the generative AI model, predicted tokens that represent output syntax elements, respectively, of compressed data for output media at the first resolution; and reconstructing the output media from the predicted tokens. |
| F2 | The method of F1, wherein the second resolution is lower than the first resolution in terms of quality, bitrate, spatial resolution, and/or temporal resolution. |
| F3 | The method of F1, further comprising: receiving the compressed data for the second version; partially decompressing the compressed data for the second version, thereby producing the input syntax elements according to the media compression format; and converting the input syntax elements into the input tokens. |
| F4 | The method of F1, wherein: for a given input syntax element among the input syntax elements, a given input token among the input tokens indicates a syntax structure that includes the given input syntax element, a type of the given input syntax element, and a value of the given input syntax element; and for a given output syntax element among the output syntax elements, a given predicted token among the predicted tokens indicates a syntax structure that includes the given output syntax element, a type of the given output syntax element, and a value of the given output syntax element. |
| F5 | The method of F1, further comprising: partitioning the input tokens into blocks that correspond to frames of the second version, wherein the input tokens are provided to the generative AI model on a block-by-block basis for the frames, respectively, of the second version. |
| F6 | The method of F1, wherein the partitioning includes: detecting frame boundaries by scanning for an input token associated with a particular type of syntax element. |
| F7 | The method of F1, further comprising, with the generative AI model, processing the input tokens to determine the predicted tokens, including: converting the input tokens into encoder input embedding vectors; determining, based on the encoder input embedding vectors, encoder output embedding vectors using multiple layers of an encoder of the generative AI model; determining, based on decoder input embedding vectors and the encoder output embedding vectors, decoder output embedding vectors using multiple layers of a decoder of the generative AI model, wherein the decoder input embedding vectors are based on prior predicted tokens; and converting the decoder output embedding vectors into the predicted tokens. |
| F8 | The method of F7, wherein the converting the input tokens into the encoder input embedding vectors includes, for a given input token among the input tokens: converting the given input token into a one-hot vector of dimension V; and multiplying the one-hot vector by an embedding matrix of dimensions V × D, thereby producing a given input embedding vector, among the encoder input embedding vectors, of dimension D. |
| F9 | The method of F8, further comprising encoding positions of the input tokens, wherein updated versions of the encoder input embedding vectors that incorporate position encodings are used by the generative AI model, and wherein the |

-continued

| | Features |
|---|---|
| | encoding positions includes, for the given input token: determining a position encoding of the given input token; and updating the given input embedding vector to incorporate the position encoding of the given input token. |
| F10 | The method of F7, wherein each of the multiple layers of the encoder of the generative AI model includes: a multi-head attention sub-layer that is configured to accept, as input to a multi-head attention function, keys, queries, and values based on linear projections of the encoder input embedding vectors, and that is configured to produce, as output, normalized results from the multi-head attention function; and a feed-forward neural network sub-layer that is configured to accept, as input, the output of the multi-head attention sub-layer, and that is configured to produce, as output, the encoder output embedding vectors. |
| F11 | The method of F7, wherein each of the multiple layers of the decoder of the generative AI model includes: a masked multi-head attention sub-layer that is configured to accept, as input to a masked multi-head attention function, keys, queries, and values based on linear projections of the decoder input embedding vectors, and that is configured to produce, as output, normalized results from the masked multi-head attention function; a multi-head attention sub-layer that is configured to accept, as input to a multi-head attention function, keys and values based on linear projections of the encoder output embedding vectors from the encoder as well as queries based on the output of the masked multi-head attention sub-layer of the decoder, and that is configured to produce, as output, normalized results from the multi-head attention function; and a feed-forward neural network sub-layer that is configured to accept, as input, the output of the multi-head attention sub-layer, and that is configured to produce, as output, the decoder output embedding vectors. |
| F12 | The method of F7, wherein the converting the decoder output embedding vectors into the predicted tokens includes, for a given predicted token among the predicted tokens: using a linear function to determine a one-hot vector of dimension V from a given output embedding vector, among the decoder output embedding vectors, of dimension D, including multiplying the given output embedding vector by an embedding matrix of dimensions $D \times V$; and using a softmax function to determine the given predicted token from the one-hot vector. |
| F13 | The method of F1, wherein the reconstructing the output media from the predicted tokens includes: converting the predicted tokens to the output syntax elements, respectively, in the media compression format; and decompressing the output syntax elements using a media decoder for the media compression format. |
| F14 | The method of F1, further comprising: receiving compressed data for differences between the first version and the output media; decompressing the compressed data for the differences, thereby reconstructing a version of the differences; and combining the reconstructed version of the differences with the output media. |
| F15 | The method of F14, wherein the differences indicate pixel value differences between pixel values of the first version and corresponding pixel values of the output media, wherein the corresponding pixel values are spatial collocated pixel values in temporally corresponding frames. |
| F16 | The method of F14, wherein the decompressing the compressed data for the differences uses a media decoder for the media compression format. |
| F17 | The method of F14, wherein the decompressing the compressed data for the differences uses intra-frame decompression and/or inter-frame decompression of the differences. |
| F18 | The method of F14, further comprising: demultiplexing, according to a container format, the compressed data for the second version and the compressed data for the differences, wherein the compressed data for the second version and the compressed data for the differences are received as part of containers in the container format. |
| DF1 | The method of any one of D1-D20, E1-E24, and F1-F18, wherein the compressed data represents pictures of a video sequence, audio of an audio sequence, or an image. |
| DF2 | The method of any one of D1-D20, E1-E24, and F1-F18, wherein the media compression format is the H.264/AVC standard, H.265/HEVC standard, H.266/VVC standard, VC-1 standard, VP9 standard, or AV1 standard. |
| DF3 | The method of any one of D1-D20, E1-E24, and F1-F18, wherein the generative AI model is a variation of BLOOM, GPT-4, GPT-4.5, or LLaMA. |
| DF4 | One or more computer-readable media having stored thereon computer-executable instructions for causing a processor system, when programmed thereby, to perform operations for the method of any one of D1-D20, E1-E24, and F1-F18. |
| DF5 | A computer system comprising a processor system and memory, wherein the computer system is configured to perform operations for the method of any one of D1-D20, E1-E24, and F1-F18. |

VI. Example Computer Systems.

Figure 11:
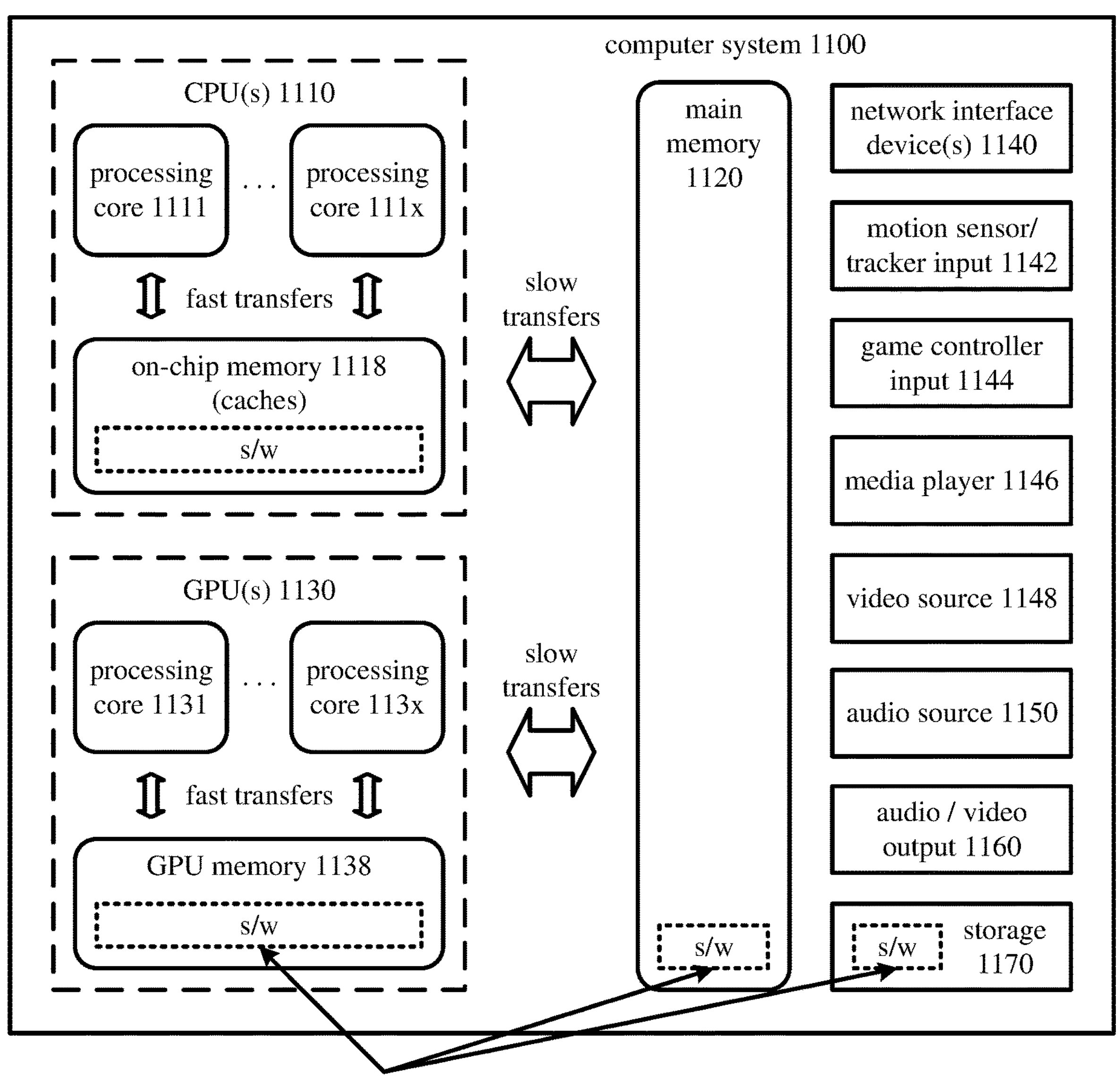
FIG. 11 is a diagram illustrating an example computer system in which some described embodiments can be implemented.

FIG. 11 illustrates a generalized example of a suitable computer system (1100) in which several of the described innovations may be implemented. The innovations described herein relate to using partially decompressed data as input to a generative AI model for media synthesis or compression/decompression. The computer system (1100) is not intended to suggest any limitation as to scope of use or functionality, as the innovations may be implemented in diverse computer systems, including special-purpose computer systems.

With reference to FIG. 11, the computer system (1100) includes one or more processing cores (1110 . . . 111*x*) and local memory (1118) of a central processing unit ("CPU") or multiple CPUs. The processing core(s) (1110 . . . 111*x*) are, for example, processing cores on a single chip, and execute computer-executable instructions. The number of processing core(s) (1110 . . . 111*x*) depends on implementation and can be, for example, 4 or 8. The local memory (1118) may be volatile memory (e.g., registers, cache, random access memory ("RAM")), non-volatile memory (e.g., read-only memory ("ROM"), electrically erasable programmable ROM ("EEPROM"), flash memory), or some combination of the two, accessible by the respective processing core(s) (1110 . . . 111*x*). Alternatively, the processing cores (1110 . . . 111*x*) can be part of a system-on-a-chip ("SoC"), application-specific integrated circuit ("ASIC"), or other integrated circuit.

The local memory (1118) can store software (1180) implementing aspects of the innovations for using partially decompressed data as input to a generative AI model for media synthesis or compression/decompression, for operations performed by the respective processing core(s) (1110 . . . 111*x*), in the form of computer-executable instructions. In FIG. 11, the local memory (1118) is on-chip memory such as one or more caches, for which access operations, transfer operations, etc. with the processing core(s) (1110 . . . 111*x*) are fast.

The computer system (1100) also includes processing cores (1130 . . . 113*x*) and local memory (1138) of a graphics processing unit ("GPU") or multiple GPUs. The number of processing cores (1130 . . . 113*x*) of the GPU depends on implementation. The processing cores (1130 . . . 113*x*) are, for example, part of single-instruction, multiple data ("SIMD") units of the GPU. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. The GPU memory (1138) may be volatile memory (e.g., registers, cache, RAM), non-volatile memory (e.g., ROM, EEPROM, flash memory), or some combination of the two, accessible by the respective processing cores (1130 . . . 113*x*). The GPU memory (1138) can store software (1180) implementing aspects of the innovations for using partially decompressed data as input to a generative AI model for media synthesis or compression/decompression, for operations performed by the respective processing cores (1130 . . . 113*x*), in the form of computer-executable instructions such as shader code.

The computer system (1100) includes main memory (1120), which may be volatile memory (e.g., RAM), non-volatile memory (e.g., ROM, EEPROM, flash memory), or some combination of the two, accessible by the processing core(s) (1110 . . . 111*x*, 1130 . . . 113*x*). The main memory (1120) stores software (1180) implementing aspects of the innovations for using partially decompressed data as input to a generative AI model for media synthesis or compression/decompression, in the form of computer-executable instructions. In FIG. 11, the main memory (1120) is off-chip memory, for which access operations, transfer operations, etc. with the processing cores (1110 . . . 111*x*, 1130 . . . 113*x*) are slower.

More generally, the term "processor" refers generically to any device that can process computer-executable instructions and may include a microprocessor, microcontroller, programmable logic device, digital signal processor, and/or other computational device. A processor may be a processing core of a CPU, other general-purpose unit, or GPU. A processor may also be a specific-purpose processor implemented using, for example, an ASIC or a field-programmable gate array ("FPGA"). A "processor system" is a set of one or more processors, which can be located together or distributed across a network.

The term "control logic" refers to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (1100) includes one or more network interface devices (1140). The network interface device(s) (1140) enable communication over a network to another computing entity (e.g., server, other computer system). The network interface device(s) (1140) can support wired connections and/or wireless connections, for a wide-area network, local-area network, personal-area network, or other network. For example, the network interface device(s) can include one or more Wi-Fi® transceivers, an Ethernet® port, a cellular transceiver and/or another type of network interface device, along with associated drivers, software, etc. The network interface device(s) (1140) convey information such as computer-executable instructions, audio or video input or output, or other data in a modulated data signal over network connection(s). A modulated data signal is a signal that has one or more of its characteristics set or changed in such a manner as to encode information in the signal. By way of example, the network connections can use an electrical, optical, RF, or other carrier.

The computer system (1100) optionally includes a motion sensor/tracker input (1142) for a motion sensor/tracker, which can track the movements of a user and objects around the user. For example, the motion sensor/tracker allows a user (e.g., player of a game) to interact with the computer system (1100) through a natural user interface using gestures and spoken commands. The motion sensor/tracker can incorporate gesture recognition, facial recognition and/or voice recognition.

The computer system (1100) optionally includes a game controller input (1144), which accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (1100) optionally includes a media player (1146) and video source (1148). The media player (1146) can play DVDs, Blu-Ray™ discs, other disc media and/or other formats of media. The video source (1148) can be a camera input that accepts video input in analog or digital form from a video camera, which captures natural video. Alternatively, the video source (1148) can be a screen capture module (e.g., a driver of an operating system, or software that interfaces with an operating system) that provides screen capture content as input. Or, as another alternative, the video source (1148) can be a graphics engine that provides texture data for graphics in a computer-represented environment. Or, as another alterative, the video source (1148) can be a video card, TV tuner card, or other video input that accepts input video in analog or digital form (e.g., from a cable input, High-Definition Multimedia Interface ("HDMI") input or other input).

An optional audio source (1150) accepts audio input in analog or digital form from a microphone, which captures audio, or other audio input.

The computer system (1100) optionally includes a video output (1160), which provides video output to a display device. The video output (1160) can be an HDMI output or other type of output. An optional audio output (1160) provides audio output to one or more speakers.

The storage (1170) may be removable or non-removable, and includes magnetic media (such as magnetic disks, magnetic tapes or cassettes), optical disk media and/or any other media which can be used to store information, and which can be accessed within the computer system (1100). The storage (1170) stores instructions for the software (1180) implementing aspects of the innovations for using partially decompressed data as input to a generative AI model for media synthesis or compression/decompression.

The computer system (1100) may have additional features. For example, the computer system (1100) includes one or more other input devices and/or one or more other output devices. The other input device(s) may be a touch input device such as a keyboard, mouse, pen, or trackball, a scanning device, or another device that provides input to the computer system (1100). The other output device(s) may be a printer, CD-writer, or another device that provides output from the computer system (1100).

An interconnection mechanism (not shown) such as a bus, controller, or network interconnects the components of the computer system (1100). Typically, operating system software (not shown) provides an operating environment for other software executing in the computer system (100), and coordinates activities of the components of the computer system (1100).

The computer system (1100) of FIG. 11 is a physical computer system. A virtual machine can include components organized as shown in FIG. 11.

The term "application" or "program" refers to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including non-volatile media and volatile media. Non-volatile media include, for example, optical or magnetic disks and other persistent memory. Volatile media include dynamic random-access memory ("DRAM"). Common forms of computer-readable media include, for example, a solid-state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "non-transitory computer-readable media" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or device. In general, a computer system or device can be local or distributed, and a computer system can include any combination of special-purpose hardware and/or hardware with software implementing the functionality described herein.

Numerous examples are described in this disclosure and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and a computer system can include any combination of special-purpose hardware and/or hardware with software implementing the functionality described herein.

The respective techniques and tools described herein may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and they may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

As used herein, the term "set," when used as a noun to indicate a group of elements, indicates a non-empty group, unless context clearly indicates otherwise. That is, the "set" has one or more elements, unless context clearly indicates otherwise.

As used herein, the term "based on" or "based at least in part on" indicates a dependence. A value or output X that is "based on" (or "based at least in part on") a value or input Y depends on Y but can also depend on additional information or factors. Y can be directly or indirectly used when determining, assigning, generating, calculating, or creating X "based on" (or "based at least in part on") Y. Thus, for example, the language determining or assigning X "based on" Y can indicate determining or assigning X using Y.

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps or stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and these terms should not be confused with acts performed by a human being. The actual computer operations corresponding to these terms vary depending on implementation.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique or tool does not solve all such problems. It is to be understood that other examples may be utilized and that structural, logical, software, hardware, and electrical changes may be made without departing from the scope of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising a processor system and memory, wherein the computer system is configured to perform operations to compress media using a generative artificial intelligence ("AI") model, the operations comprising:
- receiving a first version of input media, the first version having a first resolution;
- converting the first version to a second version of the input media, the second version having a second resolution lower than the first resolution;
- compressing the second version according to a media compression format, thereby producing compressed data for the second version;
- outputting the compressed data for the second version;
- receiving input tokens that represent input syntax elements, respectively, of the compressed data for the second version, wherein the input tokens are encoded in an input format for the generative AI model;
- providing, to the generative AI model, the input tokens;
- receiving, from the generative AI model, predicted tokens that represent output syntax elements, respectively, of compressed data for output media at the first resolution;
- reconstructing the output media from the predicted tokens;
- determining differences between the first version and the output media;
- compressing the differences, thereby producing compressed data for the differences; and
- outputting the compressed data for the differences for decompression as an augmentation stream.

2. The computer system of claim 1, wherein the second resolution is lower than the first resolution in terms of quality, bitrate, spatial resolution, and/or temporal resolution.

3. The computer system of claim 1, wherein the operations further comprise, with the generative AI model, processing the input tokens to determine the predicted tokens, including:
- converting the input tokens into encoder input embedding vectors;
- determining, based on the encoder input embedding vectors, encoder output embedding vectors using multiple layers of an encoder of the generative AI model;
- determining, based on decoder input embedding vectors and the encoder output embedding vectors, decoder output embedding vectors using multiple layers of a decoder of the generative AI model, wherein the decoder input embedding vectors are based on prior predicted tokens; and
- converting the decoder output embedding vectors into the predicted tokens.

4. The computer system of claim 1, wherein the determining the differences includes:
- determining pixel value differences between pixel values of the first version and corresponding pixel values of the output media, wherein the corresponding pixel values are spatial collocated pixel values in temporally corresponding frames.

5. The computer system of claim 1, wherein the operations further comprise:
- multiplexing, according to a container format, the compressed data for the second version and the compressed data for the differences, wherein the compressed data for the second version and the compressed data for the differences are output as part of containers in the container format.

6. In a computer system that implements a generative artificial intelligence ("AI") model, a method of training the generative AI model to compress media, the method comprising:
- identifying a set of training data; and
- training the generative AI model in multiple training iterations using the set of training data, including, in a given training iteration of the multiple training iterations:
  - receiving first input tokens that represent first input syntax elements, respectively, of compressed data for a first version of input media, the first version having a first resolution, the first version having been compressed according to a media compression format to produce the compressed data for the first version, wherein the first input tokens are encoded in an input format for the generative AI model;
  - receiving second input tokens that represent second input syntax elements, respectively, of compressed data for a second version of the input media, the second version having a second resolution lower than the first resolution, the second version having been compressed according to the media compression format to produce the compressed data for the second version of the input media, wherein the second input tokens are encoded in the input format for the generative AI model;
  - providing, to the generative AI model, the first input tokens and the second input tokens;
  - receiving, from the generative AI model, predicted tokens that represent output syntax elements, respectively, of compressed data for output media at the first resolution;
  - determining a measure of loss based at least in part on the predicted tokens; and
  - updating one or more parameters of the generative AI model based at least in part on the measure of loss.

7. The method of claim 6, wherein the set of training data includes, for each of multiple examples of input media, first input tokens that represent first input syntax elements, respectively, of compressed data for a first version, having the first resolution, of that example of input media and second input tokens that represent second input syntax elements, respectively, of compressed data for a second version, having the second resolution, of that example of input media, and wherein, for each of the multiple examples of input media, the first version and the second version of that example of input media have been compressed according to the media compression format, and wherein, for each of the multiple examples of input media:
- the first version and the second version of that example have been compressed using a common set of compression settings and a common profile of the media compression format;
- the first version and the second version of that example differ, in terms of quality, bitrate, spatial resolution, and/or temporal resolution, by a common scaling factor for that attribute; and
- is part of a given genre of media.

8. The method of claim 6, further comprising:

receiving the compressed data for the first version;

partially decompressing the compressed data for the first version, thereby producing the first input syntax elements according to the media compression format;

converting the first input syntax elements into the first input tokens;

receiving the compressed data for the second version;

partially decompressing the compressed data for the second version, thereby producing the second input syntax elements according to the media compression format; and converting the second input syntax elements into the second input tokens.

9. The method of claim 6, further comprising, with the generative AI model, processing the first input tokens and the second input tokens to determine the predicted tokens, including:

converting the second input tokens into encoder input embedding vectors;

determining, based on the encoder input embedding vectors, encoder output embedding vectors using multiple layers of an encoder of the generative AI model;

converting the first input tokens into decoder input embedding vectors;

determining, based on the decoder input embedding vectors and the encoder output embedding vectors, decoder output embedding vectors using multiple layers of a decoder of the generative AI model; and converting the decoder output embedding vectors into the predicted tokens.

10. The method of claim 6, wherein the determining the measure of loss includes:

determining a measure of conformity of the predicted tokens to syntax of the media compression format, wherein the measure of conformity of the predicted tokens to syntax of the media compression format quantifies loss in terms of deviations from the syntax of the media compression format.

11. The method of claim 6, wherein the training further includes, in the given training iteration, reconstructing the output media from the predicted tokens, and wherein the determining the measure of loss includes:

determining a measure of quality degradation of the output media relative to the first version of the input media.

12. The method of claim 11, wherein the measure of quality degradation is peak signal-to-noise ratio, structural similarity index, multi-scale structural similarity index, or video multi-method assessment fusion.

13. The method of claim 6, wherein the parameters of the generative AI model include one or more of:

an embedding matrix for determining decoder input embedding vectors from the first input tokens, determining encoder input embedding vectors from the second input tokens, and/or for determining the predicted tokens from output embedding vectors;

linear projections for determining inputs to multi-head attention sub-layers of the generative AI model;

weights and offsets for feed-forward neural networks of the generative AI model; and parameters of a softmax function of the generative AI model.

14. One or more non-transitory computer-readable media having stored thereon computer-executable instructions for causing a processor system, when programmed thereby, to perform operations to decompress media using a generative artificial intelligence ("AI") model, the operations comprising:

receiving input tokens that represent input syntax elements, respectively, of compressed data for a second version of input media, the second version having been compressed according to a media compression format to produce the compressed data for the second version, wherein the second version approximates a first version of the input media, the first version having a first resolution, the second version having a second resolution lower than the first resolution, and wherein the input tokens are encoded in an input format for the generative AI model;

providing, to the generative AI model, the input tokens;

receiving, from the generative AI model, predicted tokens that represent output syntax elements, respectively, of compressed data for output media at the first resolution; and reconstructing the output media from the predicted tokens.

15. The one or more non-transitory computer-readable media of claim 14, wherein the second resolution is lower than the first resolution in terms of quality, bitrate, spatial resolution, and/or temporal resolution.

16. The one or more non-transitory computer-readable media of claim 14, wherein the operations further comprise:

receiving the compressed data for the second version;

partially decompressing the compressed data for the second version, thereby producing the input syntax elements according to the media compression format; and converting the input syntax elements into the input tokens.

17. The one or more non-transitory computer-readable media of claim 14, wherein the operations further comprise, with the generative AI model, processing the input tokens to determine the predicted tokens, including:

converting the input tokens into encoder input embedding vectors;

determining, based on the encoder input embedding vectors, encoder output embedding vectors using multiple layers of an encoder of the generative AI model;

determining, based on decoder input embedding vectors and the encoder output embedding vectors, decoder output embedding vectors using multiple layers of a decoder of the generative AI model, wherein the decoder input embedding vectors are based on prior predicted tokens; and converting the decoder output embedding vectors into the predicted tokens.

18. The one or more non-transitory computer-readable media of claim 14, wherein the reconstructing the output media from the predicted tokens includes:

converting the predicted tokens to the output syntax elements, respectively, in the media compression format; and decompressing the output syntax elements using a media decoder for the media compression format.

19. The one or more non-transitory computer-readable media of claim 14, wherein the operations further comprise:

receiving compressed data for differences between the first version and the output media;

decompressing the compressed data for the differences, thereby reconstructing a version of the differences; and combining the reconstructed version of the differences with the output media.

20. The one or more non-transitory computer-readable media of claim 19, wherein the operations further comprise: demultiplexing, according to a container format, the compressed data for the second version and the compressed data for the differences, wherein the compressed data for the second version and the compressed data for the differences are received as part of containers in the container format.

* * * * *